(12) United States Patent
Shiomi et al.

(10) Patent No.: US 6,711,113 B2
(45) Date of Patent: Mar. 23, 2004

(54) DISK DRIVE APPARATUS

(75) Inventors: Tetsuhiro Shiomi, Kanagawa (JP); Toshiyuki Hisatsune, Kanagawa (JP)

(73) Assignee: Sony Corporation, Tokyo (JP)

( * ) Notice: Subject to any disclaimer, the term of this patent is extended or adjusted under 35 U.S.C. 154(b) by 328 days.

(21) Appl. No.: 09/909,392

(22) Filed: Jul. 19, 2001

(65) Prior Publication Data

US 2002/0021648 A1 Feb. 21, 2002

(30) Foreign Application Priority Data

Jul. 21, 2000 (JP) .................................... P2000-226213

(51) Int. Cl.[7] ................................................ G11B 33/02
(52) U.S. Cl. ..................................................... 369/75.2
(58) Field of Search .............................. 369/75.2, 75.1, 369/77.1, 77.2

(56) References Cited

U.S. PATENT DOCUMENTS 4,672,598 A 6/1987 Koken et al.
4,980,883 A * 12/1990 Mutou et al. ................ 369/291
5,140,579 A * 8/1992 Suzuki et al. .............. 369/77.1
5,793,729 A * 8/1998 Soga et al. ................. 369/75.1
5,930,218 A * 7/1999 Mitsui et al. .............. 369/77.1
5,987,000 A * 11/1999 Yamashita et al. ......... 369/192
6,073,762 A * 6/2000 Hayakawa ................. 206/308.1
6,122,240 A * 9/2000 Kim ......................... 369/77.1
6,295,265 B1 * 9/2001 Cundiff, Sr. ............... 369/75.2
6,345,035 B1 * 2/2002 Aoki et al. ................. 369/291

FOREIGN PATENT DOCUMENTS

DE 3026600 2/1982
EP 0148553 7/1985
EP 0709839 5/1996

* cited by examiner

Primary Examiner—George J. Letscher
Assistant Examiner—C R Beacham
(74) Attorney, Agent, or Firm—Jay H. Maioli

(57) ABSTRACT

In order to enable a hand inserting direction against a disk tray to be freely changed during loading/unloading of a laser disk in respect to the disk tray, there is provided a disk drive apparatus in which a disk outer circumference mounting surface to be formed on the disk tray is formed substantially flush with an upper surface of the disk tray and its outer circumference is provided with a plurality of disk guides.

7 Claims, 50 Drawing Sheets

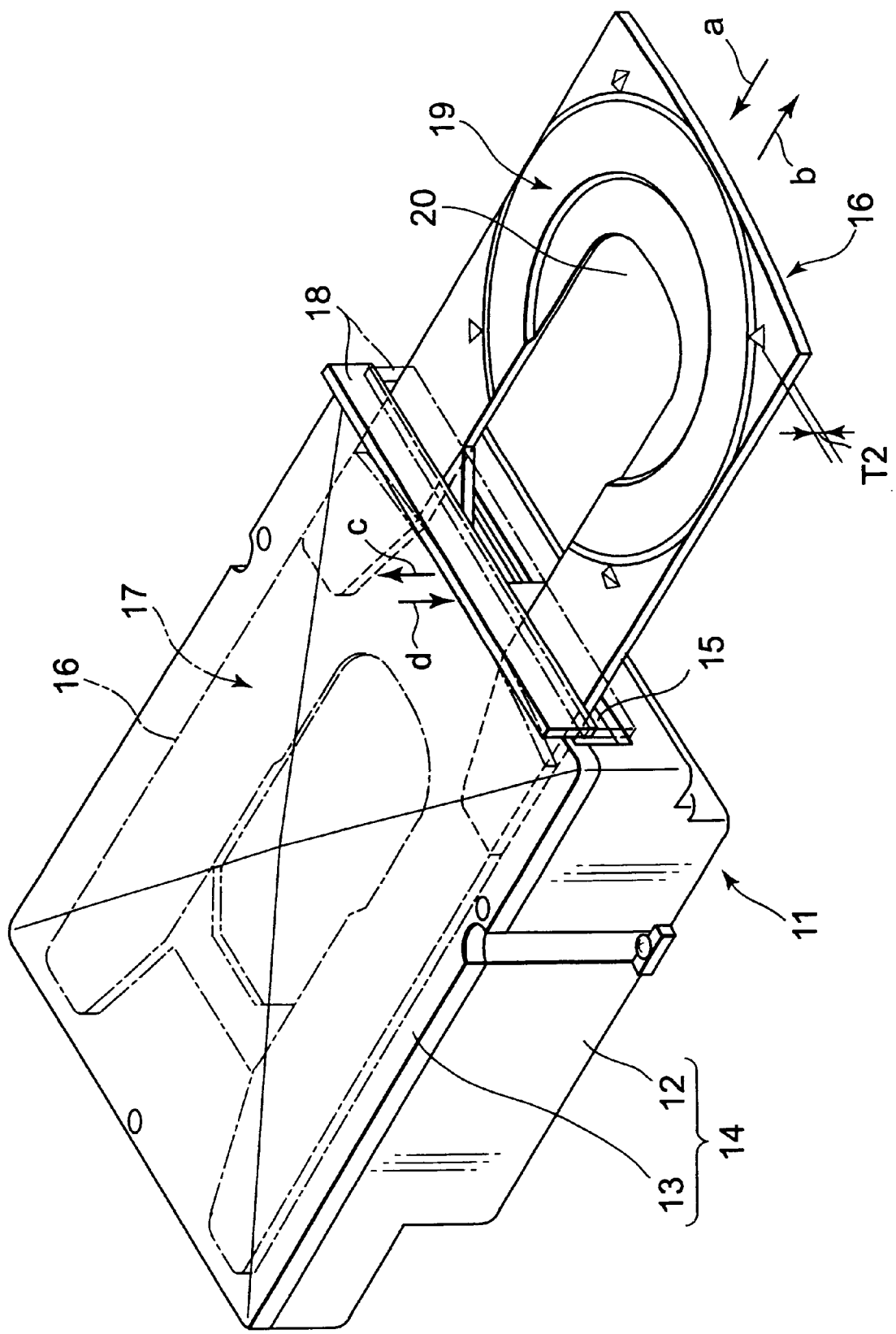

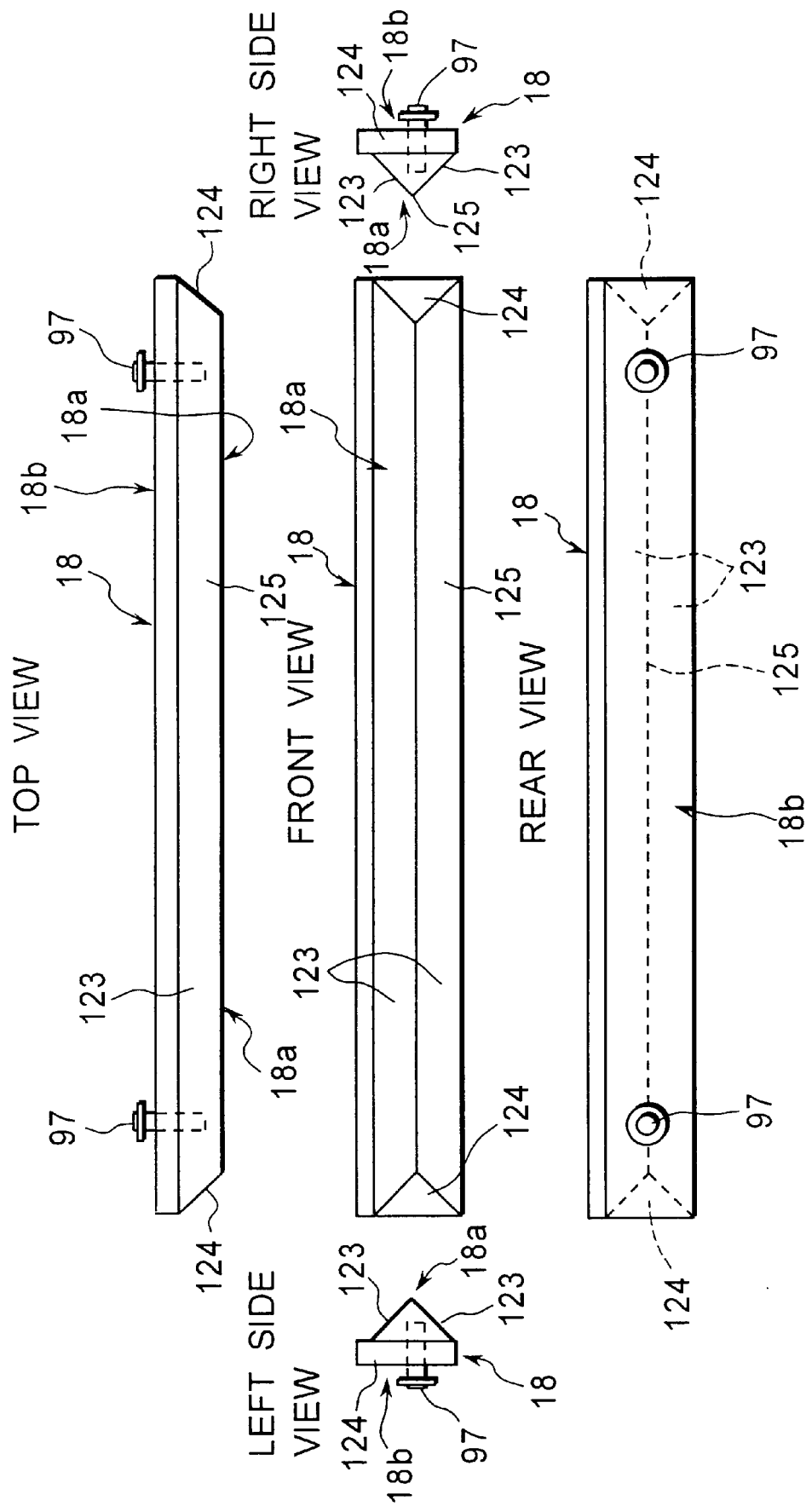

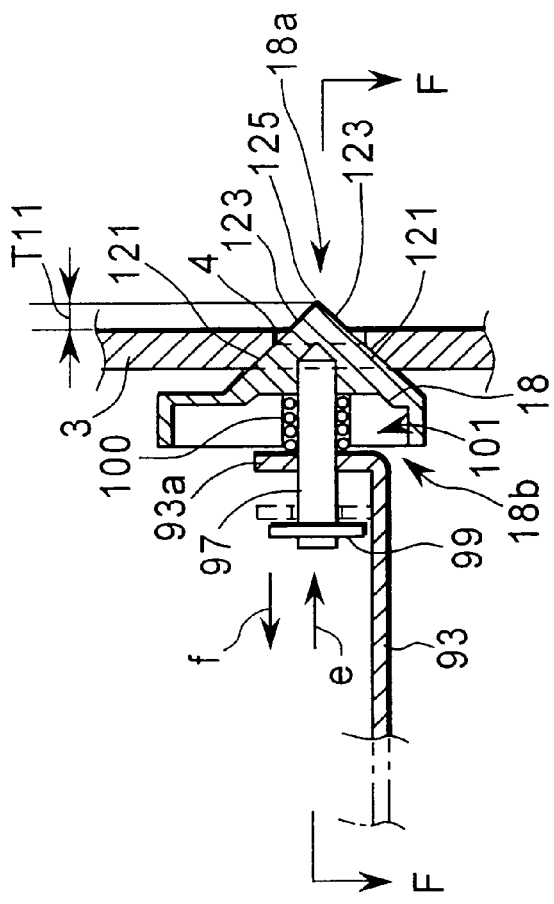
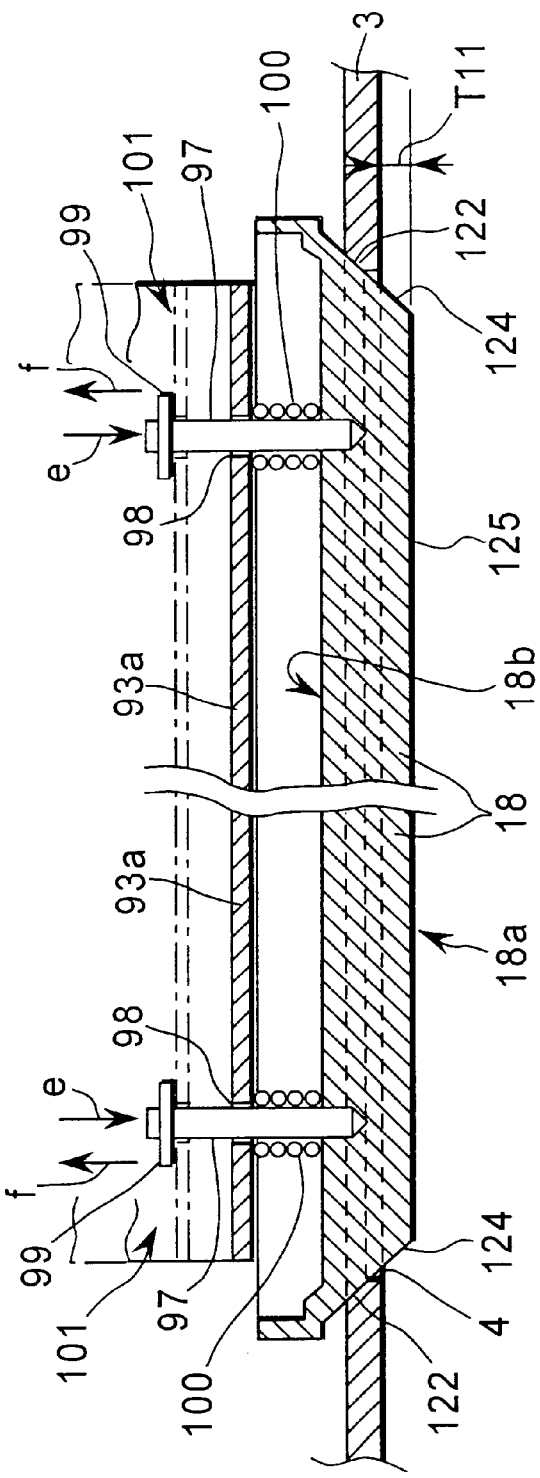
FIG.30A
FIG.30B

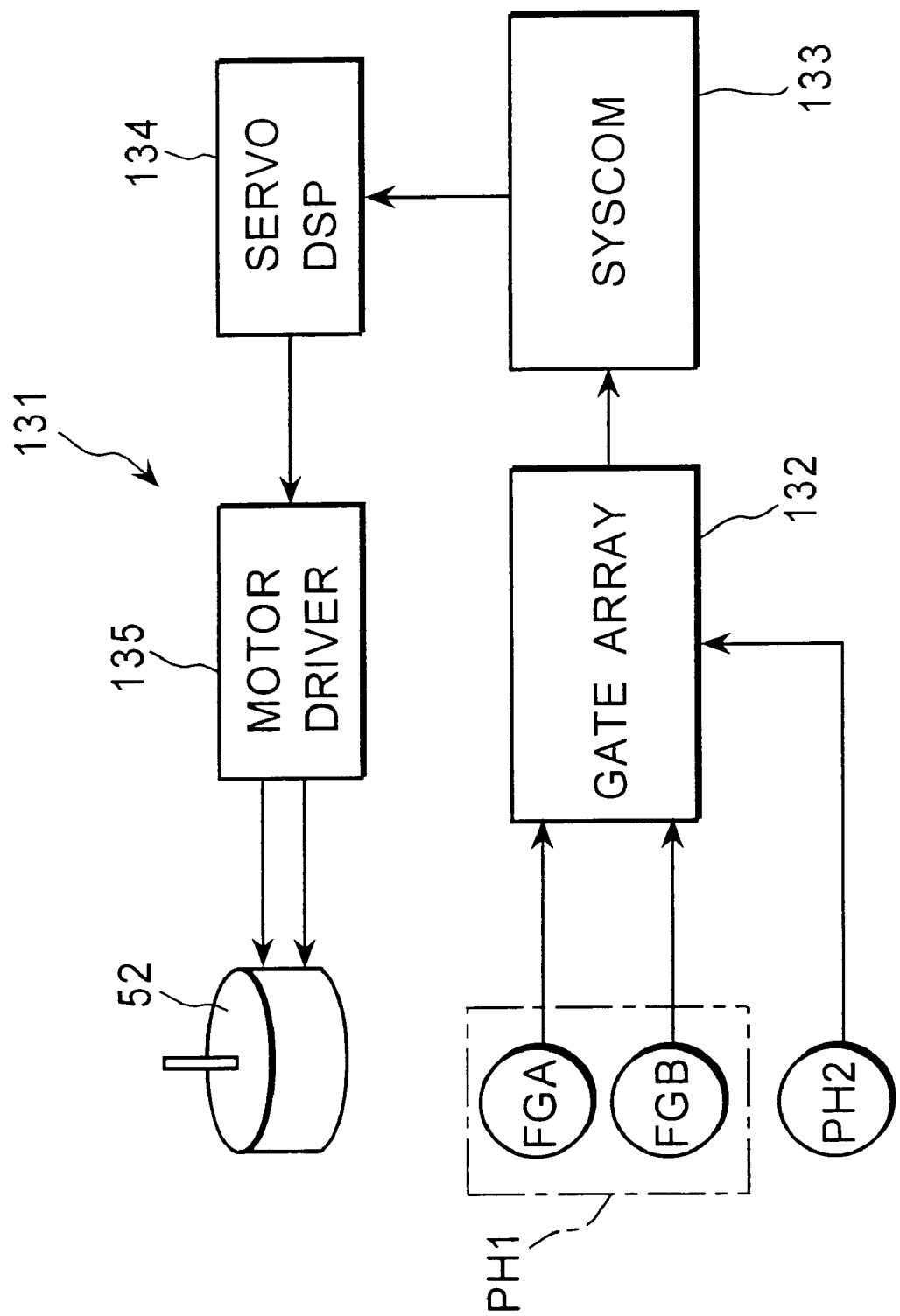

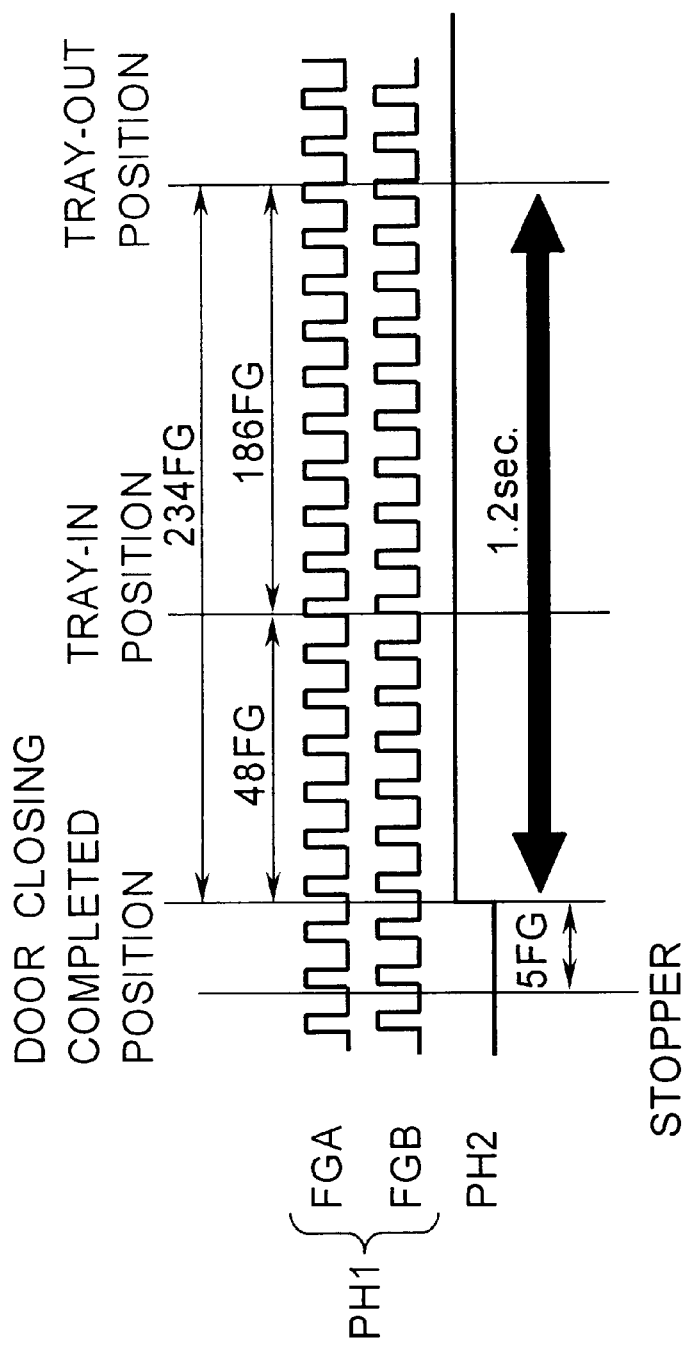

DISK DRIVE APPARATUS

BACKGROUND OF THE INVENTION

1. Field of the Invention

This invention relates to a tray-type disk drive apparatus that is most suitable for application to a CD/DVD player and the like, for example, and more particularly a technical field of a disk mounting segment of a disk tray.

2. Description of the Related Art

As shown in FIG. 49, a general type of disk loading mechanism in a tray-type disk drive apparatus such as CD/DVD player or the like is constructed such that an optical pickup unit 202 is attached at the central upper part of a bottom 201a in a mechanical deck (acting as a reference table for all the mechanisms) 201 called a base chassis in such a manner that the optical pickup unit can be freely ascended or descended. In this case, the optical pickup unit 202 is made such that a spindle motor 204 is vertically installed to face upward on a unit base 203, a disk table 205 is mounted on the upper end of the spindle motor 204 and an optical pickup 208 having an objective lens 207 installed vertically to face upward on a sled 206 through a double-axis actuator is mounted at the upper part of the unit base 203 at a rearward position of the spindle motor 204. Then, this optical pickup unit 202 is mounted at the upper part of the ascending/descending frame 209 through a plurality of rubber insulators 210 in a horizontal manner, a pair of right and left fulcrum pins 211 formed on the same central part at both right and left sides of the rear end of the ascending/descending frame 209 are fitted to a pair of right and left fulcrum pin supporting segments 212 formed at both right and left sides of the rear end of the upper part of the mechanical deck 201 and the front end of the ascending/descending frame 209 can be ascended or descended by an oscillating motion in upward or downward direction against the mechanical deck 201 around a pair of right and left fulcrum pins 211.

Then, a slider cam 213 is vertically attached to the upper portion of the front end of the mechanical deck 201 in such a way that it can be slid in rightward or leftward direction crossing at a right angle with a forward or rearward direction, a cam follower pin 215 formed at the central part of the front end of the ascending/descending frame 209 is slidably engaged with an inclined cam groove 214 formed in slant state to the rear surface of the slider cam 213, a loading motor 216 is attached vertically in upward direction to the lower surface of one side at the front end of the mechanical deck 201, a slider cam driving pinion 217 fixed to the upper segment of the front end of the mechanical deck 201 is engaged with a rack 218 formed at the front surface of the slider cam 213. Then, the slider cam 213 is slid and driven in a rightward or leftward direction through the rack 218 by the pinion 217 normally or inversely rotated and driven by the loading motor 216 through a transmission mechanism 219, thereby the cam follower pin 215 is driven to be ascended or descended in an upward or downward direction by the slant cam groove 214, the front end of the ascending/descending frame 209 is ascended or descended in an upward or downward direction by an oscillating motion around the pair of right and left fulcrum pins 211 against the mechanical deck 201.

Then, a disk tray driving pinion 220 is rotatably attached to the upper part of the other side of the front end of the mechanical deck 201 and the pinion 220 is cooperated with the slider cam driving pinion 217. Then, the disk tray 221 is inserted horizontally from a tray inlet or outlet of a front panel (not shown) fixed to the front end of the mechanical deck 201 into an upper part in the mechanical deck 201, and the disk tray 221 is attached in a horizontal state to be slidable in a forward or rearward direction at the upper part in the mechanical deck 201 over the pinions 217, 220, a transmission mechanism 219, a slider cam 218 and the upper part of the optical pickup unit 202. Then, a rack (not shown) of the disk tray 221 is driven by the disk tray driving pinion 220 normally or inversely driven to rotate by the loading motor 216 through the pinion 217 so as to perform both a loading (a retracting action) into the mechanical deck 201 of the disk tray 221 and an unloading (a drawing-out action) toward a forward side out of the front panel of the mechanical deck 201.

Then, a chucking pulley supporting plate 222 is mounted in a horizontal state at the upper part of position where it is displaced at slight front end sides of both right and left side walls 201b of the mechanical deck 201, a circular chucking pulley fixing hole 223 is formed at a position just above the spindle motor 204 by the chucking pulley supporting plate 222, and a disk-like chucking pulley 224 is rotatably supported within the chucking pulley fixing hole 223 under a state having play in upward or downward direction and horizontal direction.

An entire thickness T1 of the related art disk tray 221 is formed to be thick by more than 15 mm, a deep concave section 225 of approximate inverse frustum of circular cone is formed above position displaced at the front end of the disk tray 221, a large-diameter type disk outer circumferential mounting surface 226 with a diameter of about 12 cm is formed in a circular shape at the outer circumference of the bottom of the concave section 225, a small-diameter type disk outer circumferential mounting surface 227 with a diameter of about 8 cm is formed in a concentric circle shape and in one step-down state at the central side of the bottom of the concave section 225, and a pair of right and left recesses 228 are formed at both right and left side positions of the concave section 225. A large central opening 229 formed from the central part of the concave section 225 toward its rear side is formed at the bottom of the disk tray 221.

Then, at the time of disk loading, the outer circumference of a 12-cm laser disk LD or the like of a CD/DVD and the like is mounted in a horizontal state above a large diameter type disk outer circumference mounting surface 226 with a diameter of about 12 cm within the concave section 225 of the disk tray 221, two pinions 217, 220 are normally driven to rotate under a normal rotational driving of the loading motor 216, the disk tray 221 is loaded (retracted) in a horizontal state into a retracted position in the mechanical deck 201, thereafter the slider cam 213 is slid and driven toward one side by the pinion 217, the front end of the optical pickup unit 202 is oscillated upwardly around a pair of right and left fulcrum pins 211 of the ascending/descending frame 209 and the optical pickup unit 202 is lifted from the descended position where it is inclined in a slant forward and lower direction to the ascending position where it keeps a horizontal attitude.

Then, both the disk table 205 of the spindle motor 204 and the objective lens 207 of the optical pickup 208 are inserted from below into the bottom opening 229 of the disk tray 221, the disk table 204 is fitted from below into a center hole LDa of the laser disk LD, the laser disk LD is floated above the disk outer circumference mounting surface 226 of the disk tray 221 and the laser disk LD is chucked with magnet in a horizontal state on the disk table 205 by the chucking pulley 224.

After that, while the laser disk LD is being driven to rotate by the spindle motor 204, the objective lens 207 of the optical pickup 208 is searched in both inner and outer circumferential directions of the laser disk LD by the sled 206 to reproduce (read) data.

In addition, at the time of disk unloading, it performs an opposite operation to that of disk loading and the two pinions 217, 220 are driven to Reversely rotate by reverse rotational driving of the loading motor 216. That is, the slider cam 213 is slid and driven to the other side by the pinion 217, the front end of the optical pickup unit 202 is descended from the ascending position to the descending position by its oscillating motion, the chucking of the laser disk LD with the chucking pulley 224 is released, both disk table 205 and the objective lens 206 are descended downwardly of the central opening 229 of the disk tray 221 and at the same time the outer circumference of the laser disk LD is mounted again in a horizontal state above the large diameter type disk outer circumference mounting surface 226 of the disk tray 221.

After that, the disk tray 221 is unloaded (drawn out) in a horizontal state up to the leading-out position out of the mechanical deck 201 by the pinion 220.

A pair of right and left recesses 228 formed at both right and left sides of the deep concave section 225 of the disk tray 221 are formed so as to facilitate removal of the laser disk LD from within the deep concave section 225. As shown by a dash-single-dot line in FIG. 50, a forefinger HDa of a right hand HD of a right-handed person is inserted from above into the central hole LDa of the laser disk LD, a thumb HDb is inserted from a side into the left side recess 128 to press a part of the outer circumferential surface LDb of the laser disk LD from its lateral side, the laser disk LD is held with both forefinger HDa and thumb HDb and the disk can be easily taken out above the concave section 225.

However, the structure as found in the related art disk tray 212 in which a thickness T1 is made thick, a deep concave section 225 of inverse frustum of circular cone is formed, a disk outer circumference mounting surface 126 is formed at a bottom of the concave section 225 and at the same time a pair of recesses 128 are formed at both right and left sides of the concave section 225 had difficulty in making the disk tray 212 thin and had an inconvenience in loading/unloading of the laser disk LD against the disk outer circumference mounting surface 126 at the bottom in the concave section 225.

That is, as illustrated in FIG. 50, in order to hold the laser disk LD by a forefinger HDa and a thumb HDb and remove it from the apparatus in such a way that a forefinger HDa of a hand HD is inserted into the central hole LDa of the laser disk LD, and a part of the outer circumferential surface LDb of the laser disk LD is pressed with a thumb HDb, the thumb HDb must be inserted into any one of a pair of right and left recesses 238, resulting in that an inserting direction of the hand HD against the disk tray 221 is restricted. Accordingly, the related art had an inconvenience that the loading/unloading of the laser disk LD could not be performed while the inserting direction of the hand HD against the disk tray 221 was being freely varied.

SUMMARY OF THE INVENTION

The present invention has been invented in order to solve the aforesaid problem and it is an object of the present invention to enable an orientation of hand in respect to the disk tray to be freely changed in a desired direction when the disk recording medium is loaded/unloaded against the disk tray.

The disk drive apparatus of the present invention for accomplishing the aforesaid object is made such that the disk outer circumference mounting surface of the disk tray is made in flush with the upper surface of the disk tray or higher than the upper surface, or lowered by an amount of depth smaller than the thickness of the disk-like recording medium or the disk outer circumference mounting surface is constituted by a plurality of protuberances.

In the disk drive apparatus of the present invention constructed as described above, the disk-like recording medium can be held easily with a hand utilizing a substantial entire circumference of thickness of the disk-like recording medium when the disk-like recording medium is loaded/unloaded against the disk tray, so that when the disk-like recording medium is loaded/unloaded in respect to the disk tray, the hand inserting direction against the disk tray can be changed freely and loading/unloading of the disk-like recording medium can be performed quite easily. Then, a substantial quite thin formation of the disk tray can be attained, adhesion of dust to the disk-like recording medium or the like can be substantially improved and further dropout at the time of data recording and/or data reproduction can be prevented. In addition, there is provided a disk holding segment capable of holding the disk-like recording medium against the disk tray in a substantial parallel state and this disk holding segment enables the disk drive apparatus to be used in a vertical orientation. In addition, a circular contour line is formed at an outer circumference of the disk outer circumference mounting surface or a plurality of disk guides are colored in dark color and the position of the disk outer circumference mounting surface can easily be acknowledged.

BRIEF DESCRIPTION OF THE DRAWINGS

FIG. 3 is a perspective view for showing a disk drive apparatus assembled into the CD/DVD player of FIG. 2 and for illustrating an unloading state of the disk tray.

FIG. 29 is a front elevational view, a top view, a rear view, a right side view and a left side view for illustrating an opening/closing door.

FIG. 30A is a side elevational view in vertical section for illustrating an opening/closing door and a tray loading/unloading port.

FIG. 30B is a top plan view in section taken along arrow line F—F.

FIG. 31 is a block diagram for illustrating a loading motor control circuit.

FIG. 32 is a waveform view for illustrating an FG pulse of a photo-interrupter in the loading motor control circuit of FIG. 31.

DESCRIPTION OF THE PREFERRED EMBODIMENTS

Figure 1:
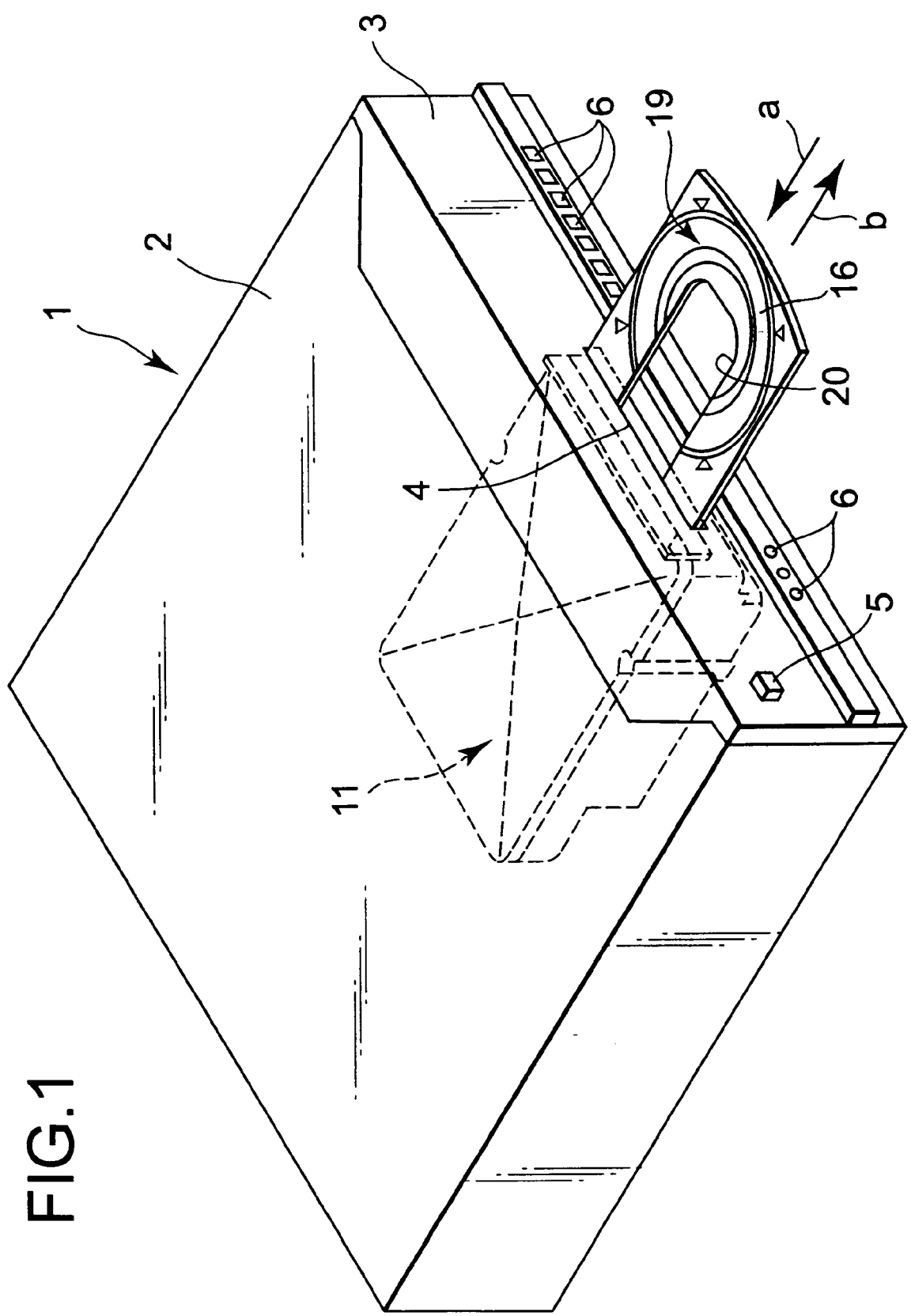
FIG. 1 is a perspective view for showing an entire CD/DVD player to which the present invention is applied and for illustrating an unloading state of a disk tray.

Referring now to FIGS. 1 to 48, some preferred embodiments in which the present invention is applied to a CD/DVD player will be described in the following orders.

(1) Description of summary of a CD/DVD player (FIGS. 1 to 4B)
(2) Description of a disk drive apparatus (FIGS. 5 to 30B)
(2-1) Description of a mechanical deck and an optical pickup unit
(FIGS. 5 to 13)
(2-2) Description of a tray ascending/descending unit
(FIGS. 5 to 15, FIGS. 23 to 28)
(2-3) Description of a tray guide mechanism of a tray ascending/descending unit
(FIGS. 8, 9, 14 to 19)
(2-4) Description of a loading drive mechanism
(FIGS. 5 to 25)

(2-5) Description of a tray loading/unloading port opening/
closing device (an opening/closing door mechanism)
(FIGS. 26 to 30B)
(2-6) Description of a tray loading/unloading port and a
tapered surface of an opening/closing door
(FIGS. 29 and 30)
(2-7) Description of a loading drive mechanism
(3) Description of a loading motor control circuit
(FIGS. 21 to 25, FIGS. 31 to 34)
(4) Description of a disk mounting part of a disk tray
(FIGS. 35 to 48)

(1) Description of Summary of CD/DVD Player

At first, referring to FIGS. 1 to 4, a summary of a CD/DVD player will be described as follows. This CD/DVD player 1 is constituted as a super-audio CD/DVD player and a disk drive apparatus 11 is removably mounted at a substantial central position inside the large-sized set casing 2 and at a position near inside a front panel 3. Then, a slit-like tray loading/unloading port 4 is formed at a substantial central part of the front panel 3 in a horizontal state, and the front panel 3 is provided with many switches 6 such as an eject switch, other various adjustment switches, and volumes in addition to a power switch 5.

Then, the disk drive apparatus 11 is in substantial box shape, constituting a base chassis, wherein a substantial box-shaped drive apparatus main body 14 is constituted by the mechanical deck 12 and a mechanical deck cover 13 removably attached to the upper part of the mechanical deck 12 with screws, and the front surface of the drive apparatus main body 14 is formed with a horizontal opening 15.

Then, the disk tray 16 loaded or unloaded through this opening 15 in arrow directions (a), (b) in a horizontal direction is supported in a horizontal state within the tray ascending/descending unit 17 to be described later, and the tray ascending/descending unit 17 is assembled in such a way that it can freely be ascended or descended in arrow directions (c), (d) of vertical directions under its horizontal motion while keeping its horizontal state within the mechanical deck 12.

Then, an opening/closing door 18 is attached in a horizontal state above the front end of the tray ascending/descending unit 17, and this opening/closing door 18 can be loaded or unloaded in arrow directions (e), (f) in a horizontal forward or rearward direction. The upper part of the disk tray 16 is provided with a disk mounting part 19 for selectively mounting in a horizontal state laser disks LD with diameters of 12 cm and 8 cm as described later, and a central opening 20 recessed from the central part of the disk mounting part 19 in a rearward direction.

Then, as described later, the optical pickup unit is directly mounted on the bottom in the mechanical deck.

Then, at the time of loading the disk into this CD/DVD player 1, at first, as shown by a solid line in FIG. 3, the disk tray 16 pulled out of the disk drive apparatus 11 in an arrow direction (b) is further pulled out through the tray loading/unloading port 4 of the front panel 3 of the CD/DVD player 1 in an arrow direction (b). Then, as described later, after the laser disk is mounted on the disk tray 16 in a horizontal state, the disk tray is retracted in a horizontal state in an arrow direction (a) as viewed in FIG. 1, the disk tray 16 is further retracted in a horizontal state in the arrow direction (a) up to the retracted position within the disk drive apparatus 11 indicated by a dash-single-dot line in FIG. 3.

Then, the disk tray 16 is ascended by the tray ascending/descending unit 17 from its ascended position indicated by a dotted line in FIG. 4 to its descended position indicated by a dash-single-dot line in a horizontal state in an arrow direction (c), and as described later, the laser disk is chucked on the spindle motor of the optical pickup unit.

Figure 4A:
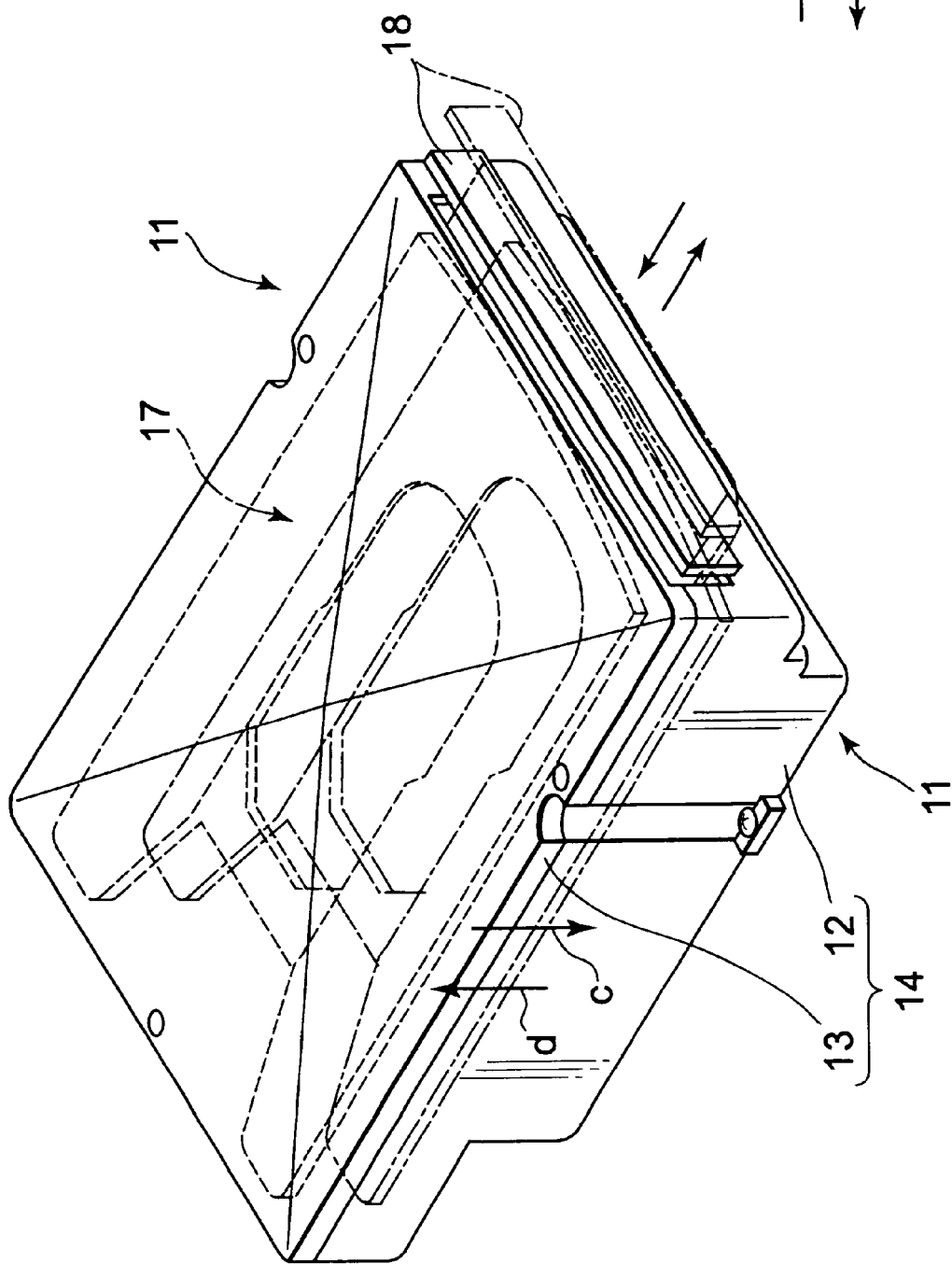
FIG. 4A is a perspective view for showing an entire disk drive apparatus of FIG. 3 and illustrating a loading state of the disk tray.

Then, as the disk tray 16 is descended from its ascended position to its descended position by the tray ascending/descending unit 17 in an arrow direction (c), the opening/closing door is descended from its ascended position indicated by a solid line in FIG. 3 to the descended position indicated by a dash-single-dot line in an arrow direction (c) and at this time, as shown by a dash-single-dot line in FIG. 4A, the opening/closing door 18 is descended to the same height position as that of the tray loading/unloading port 4 of the front panel 3.

Figure 4B:
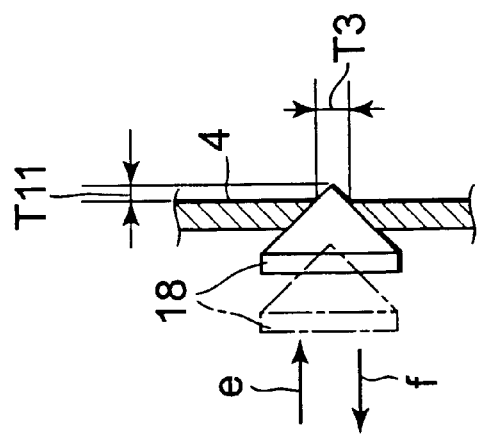
FIG. 4B shows its enlarged part in section.

Then, after this operation, the opening/closing door 18 is pushed out in a horizontal state in an arrow direction (e) from its rearward position indicated by a dash-single-dot line in FIG. 4A to its forward position indicated by a solid line, the tray loading/unloading port 4 is sealingly closed (a state where the door 18 is closed) from inside the front panel 3 as indicated by the solid line in FIG. 4B and a series of disk loading operations is finished.

A thickness T2 of the disk tray 16 is constituted to be quite thin of about 4 mm and a vertical width T3 of the tray loading/unloading port 4 is also constituted to be correspondingly quite low to about 8 mm. However, the vertical width T3 of the tray loading/unloading port 4 is made to be slightly large in view of a relation of four disk guides on the disk tray 16 to be described later.

Figure 2:
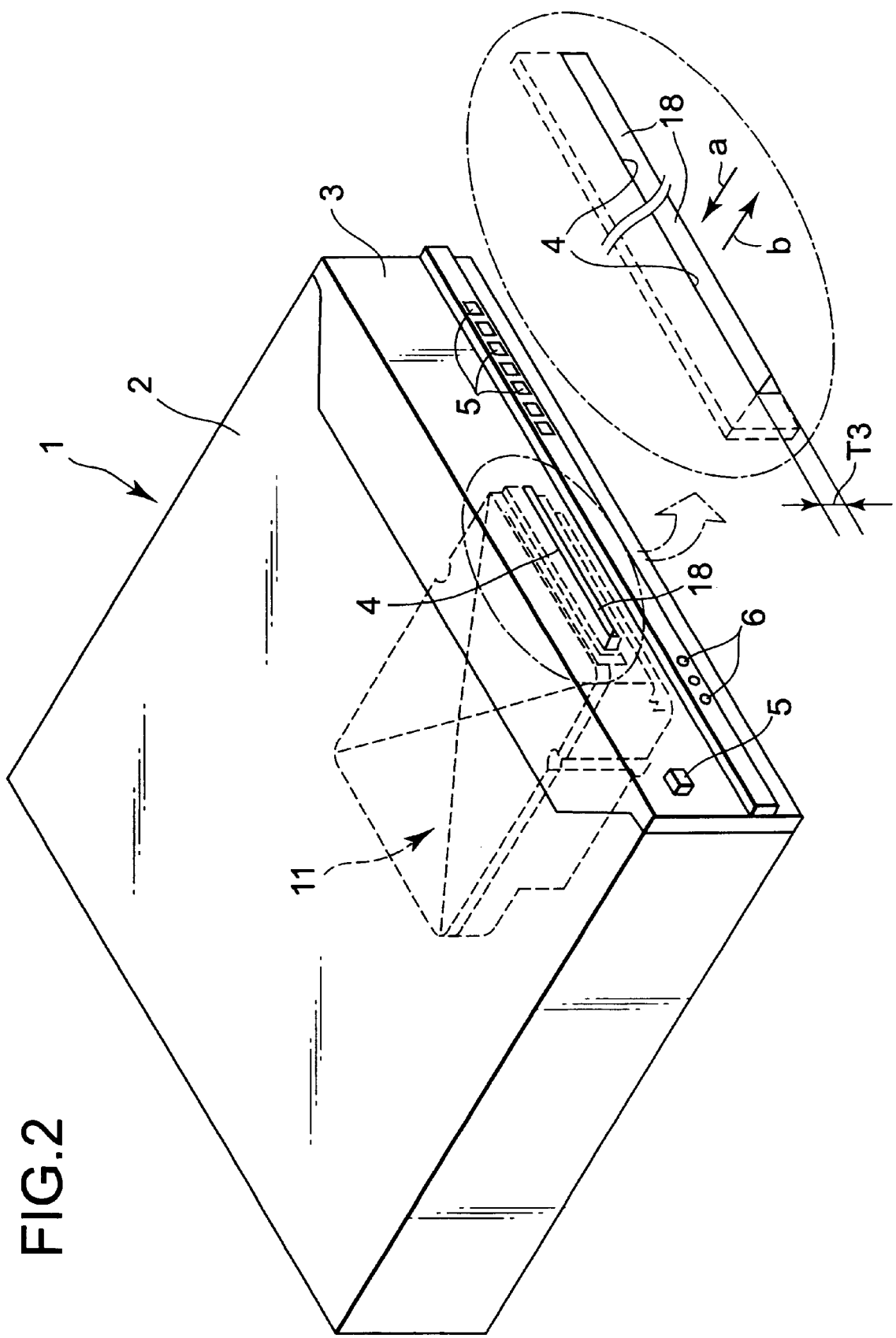
FIG. 2 is a perspective view for showing an entire CD/DVD player of FIG. 1 and illustrating a loading state of the disk tray and its enlarged part.

As described later, two inner surfaces of the tray loading/unloading port 4 in vertical and lateral directions are formed as tapered surfaces and the front surface of the opening/closing door 13 is also formed as tapered surfaces in two directions of vertical direction and lateral direction. Then, as shown in FIGS. 2 and 4B, a door closing structure of quite new design has been employed in which a central extremity end portion at the front surface of the opening/closing door 13 (a ridge line portion between the tapered surface of vertical direction and the tapered surface of lateral direction) is projected from the tray loading/unloading port 4 in a forward direction of the front panel 3 by an amount corresponding to a projecting amount T11 more than several millimeters so as to sealingly close the tray loading/unloading port 4 from inside.

At the time of disk unloading operation, this operation is performed in an order opposite to that of the aforesaid operation. That is, after the opening/closing door 18 is retracted in the arrow direction (f) to open the tray loading/unloading port 4 as viewed in FIG. 4, the tray ascending/descending unit 17 is ascended in a direction of an arrow (d) as viewed in FIG. 4. Then, the disk tray 16 is pulled out in a direction of an arrow (b) as viewed in FIG. 3 and the disk tray 16 is pulled out of the tray loading/unloading port 4 up to an outside part of the front panel 3 in a direction of arrow (b) as shown in FIG. 1.

Figure 5:
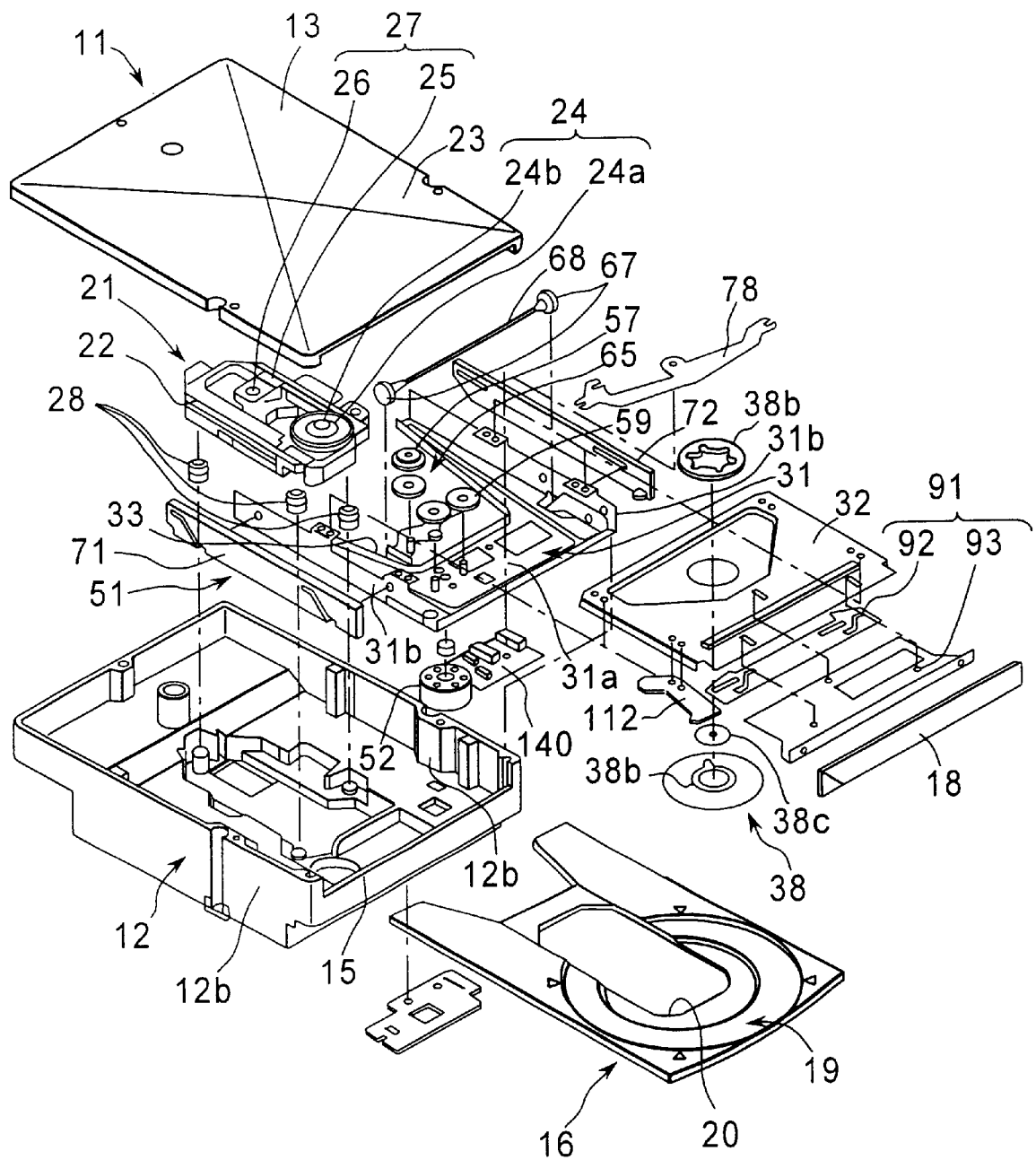
FIG. 5 is an exploded perspective view for showing an entire disk drive apparatus of FIG. 4.
Figure 6:
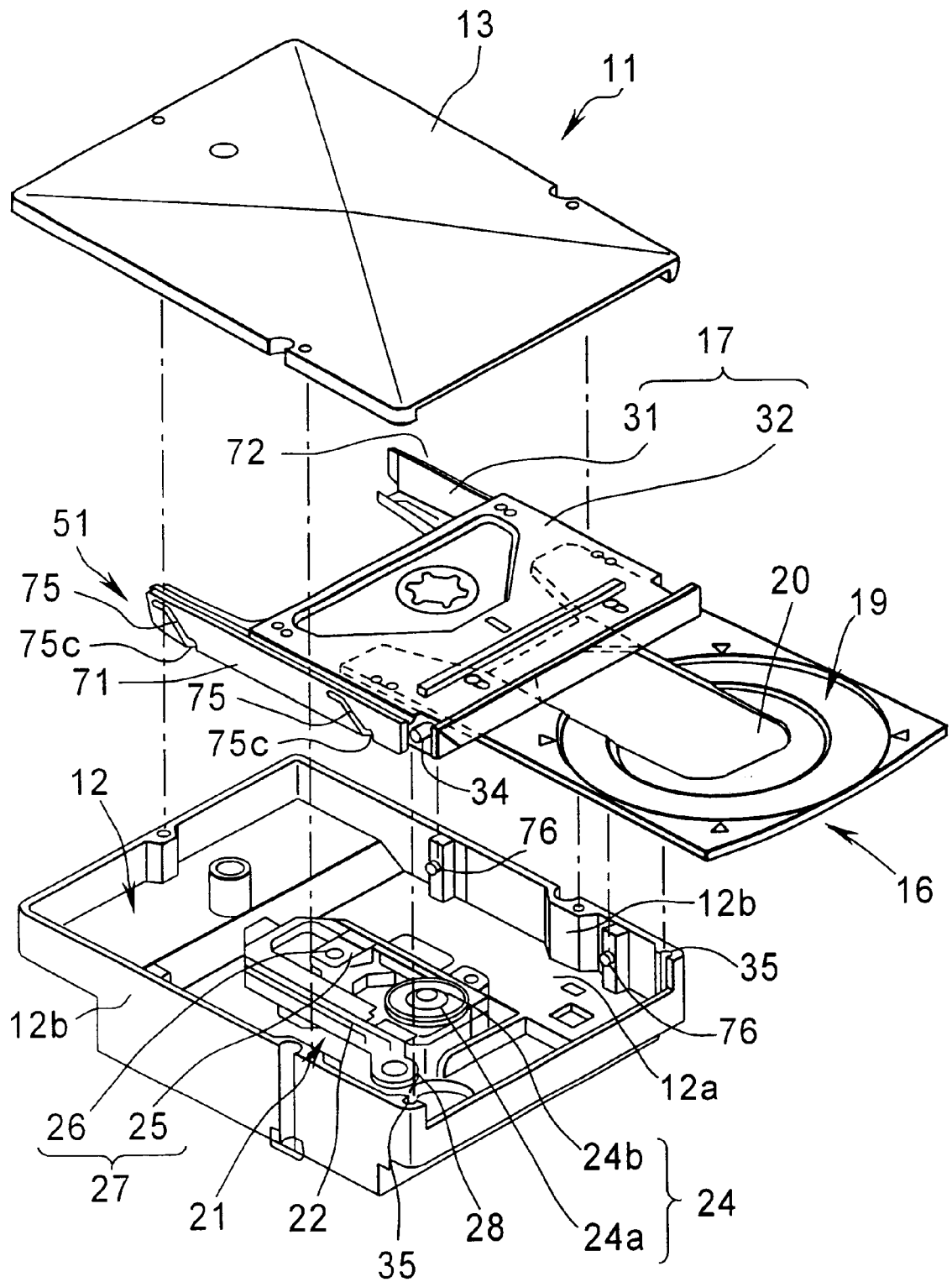
FIG. 6 is an exploded perspective view for showing a mechanical deck, a tray ascending/descending unit and a mechanical deck cover of the disk drive apparatus of FIG. 5.

(2) Description of the Disk Drive Apparatus
(2-1) Description of the Mechanical Deck and the Optical Pickup Unit Then, referring to FIGS. 5 to 30, the disk drive apparatus 11 will be described. At first, as shown in FIGS. 5 and 6, the mechanical deck 12 and the mechanical deck cover 13 are made of synthetic resin capable of attaining high rigidity and high anti-vibration, for example, BMC resin (thermosetting resin having as its major substance non-saturated polyester resin and filled with filling material such as calcium carbonate or the like).

Then, as shown in FIGS. 5 to 13, an optical pickup unit 21 acting as data recording and/or data reproducing means is directly mounted removably in a horizontal state above the substantial central part of a bottom 12a of the mechanical deck 12. This optical pickup unit 21 is constructed such that a spindle motor 23 is mounted above the unit base 22 in an upward vertical state, a disk table 24 is arranged at the upper end of the motor shaft 23a of the spindle motor 23, the optical pickup 27 having the objective lens 26 attached in an upward vertical manner through the double-axis actuator is mounted above the unit base 22 at the rearward position of the spindle motor 23. Then, the unit base 22 of the optical pickup unit 21 is attached in a horizontal state on the bottom 12a of the mechanical deck 12 by a plurality of set screws 29 through a plurality of insulators 28 made of rubber or the like. A centering part 24a of frustum of circular cone is formed at the central upper part of the disk table 24, and a magnet 24b for magnetic chucking is embedded in a horizontal state in the centering part 24a.

(2-2) Description of the Tray Ascending or Descending Unit

Then, as shown in FIGS. 5 to 15, and 23 to 28, a tray ascending/descending unit 17 constituting the ascending/descending drive mechanism for chucking or unchucking the laser disk LD against the spindle motor 23 is assembled at the front end side position of the mechanical deck 12 by a parallel motion while its horizontal state being kept in the directions of arrows (c), (d) in the vertical direction.

Then, this tray ascending/descending unit 17 has a unit base 31 constituted by a light metal plate such as an aluminum plate or the like and with its vertical sectional shape being formed into a substantial U-shape and a horizontal unit cover 32, and the unit cover 32 is attached in a horizontal state by a plurality of set screws between the upper ends of both right and left side walls 31b raised upwardly in a vertical manner from both right and left sides of the bottom plate 31a of the unit base 31. The rear central part of the horizontal bottom plate 31a of the unit base 31 is formed with a large opening 33 of diverging shape in a rearward direction (a direction of the arrow (a)). A pair of right and left guide pins 34 are fixed in a horizontal state to both right and left sides of the front ends of both right and left side plates 31b of the unit base 31, these right and left guide pins 34 are removably inserted from above in the direction of arrow (c) into a pair of right and left vertical guide grooves 35 formed vertically at the front end inside both right and left side walls 12b of the mechanical deck 12 and with their upper ends being released, and these pair of right and left guide pins 34 are slidably engaged in a pair of right and left vertical guide grooves 35 in the directions of vertical arrows (c) and (d). Then, the position of the tray ascending/descending unit 17 in the forward or rearward directions (directions of the arrows (a), (b)) against the mechanical deck 12 is restricted by these pair of right and left guide pins 34 and the vertical guide groove 35 and the tray ascending/descending unit 17 is driven to ascend or descend only in the vertical direction (the directions of arrows (c), (d)) under application of parallel motion while keeping its horizontal state against the mechanical deck 12 by a loading drive mechanism to be described later.

Then, as shown in FIGS. 5 to 7, 12 and 13, a concave section 36 of substantial frustum shape in its top plan view is formed at the central part of rear side of the unit cover 32 of the tray ascending/descending unit 17, and a circular chucking pulley fixing hole 37 is formed at the central part of the concave section 36. Then, a disk-like chucking pulley 38 arranged in a horizontal state below the unit cover 32 is rotatably supported under a state in which it has a clearance in the chucking pulley fixing hole in a vertical direction and a horizontal direction. At this time, the chucking pulley 38 is inserted and passed into the chucking pulley fixing hole 37 by an upper cylindrical part 38a at the upper central part from below to upward and it is supported in a hang state above the upper surface of the concave section 36 by the upper flange 38b fixed in a horizontal state at the upper end of the upper cylindrical part 38a. Then, a yoke 38c for use in magnetic chucking is embedded in a horizontal state in the lower end part of the upper cylindrical part 38a.

(2-3) Description of the Tray Guide Mechanism of Tray Ascending or Descending Unit Next, as shown in FIGS. 8 and 9, and 14 to 19, the tray ascending/descending unit 17 is provided with a tray guide mechanism 41, wherein the tray guide mechanism 41 is constituted by a total number of four of horizontal guide pins 42 of each of the right and left pairs inside the front ends (the end parts in the direction of the arrow (b)) of both right and left side walls 31b of the unit base 31, at the positions in the same plane of the vertical intermediate portion and fixed under the opposing states; and a pair of right and left horizontal guide grooves 43 formed in a horizontal state (in parallel to each other) at both right and left side surfaces 16b of the disk tray 16 and with their rear ends (the end portions in the direction of the arrow (a)) being released. Then, a pair of right and left horizontal guide grooves 43 are removably inserted into a total number of four horizontal guide pins 42 of each of pair of right and left guide pins from a front side in a direction of the arrow (a), and the disk tray 16 is slidably attached in the directions of arrows (a), (b) of horizontal direction in respect to the inside of the tray ascending/descending unit 17 under a guiding function by these horizontal guide pins 42 and the horizontal guide groove 43.

A tray stopper 44 formed by a horizontal plate having a small area is pressed and constituted at a slight lower position than that of a pair of guide pins 42 inside one side plate 31b (right side) of the unit base 31, and a pair of forward and rearward vertical guide pins 42 are fixed to the upper part of the tray stopper 44 in a vertical state and along forward and rearward directions (directions of arrows (a), (b)) in one row. Then, one lower surface guide groove 46 formed along a forward or rearward direction (directions of the arrows (a), (b)) at a position near the lower surface 16c of the disk tray 16 and one side surface 16b (the right side) is slidably engaged with these vertical guide pins 45 in the directions of arrows (a), (b), a twisting action of the disk tray 16 in respect to the tray ascending/descending unit 17 within a horizontal plane is prevented under a guiding function by these vertical guide pins 45 and the lower surface guide groove 46 so as to enable the disk tray 16 to be smoothly slid in the directions of arrows (a), (b) in respect to the tray ascending/descending unit 17.

As shown in FIGS. 7, 1, 13 and 19, a stopper pin 47 fixed to one side (the right side) of the rear end of the disk tray 16 from above in a vertical state and projected downwardly can be abutted against the tray stopper 44 from rearward part in a direction of the arrow (b).

(2-4) Description of the Loading Drive Mechanism

Then, as shown in FIGS. 5 to 25, a loading drive mechanism 51 is mounted on the tray ascending/descending unit 17, at first as shown in FIGS. 16 to 18 and 21 to 25, this loading drive mechanism 51 has one loading motor 52 fixed below a position slightly near the other side (the left side) from the central part of the bottom plate 31a of the unit base 31 in an upward vertical state. Then, the motor shaft 53 of the loading motor 52 is projected above the unit base 31 in a vertical state and a drive gear 54 is fixed to an outer circumference of the motor shaft 53. Then, intermediate gears 55, 56 and a pinion 57 engaged in sequence with the drive gear 54 are mounted at the upper left side of the bottom plate 31*a* of the unit base 31, each of these intermediate gears 55, 56 and the pinion 57 is constructed as a reduction gear mechanism of upper and lower stage gears. Then, an initial stage intermediate gear 55 is rotatably attached to an outer circumference of the supporting shaft 58 vertically fixed on the bottom plate 31*a* of the unit base 31, and a next stage intermediate gear 56 and the pinion 57 are rotatably attached to the supporting shaft 60 vertically fixed on the differential arm 59 pivotally arranged in the directions of arrows (g), (h) as viewed in FIG. 23 around the supporting shaft 58 on the unit base 31 and at the outer circumference of the guide shaft 61. Then, the upper end of the guide shaft 61 is projected upwardly from the pinion 57 and a guide roller 63 is rotatably attached to the outer circumference of the upper end of the guide shaft 61.

Figure 17:
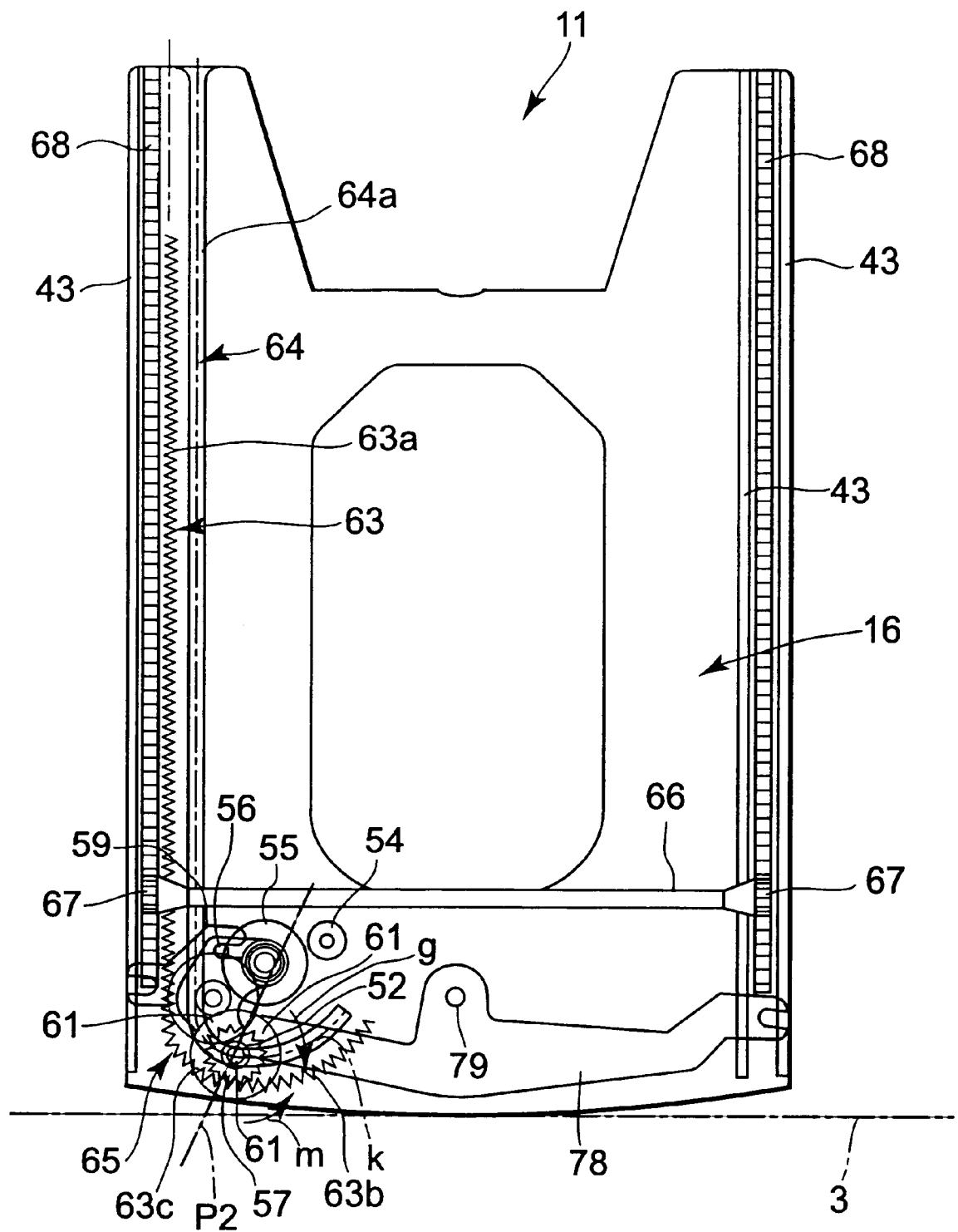
FIG. 17 is a top plan view in perspective state for illustrating a relation between a retraction completed state and a loading drive mechanism.
Figure 18:
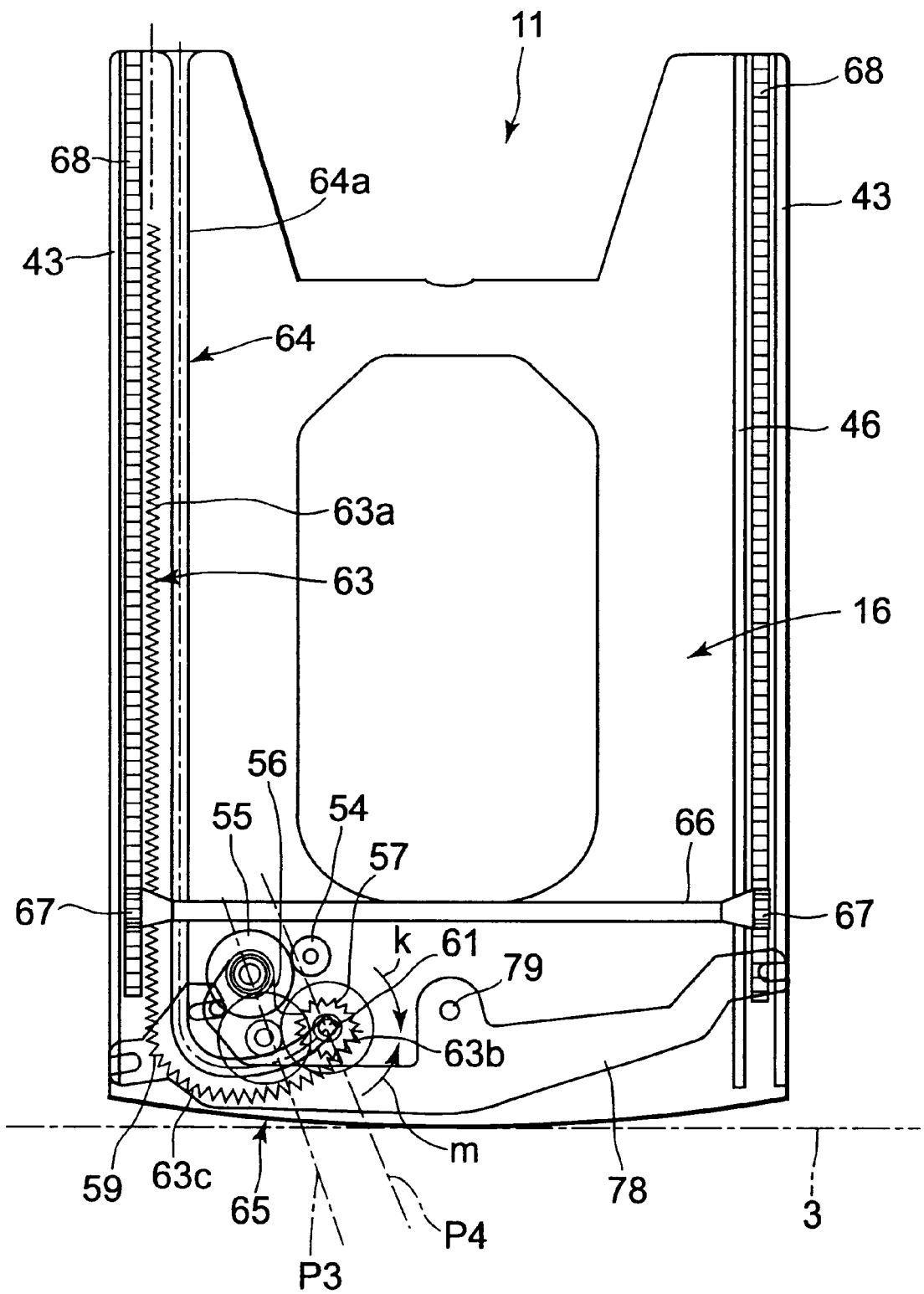
FIG. 18 is a top plan view in perspective state for illustrating a relation between a descending completed state and a loading drive mechanism.
Figure 19:
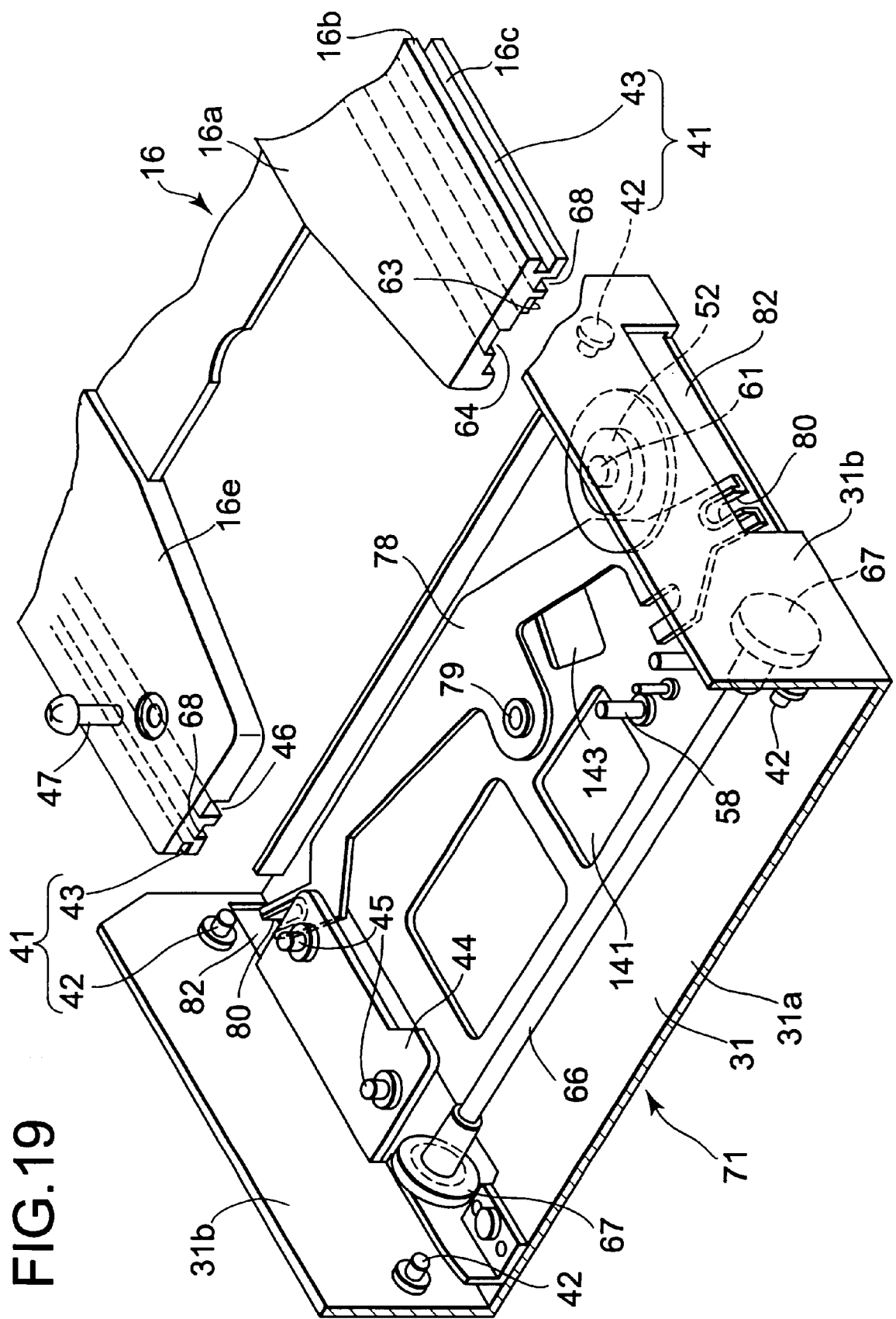
FIG. 19 is a perspective view for illustrating a tray guide mechanism portion of a tray ascending/descending unit.
Figure 20:
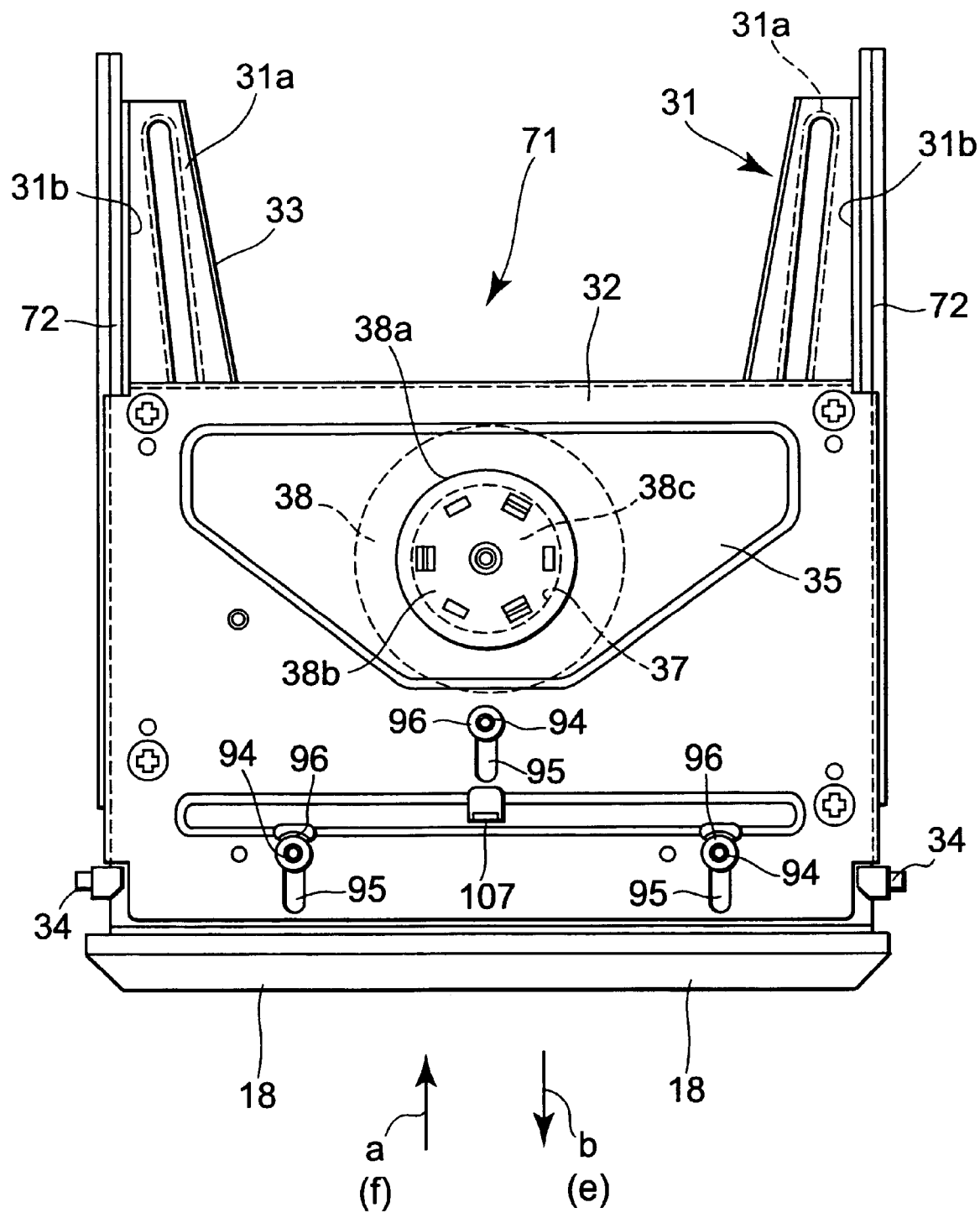
FIG. 20 is a top plan view for showing a tray ascending/descending unit.
Figure 21:
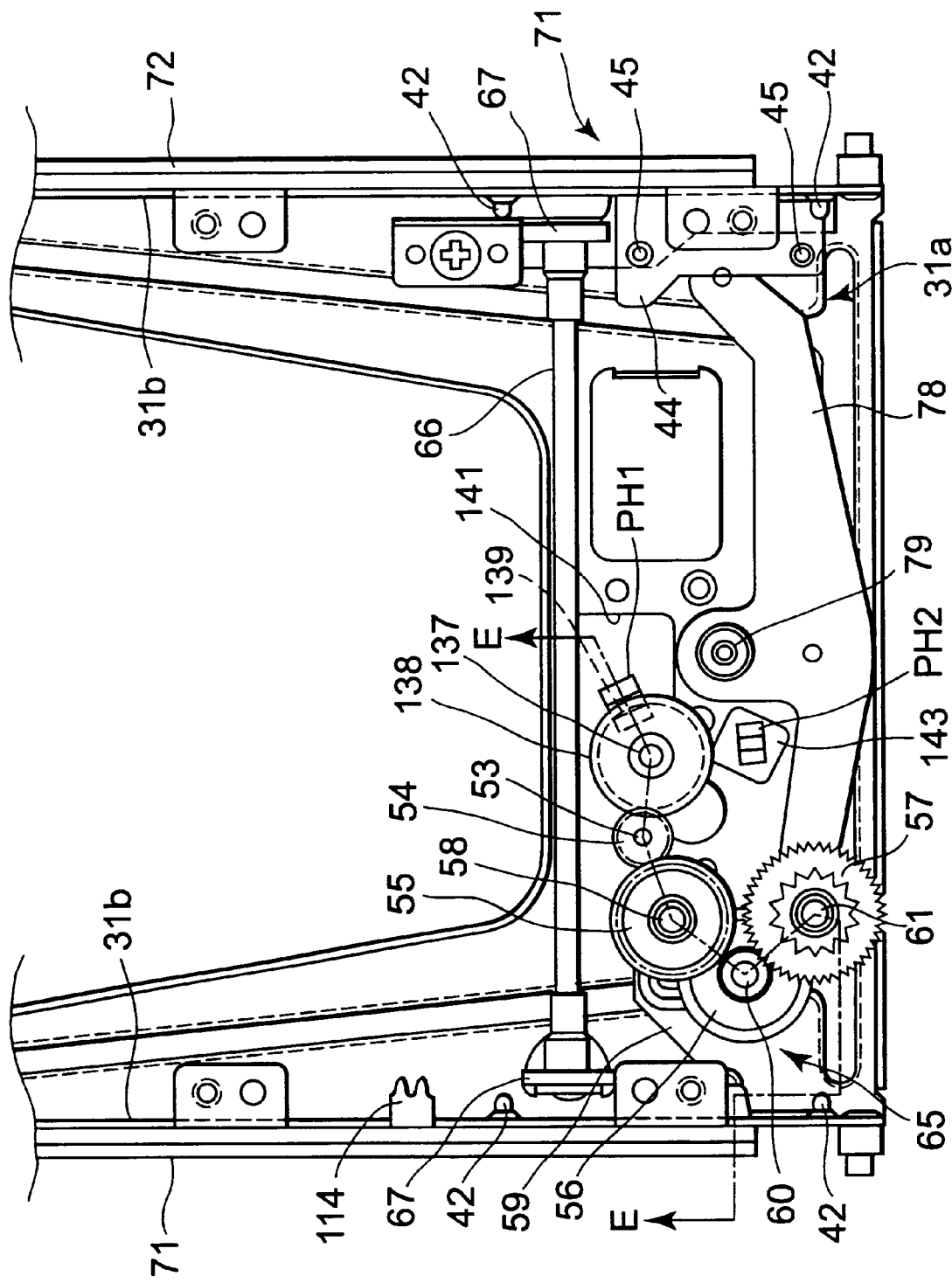
FIG. 21 is an enlarged top plan view with a unit cover of the tray ascending/descending unit being removed.
Figure 22:
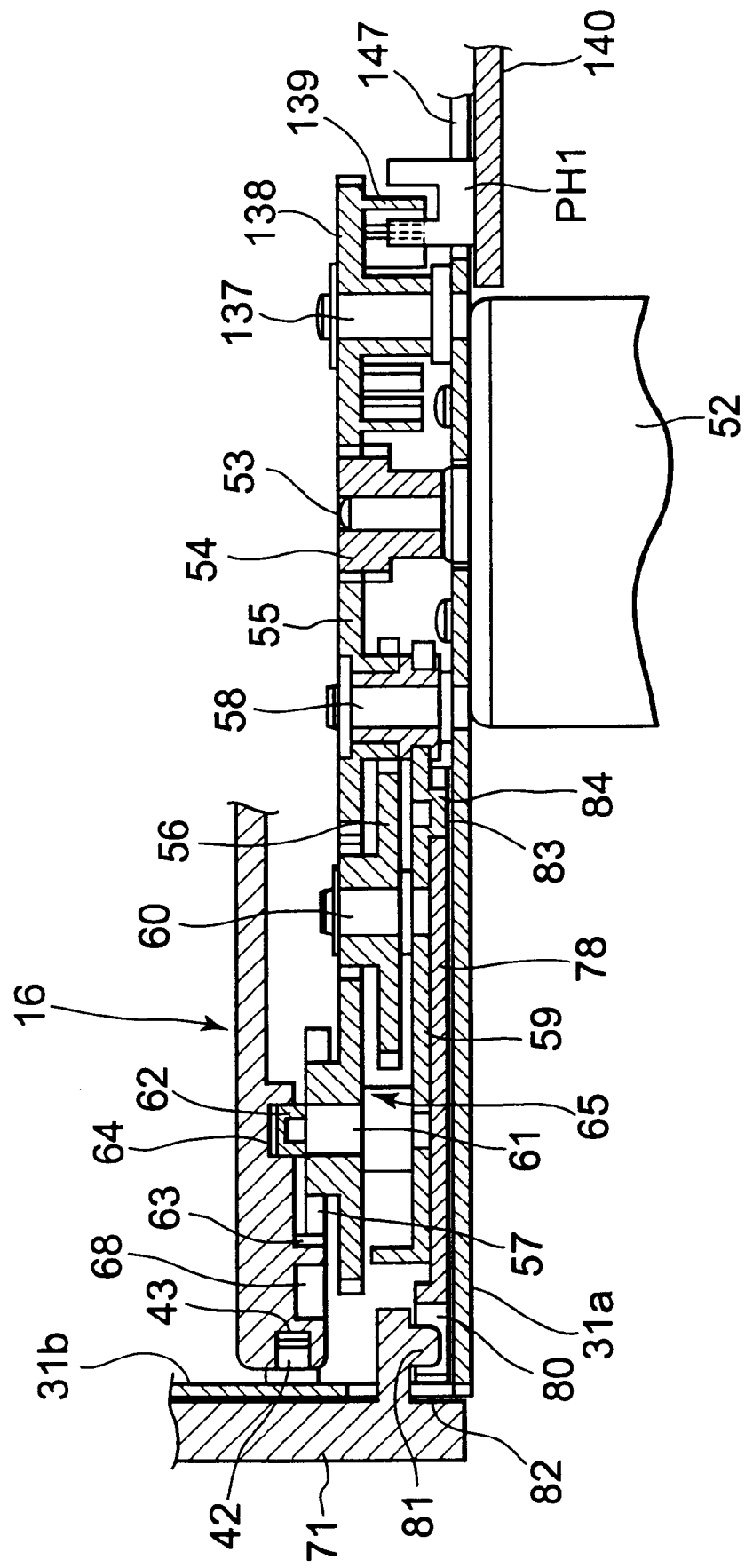
FIG. 22 is a side elevational view in an enlarged section with a part being developed which is taken along line E—E of FIG. 21.
Figure 23:
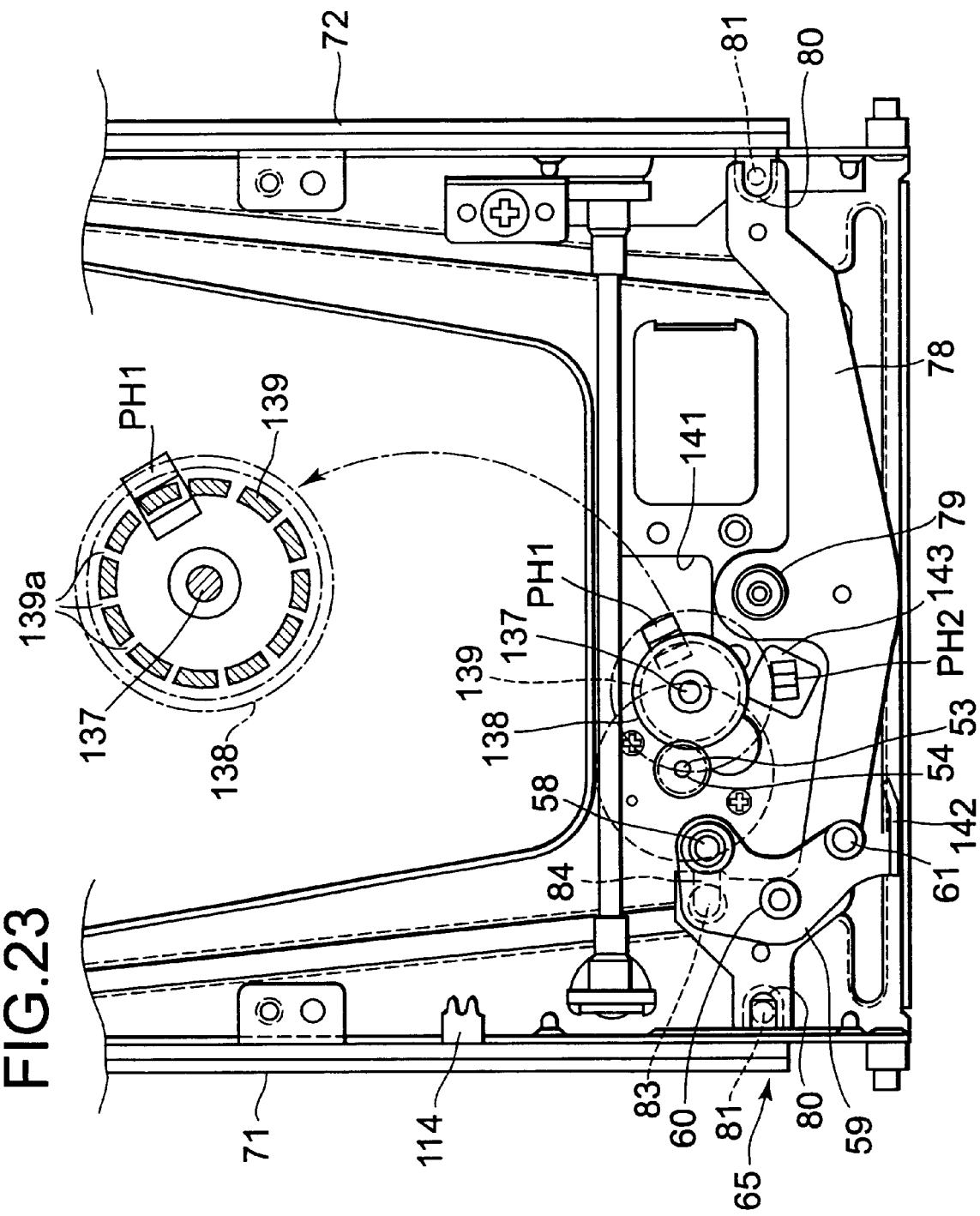
FIG. 23 is a top plan view with a pinion in FIG. 21 being removed.

Then, as shown in FIGS. 14 to 19, a J-shaped rack 63 and a J-shaped guide groove 64 are formed in parallel to each other along a position displaced to the lower surface 16*c* of the disk tray 16 and at the left side surface 16*b*, wherein these J-shaped rack 63 and J-shaped guide groove 64 are entirely formed into a substantial J-shape by linear line parts 63*a*, 64*a* and arcuate parts 63*b*, 64*b* formed continuously at front ends of the linear line parts 63*a*, 64*a*. Then, the rear ends (ends at the direction of the arrow (a)) of these J-shaped rack 63 and J-shaped guide groove 64 are released. Then, as shown in FIG. 19, when the disk tray 16 is inserted in a horizontal state from the direction of the arrow (a) to each of pair of right and left horizontal guide pins 42 in the tray ascending/descending unit 17, the upper end of the guide shaft 61 and the pinion 57 are inserted into and engaged with the J-shaped rack 63 and the J-shaped guide groove 64. However, the upper end of the guide shaft 61 is slidably inserted into the J-shaped guide groove 64 through a guide roller 62.

Then, a differential mechanism 65 is constituted by these pinion 57, differential arm 59, guide shaft 61, J-shaped rack 63 and J-shaped groove 64. However, the J-shaped rack 63 and the arcuate parts 63*b*, 64*b* of the J-shaped guide groove 64 are curved in a quadric curve shape through curved points 63*c*, 64*c*.

As shown in FIGS. 16 to 18 and 21, a horizontal link shaft 66 crossing at a right angle with a forward or rearward direction (the directions of the arrows (a), (b)) is rotatably attached at a position rearward of the differential mechanism 65 above the bottom plate 31*a* of the unit base 31 with both ends being supported, a pair of right and left link gears 67 fixed to both ends of the link shaft 66 are engaged with a pair of right and left link racks 68 formed in parallel to each other along both right and left sides of the lower surface 16*c* of the disk tray 16. In this way, this is constituted such that a pair of right and left link racks 68 of the disk tray 16 are linked by a pair of right and left link gears 67 and the link shaft 66, it is possible to prevent a twisting of the disk tray 16 which may easily be generated at the time of one side driving of one J-shaped rack 63 by the pinion 57 of the differential mechanism 65 and to perform a smooth slidable driving of the disk tray 16 in a forward or rearward direction (the directions of the arrows (a), (b)).

Next, as shown in FIGS. 5 to 15, and 21 to 25, the loading drive mechanism 51 has a pair of right and left slider cams 71, 72 molded by synthetic resin into thick plate structure, wherein these pair of right and left slider cams 71, 72 are arranged in vertical parallel state between both right and left side walls 31*b* of the unit base 31 of the tray ascending/descending unit 17 and both right and left side walls 12*b* of the mechanical deck 12. These pair of right and left slider cams 71, 72 cause a pair of forward or rearward horizontal guide grooves 73 formed in horizontal state along these inner upper ends to be slidably engaged with a pair of forward or rearward horizontal guide pins 74 fixed in horizontal state to the outer upper ends of both right and left side plates 31*b* of the unit base 31, wherein these pair of right and left slider cams 71, 72 are slidably held in the directions of arrows (a), (b) of the forward or rearward direction in respect to the unit base 31.

Then, each of pair of forward or rearward slant cam grooves 75 inclined by about 45° in respect to the forward or rearward direction (the directions of arrows (a), (b)) is formed outside these pair of right and left slider cams 71, 72, respectively. However, the inclination direction of the pair of forward or rearward slant cam grooves 75 of the left slider cam 71 and a slant direction of the pair of forward or rearward slant cam grooves 75 of the right slider cam 72 are set to be opposite to each other. Then, each of the forward or rearward cam pins 76 are fixed in a horizontal state along the same height position at the position displaced at the front end inside both right and left side walls 12*b* of the mechanical deck 12, a pair of forward or rearward slant cam grooves 75 having slant directions of the pair of forward or rearward slant cam grooves 71, 72 to be set in opposite directions to each other are slidably engaged with these cam pins 76 in a vertical slant direction and in opposite directions to each other, and a pair of right and left cam mechanisms 77 are constituted by these slant cam grooves 75 and the cam pins 76.

Figure 7:
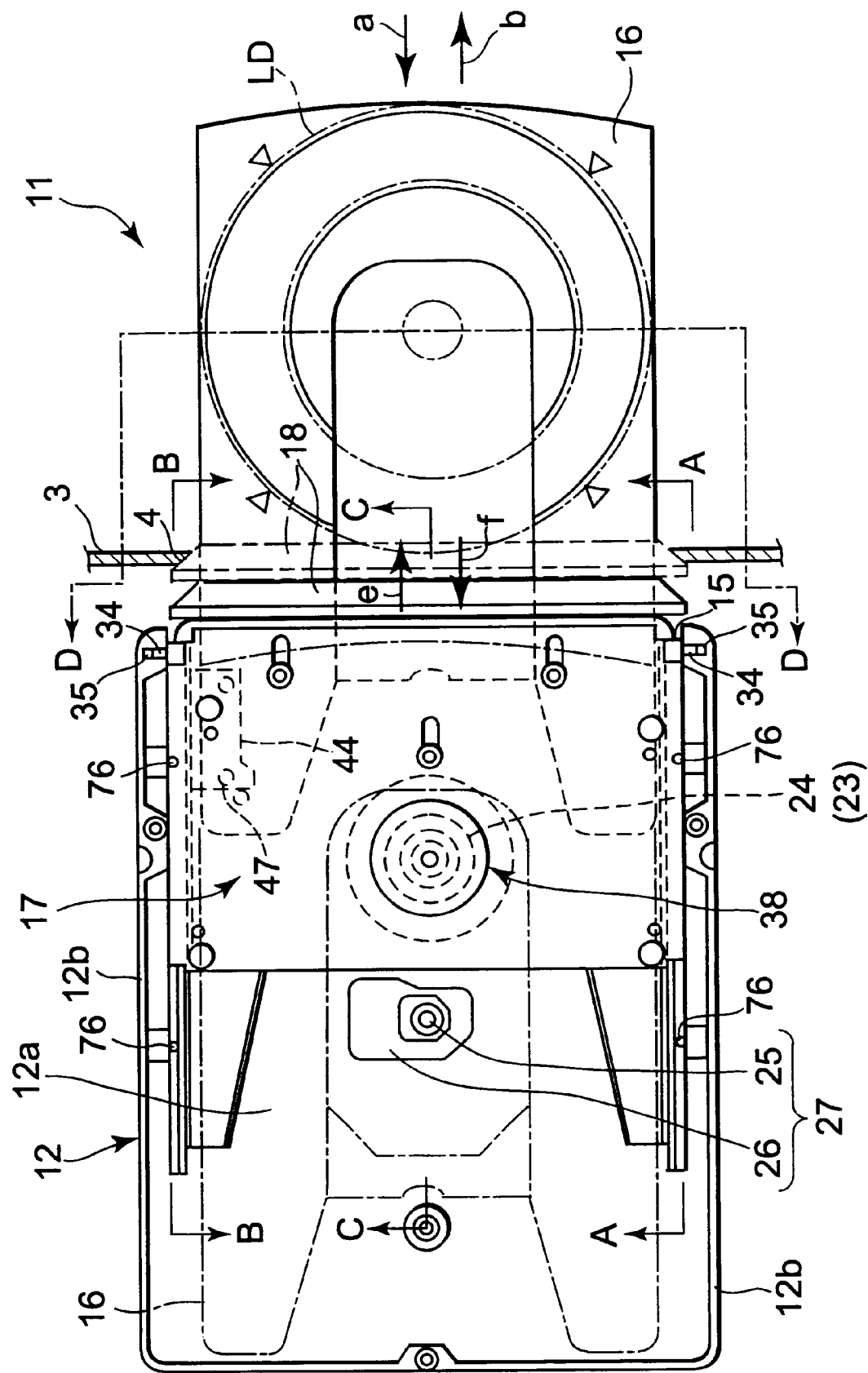
FIG. 7 is a top plan view for showing an unloading state of the disk tray of the disk drive apparatus of FIG. 6 and for illustrating a removed state of the mechanical deck cover.
Figure 8:
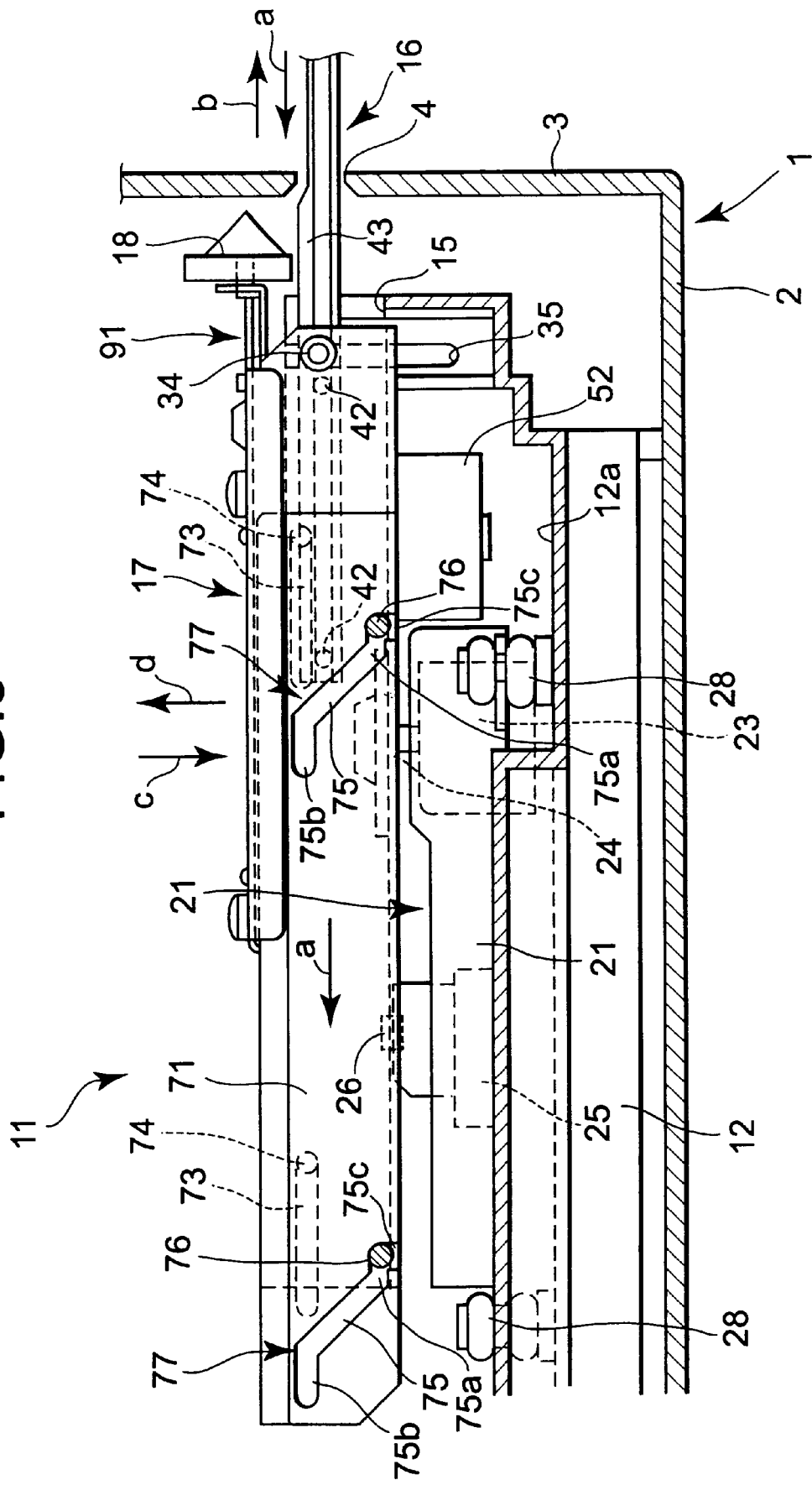
FIG. 8 is a side elevational view with a part being broken away taken along arrow line A—A of FIG. 7.
Figure 9:
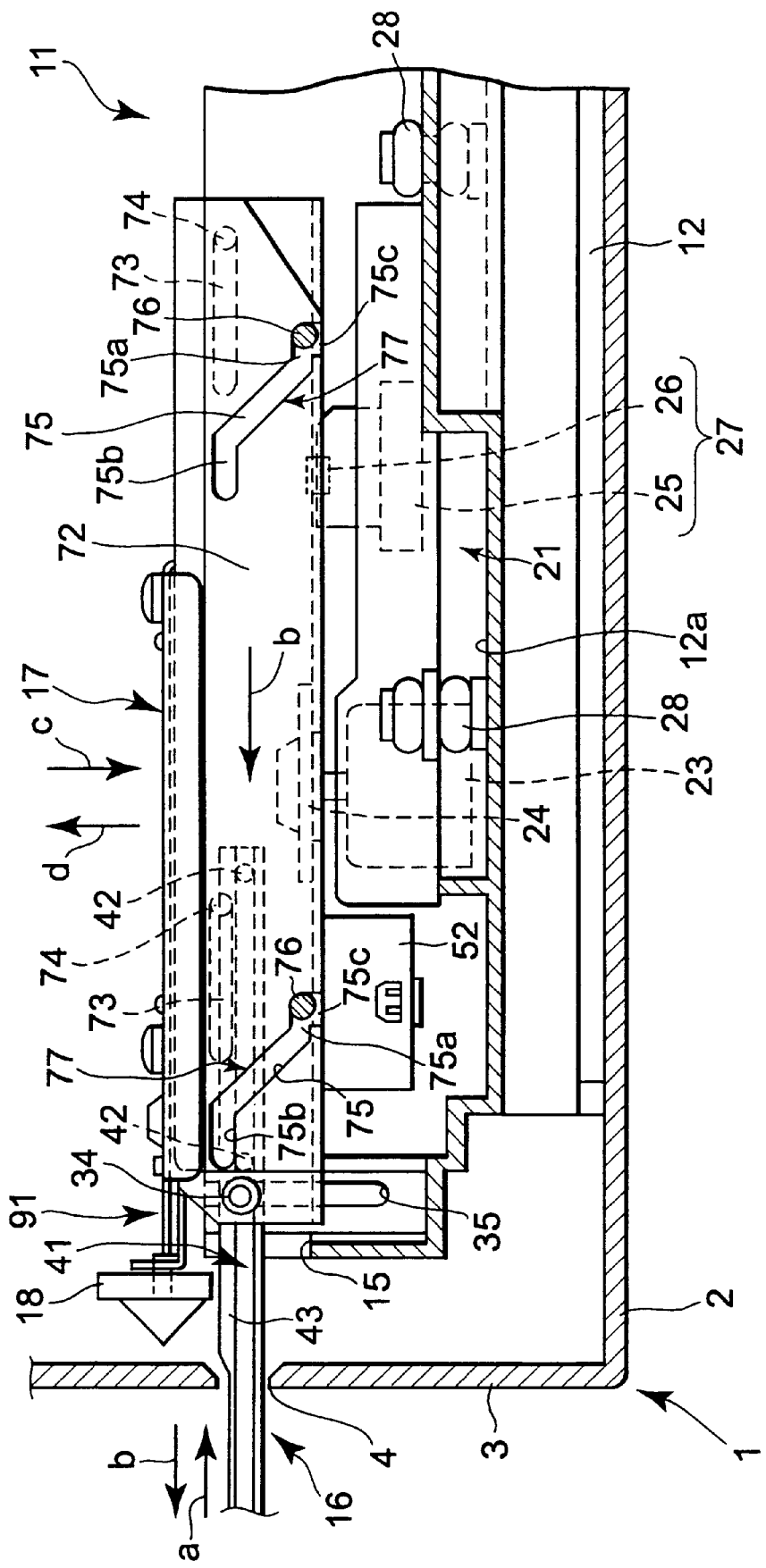
FIG. 9 is a side elevational view with a part being broken away taken along arrow line B—B of FIG. 7.

A lower end 75*a* and a lower end 75*b* of each of the slant cam grooves 75 are bent in a horizontal state in an opposite direction in forward or rearward direction. In particular, these upper ends 75*b* are extended longitudinally in a forward or rearward direction to allow an overstroke described later to be attained. Then, as shown in FIGS. 6 to 9, a lower released part 75*c* is formed at a lower surface of the horizontal lower end 75*a* of each of the forward or rearward slant cam grooves 75 of a pair of right and left slider cams 71, 72. As shown in FIGS. 6 and 7, when the tray ascending/descending unit 17 is inserted from above in a horizontal state into the mechanical deck 12 and assembled, as shown in FIGS. 8 and 9, a pair of right and left guide pins 34 at the front ends of the tray ascending/descending unit 17 are inserted from above into the pair of right and left vertical guide grooves 35 at the front ends of both right and left side walls 12*b* of the mechanical deck 12, and the tray ascending/descending unit 17 can be easily and removably assembled into the mechanical deck 12 only through an insertion of the lower ends 75*a* of a pair of forward or rearward slant cam grooves 75 of the pair of right and left slider cams 71, 72 from above into each of a pair of forward or rearward cam pins 76 of both right and left side walls 12*b* of the mechanical deck 12 by the lower releasing part 75*c*.

Then, as shown in FIGS. 19 to 25, a link arm 78 for use in sliding the pair of right and left slider cams 71, 72 in opposite directions in forward or rearward direction (directions of the arrows (a), (b)) is attached above the bottom plate 31*a* of the unit base 31 of the tray ascending/descending unit 17 in such a way that it can be rotated in the directions of the arrows (i), (j) around the fulcrum pin 79. Then, a pair of link grooves 80 are formed at both right and left ends of this link arm 78, and a pair of right and left link pins 81 integrally molded are slidably inserted inside the front ends of a pair of right and left slider cams 67, 68. In this case, a pair of right and left link pins 81 are inserted into the pair of right and left link grooves 80 through a pair of right and left openings 82 formed at both right and left side plates 31b of the unit base 31.

Then, the differential arm 59 of the differential mechanism 65 is rotatably arranged in its overlapped state at the upper position of the left side portion of the link arm 78, and a link pin 83 protruded downwardly through a semi-pulling work at a part of the lower surface at an adjoining position of a supporting shaft 58 of a rotating fulcrum point of the differential arm 59 is slidably inserted into the link groove 84 formed at one end of the link arm 78. Then, this is constructed such that the differential arm 59 is oscillated around the supporting shaft 58 in the directions of arrows (g), (h), thereby the link arm 78 is rotationally driven around the fulcrum pin 79 through the link pin 83 and the link groove 84 in the directions of arrows (i), (j), and the pair of right and left slider cams 71, 72 are slidably driven through the link groove 81 and the link pin 80 at both right and left ends of the link arm 78 in the directions of arrows (a), (b) that are opposite to each other of the forward or rearward directions.

(2-5) Description of the Tray Loading/Unloading Port Opening or Closing Device

Next, referring to FIGS. 26 to 30, there will described a tray loading/unloading port opening/closing device which is an opening/closing door drive mechanism for opening/closing the tray loading/unloading port 4 of the CD/DVD player 1 illustrated in reference to FIGS. 1 to 4 from inside the front panel 3 with the opening/closing door 18.

This tray loading/unloading port opening/closing device 91 fixes the opening/closing door 18 to the front end of the unit cover 32 of the tray ascending/descending unit 17 in such a way that the door can be loaded or unloaded in the directions of arrows (e), (f) of the forward or rearward direction (provided that the direction of arrow (e)=the direction of arrow (b), the direction of arrow (f)=the direction of arrow (a)).

That is, two slide plates of a door slider 92 and a door slider 93 constituted a by light metal plate such as an aluminum plate or the like are arranged in a horizontal state (in parallel state) below the front end of the unit cover 32 (the end at the direction of arrow (e)). Then, three guide pins 94 are fixed in a vertical manner above the door slider 93 at the lower part and three guide grooves 95 are formed at the front end of the unit cover 32 in parallel with the forward or rearward direction (directions of arrows (e), (f)) Then, these three guide pins 94 pass through the intermediate door slider cam 92 and are slidably passed in the three guide grooves 95 at the unit cover 32 in the directions of arrows (e), (f). Three stopper washers 96 fitted to the upper ends of the three guide pins 94 are slidably mounted on the upper surface of the unit cover 32, and the door slider cam 92 and the door slider 93 are attached slidably in a horizontal state in the lateral direction (directions of arrows (m), (o)) and the forward or rearward direction (directions of arrows (e), (f)) below the unit cover 32 by these three guide pins 94.

Then, the front end edge 93a of the door slider 93 is pressed upwardly in a right angle manner and also in a forward or rearward direction (directions of arrows (e), (f)), and the opening/closing door 18 is supported in a horizontal manner at the front end edge 93a through a pair of right and left horizontal supporting pins 97.

That is, the front ends of the pair of right and left horizontal supporting pins 97 are fixed (for example, light pressed and adhered or the like) at positions near both right and left ends of a rear surface 18b of the opening/closing door 18 in parallel with the forward or rearward direction (the directions of arrows (e), (f)), and these pairs of right and left supporting pins 97 are inserted into and passed through a pair of right and left large diameter holes 98 formed at the front end edge 93a of the door slider 93 in such a way that the pins can be moved in the forward or rearward direction (provided that its diameter should be larger by about 0.5 to 1 mm in respect to the diameter of the supporting pin 97) under a state in which some clearances in vertical direction and lateral direction are left there. Then, a pair of right and left stopper washers 96 are fitted at positions which are more rear side of the front end edge 93a (the direction of arrow (f)) and at the rear ends of these pairs of right and left supporting pins 97. Then, a pair of right and left compression coil springs 100 which constitute resilient pressing members as well as limiter springs are inserted at the outer circumferences of these pairs of right and left supporting pins 97 and between the opening/closing door 18 and the front end edge 93a under a state in which an initial compressive stress is being applied.

Then, the opening/closing door 18 is held at the front side position of the door slider 93 in a horizontal state through a pair of right and left supporting pins 97 by a compressive repelling force of these pairs of right and left compressive coil springs 100. Then, an automatic aligning mechanism 101 at the time of sealing of the tray loading/unloading port 4 to be described later is constituted by a pair of right and left supporting pins 97 supporting the opening/closing door 18, a large diameter hole 98 and a compressive coil spring 100.

Then, a pair of right and left guide grooves 104 directed to be crossed at a right angle with the forward or rearward direction (directions of arrows (e), (f)) formed at the door slider cam 92 are slidably engaged with a pair of right and left guide grooves 104 in a direction crossing at a right angle with the forward or rearward direction (directions of arrows (e), (f)) formed in the door slider cam 92 at a pair of right and left guide pins 103 protruded out by a semi-punching work at the lower surface of the front end side of the unit cover 32. This door slider cam 92 is constituted such that it can be slid in the directions of arrows (n), (o) directing in a lateral direction in respect to the unit cover 32.

Then, the door slider cam 92 is formed with a pair of right and left slant cam grooves 105 inclined by 45° in respect to the forward or rearward direction, and these pair of right and left slant cam grooves 105 are slidably inserted into a pair of right and left guide pins 94 of the door slider 93.

That is, the pair of right and left guide pins 94 are also applied as cam pins against the pair of right and left slant cam grooves 105, and a pair of right and left cam mechanisms 106 acting as an opening/closing door drive mechanism are constituted by these pairs of right and left guide pins 94 and the slant cam grooves 105. The rear end 106a and the front end 106b of these pairs of right and left slant cam mechanisms 106 are bent in parallel with the lateral directions (directions of arrows (n), (o)).

Then, a tension coil spring 109 acting as a slid biasing means is applied between a spring engagement part 107 raised in a vertical manner downwardly from the unit cover 32 and a spring engagement part 108 formed at the rear end of the door slider cam 92. The door slider cam 92 is slidably biased by tensile strength of the tension coil spring 109 from the position indicated in FIG. 28 to the position indicated in FIG. 27 in a direction of arrow (o) which is one side (left direction) against the unit cover 32.

Figure 27:
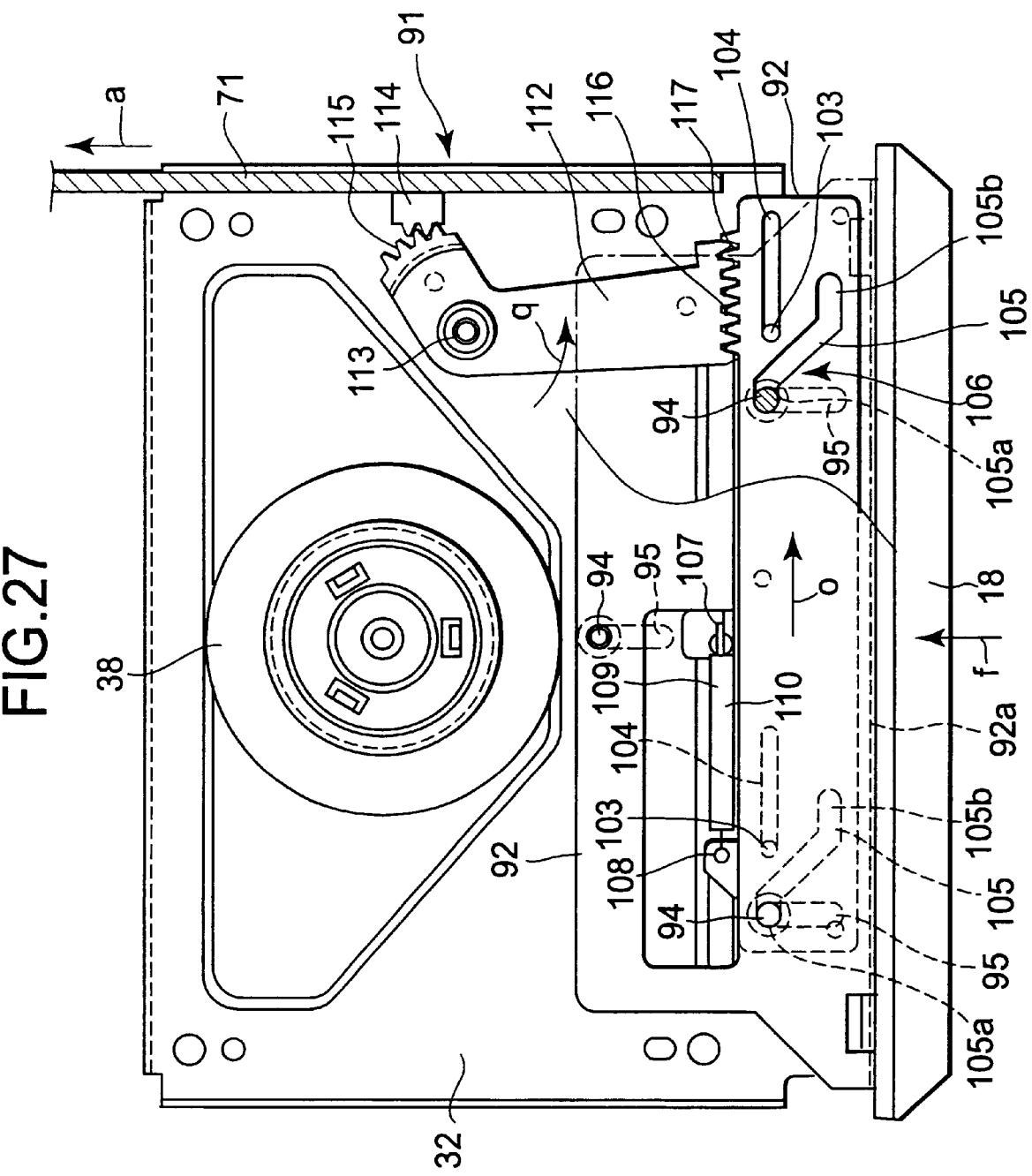
FIG. 27 is a bottom view with a part being broken away to illustrate an operation of a tray loading/unloading port opening/closing device (an opening/closing door driving mechanism) of FIG. 26.

Then, as shown in FIG. 27, the slant cam grooves 105 of a pair of right and left cam mechanisms 106 are slid in the direction of the arrow (o) in respect to the guide pin 95, the door slider 93 is biased to slide through parallel motion in the direction of the arrow (f) at the rear part of the unit cover 32 under a cam action at that time, the opening/closing door 18 is retracted in parallel with the direction of the arrow (f) up to the rear position by the door slider 93. The tension coil spring 109 is stored in the opening part 110 formed at the door slider 93.

Then, the drive mechanism of the tray loading/unloading port opening/closing device 91 is operated also by the aforesaid loading drive mechanism 51.

That is, the door drive arm 112 is attached at one side (left side) of the lower surface of the unit cover 32 and at the rear position of the door slider cam 92 in such a way that it can be rotated in the directions of arrows (p), (q) of the lateral direction and the forward or rearward direction through a fulcrum pin 113. Then, a small rack 114 is integrally molded inside the upper part of the front end side of one (left side) slider cam 71, and a partial gear 115 formed at the rear end of the door drive arm 112 is driven by the small rack 114 in the forward or rearward direction (directions of arrows (a) (b)). Then, the partial gear 116 formed at the front end of the door drive arm 112 is engaged with the rack 117 in parallel with the directions of arrows (p), (q) formed at one side (left side) of the rear end of the door slider cam 92. Then, the door drive arm 112 is rotationally driven around a fulcrum pin 113 in the directions of arrows (p), (q) through the small rack 114 and the partial gear 115 under a sliding motion of the slider cam 71 in the directions of arrows (a), (b), and the door slider cam 92 is slidingly driven by the door drive arm 112 in the directions of arrows (n), (o) through the partial gear 116 and the rack 117.

(2-6) Description of Tray Loading/Unloading Port and Tapered Surface of Opening or Closing Door Then, as shown in FIGS. 29 and 30, tapered surfaces 121, 122 in the two directions of vertical direction and lateral direction formed in a conical shape from a rear surface side of the front panel 3 are formed at the inner surface of a slit-like horizontal tray loading/unloading port 4 formed at the front panel 3 of the CD/DVD player 1, wherein this tray loading/unloading port 4 is formed into a prismoid of substantial rectangular shape as viewed from the rear surface of the front panel 3.

In turn, tapered surfaces 123, 124 in the two directions of vertical direction and lateral direction are formed at a front surface 18a of the opening/closing door 18 in the same angle as that of the inner tapered surfaces 121, 122 of the tray loading/unloading port 18. The front surface 18a of the opening/closing door 18 is formed into a rectangular pyramidal shape. Accordingly, a horizontal ridge line part 125 is formed at the central part in a vertical direction of the front surface 18a of the opening/closing door 18.

Then, as shown in FIGS. 29A and 29B, the horizontal ridge line 125 at the front surface central part of the opening/closing door 18 is protruded in front of the front panel 3 at the central part of the tray loading/unloading port 4 in such a way that the tapered surfaces 123, 124 of the opening/closing door 18 are closely contacted with the tapered surfaces 121, 122 of the tray loading/unloading port from the direction of arrow (b) when the tray loading/unloading port 4 is sealingly closed from inside with the opening/closing door 18.

(2-7) Description of Operation of Loading Drive Mechanism

Figure 14:
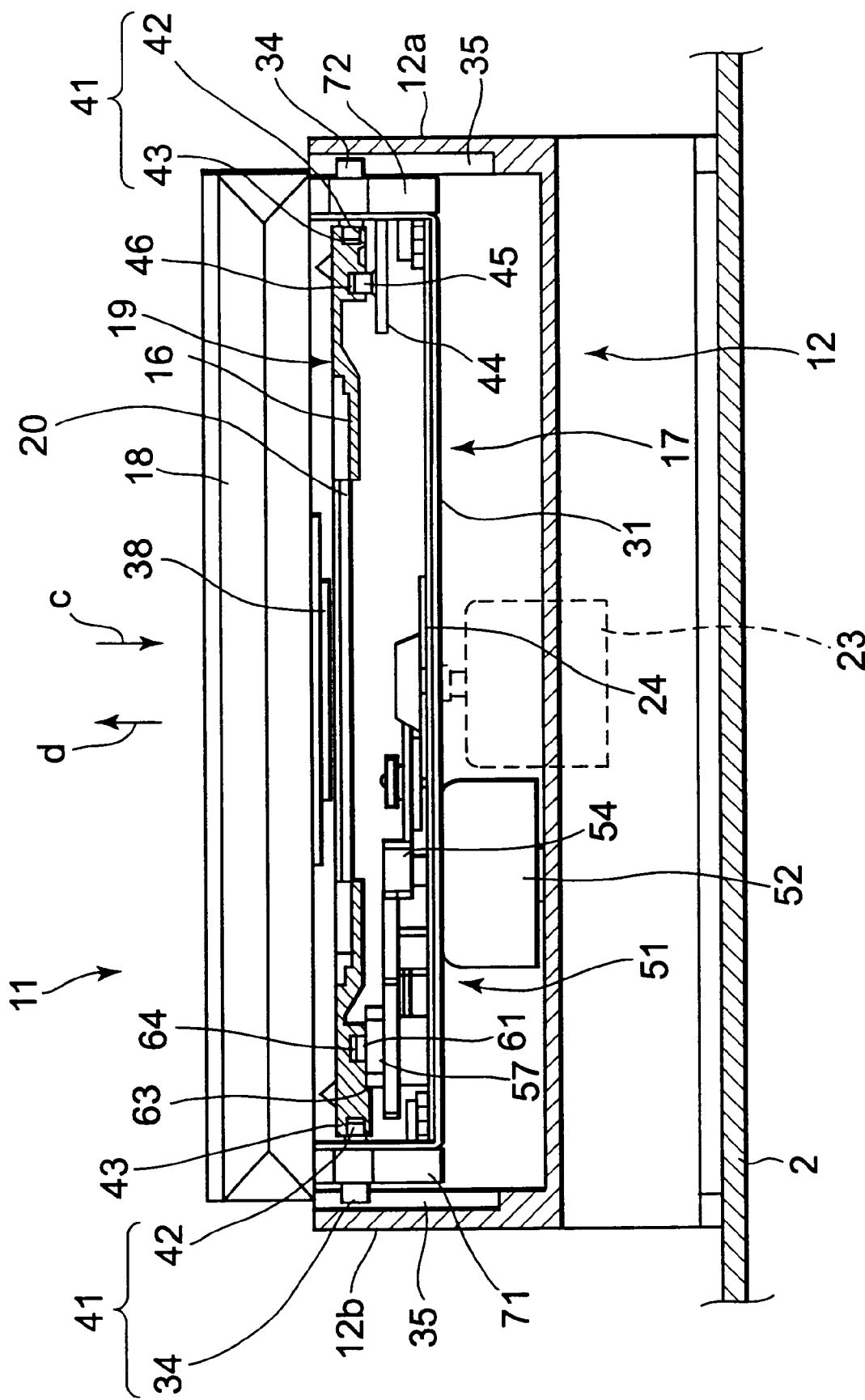
FIG. 14 is a front elevational view with a part being broken away taken along arrow line D—D of FIG. 7 and for illustrating an ascended state of the tray ascending/descending unit.
Figure 15:
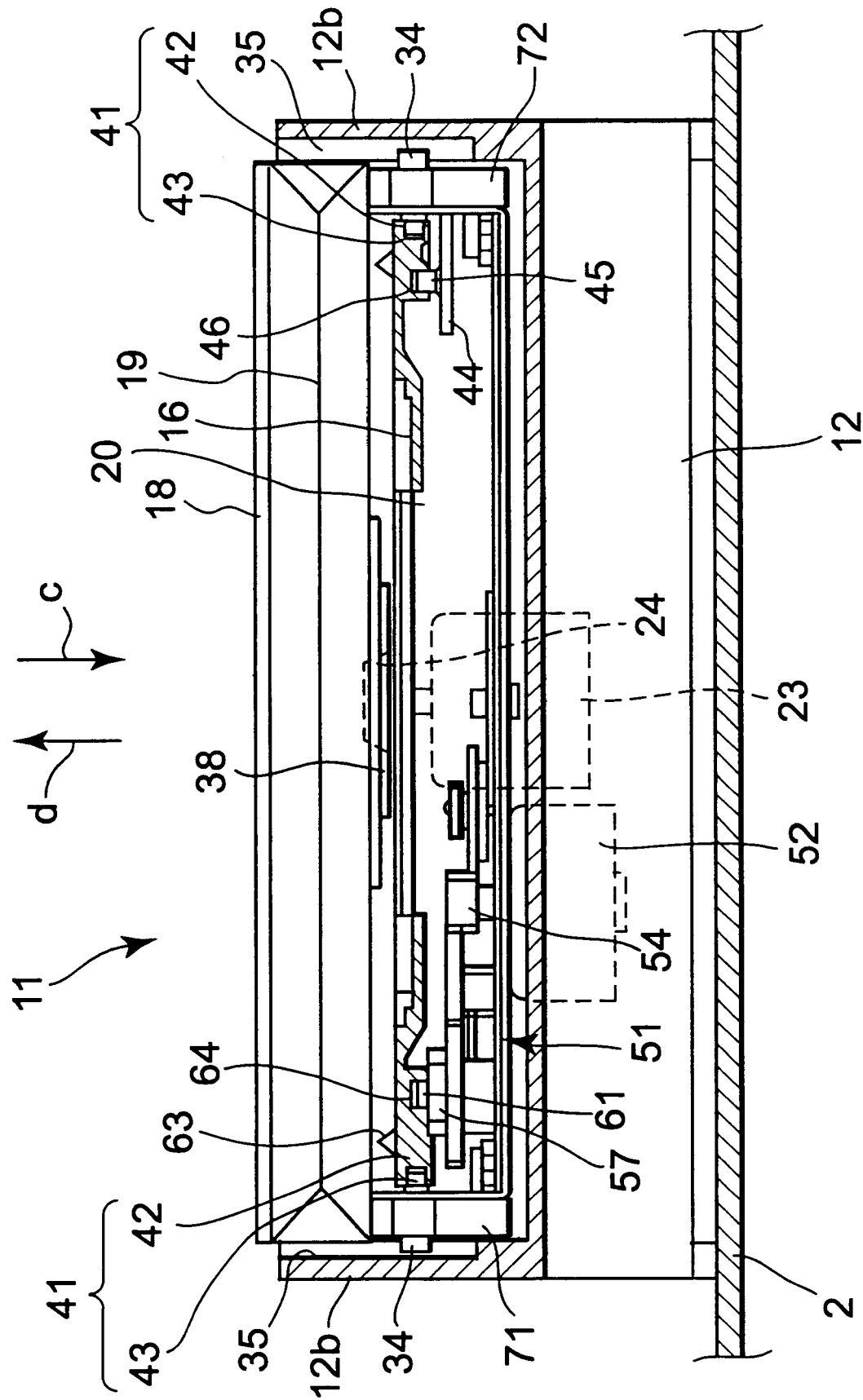
FIG. 15 is a front elevational view with a part being broken away taken along arrow line D—D of FIG. 7 and for illustrating a descended state of the tray ascending/descending unit.

In this case, a drive operation of the disk tray 16 performed by the loading drive mechanism 51 constituted as described above will be described. First, the tray ascending/descending unit 17 is lifted up to the ascended position in the mechanical deck 12 in a horizontal state in the direction of arrow (d) as shown in FIGS. 8, 9 and 14 under a state of unloading completed state of the disk tray 16. At this time, the left side slider cam 71 is slid in the direction of arrow (a) which is a rear side in respect to the tray ascending/descending unit 17, the right side slider cam 72 is slid in the direction of arrow (b) which is a front side against the tray ascending/descending unit 17, the lower ends 75a of the slant cam grooves 75 of a pair of cam mechanisms 77 kept in horizontal and faced opposite to each other are engaged with the cam pin 76 and the tray ascending/descending unit 17 is made stable at its ascended position.

Then, as indicated by a solid line in FIG. 7 and indicated in FIGS. 8 and 9, the disk tray 16 is pulled out of the tray ascending/descending unit 17 in the direction of arrow (b) of forward part, the disk tray 16 is pulled out of the tray loading/unloading port 4 of the front panel 3 of the CD/DVD player 1 described above up to the pulling-out position outside the front panel 3. The opening/closing door 18 is also pulled into the rear position in the direction of arrow (a).

Figure 16:
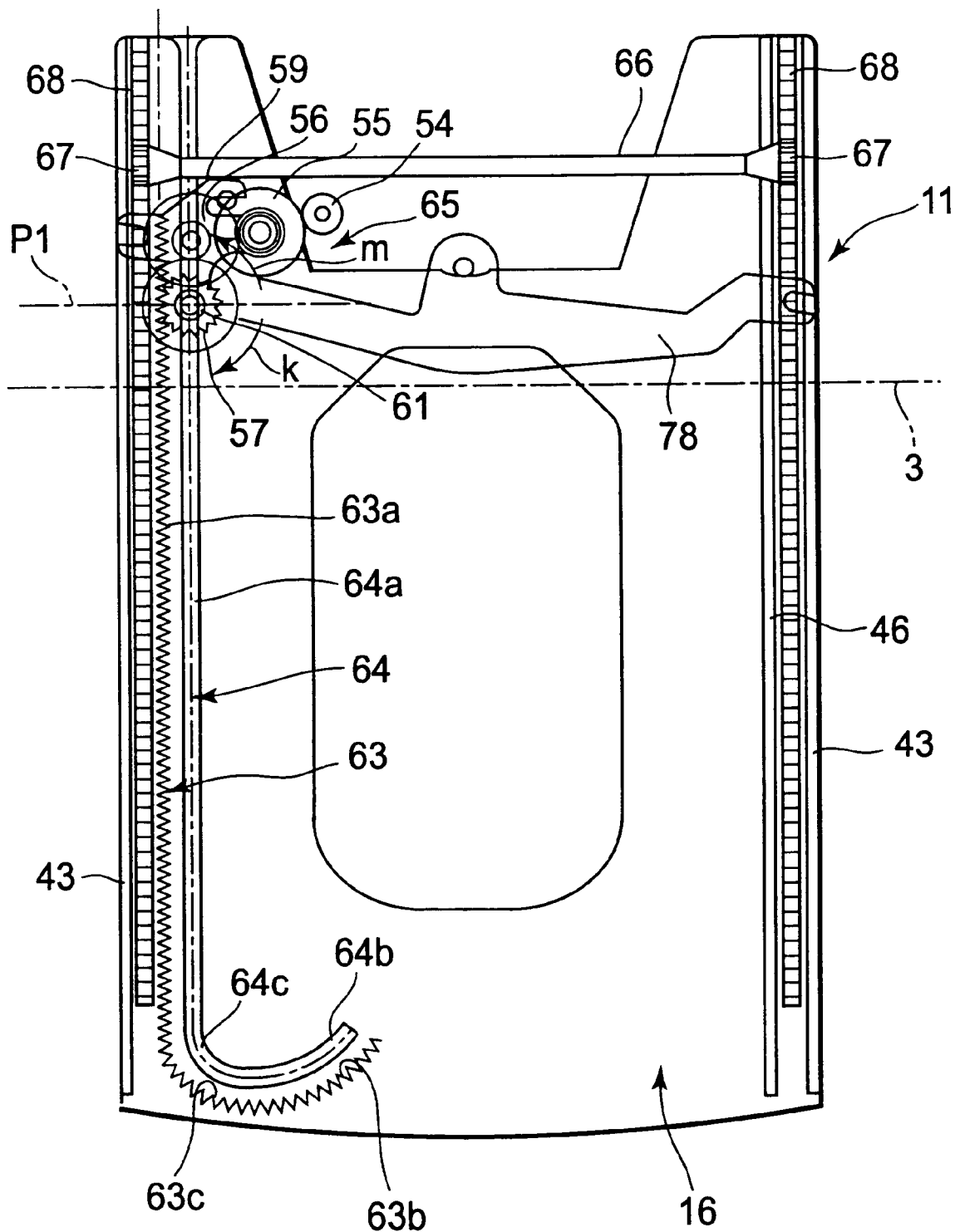
FIG. 16 is a top plan view in perspective state for illustrating a relation between a loading state of the disk tray and a loading drive mechanism.

Then, at this time, as shown in FIG. 16, a pinion 57 and a guide shaft 61 of a differential mechanism 65 are arranged at a loading start position P1 at rear ends of linear lines 63a, 64a of the J-shaped rack 63 and the J-shaped guide groove 64.

In addition, as shown in FIG. 27, it is pulled into the rear position by the tray loading/unloading port opening/closing device 91 in the direction of arrow (f).

Thus, as indicated by a dash-single-dot line in FIG. 7, when the laser disk LD is mounted in a horizontal state on the disk mounting part 19 of the disk tray 16 and the loading switch is turned on by pushing the disk tray 16 with a hand lightly in the direction of arrow (a) of rear side, the loading motor 52 is driven to rotate normally and the disk loading operation is started.

That is, when the loading motor 52 is driven to rotate normally, the drive torque of the drive gear 54 is transmitted to the pinion 57 through intermediate gears 55, 56, and the pinion 57 is driven to rotate in a normal direction of the direction of arrow (k) in FIG. 16.

Then, the linear line 63a of the J-shaped rack 63 of the disk tray 16 is driven by the pinion 57 in the direction of arrow (a), the disk tray 16 is guided by the tray guide mechanism 41 of the tray ascending/descending unit 17, and the tray is loaded from the pulling-out position indicated by a solid line in FIG. 7 up to an inner pulling-in position of the disk drive apparatus 11 indicated by a dash-single-dot line in the direction of arrow (a) and stopped there.

In this case, the upper end of the guide shaft 61 is guided by the linear line 64a of the J-shaped guide groove 64 of the disk tray 16, an engaged state of the pinion 57 in respect to the J-shaped rack 63 is kept stable and then the disk tray 16 can be smoothly pulled in to the pulling-inposition in the direction of the arrow (a).

Then, as shown in FIG. 17, both the pinion 57 of the differential mechanism 65 and the guide shaft 61 stop at the tray pulling-in completed position P2 (=tray ascending completed position) where it is inlet portions of the arcuate segments 63b, 64b from the linear lines 63a, 64a of the J-shaped rack 63 and the J-shaped guide groove 64 through the curved points 63c, 64c. When the pinion 57 and the guide shaft 61 pass through the curved points 63c, 64c, the disk tray 16 is slightly decelerated and stops.

That is, as shown in FIG. 17, when the pinion 57 and the guide shaft 61 pass from the linear lines 63a, 64a of the J-shaped rack 63 and the J-shaped guide groove 64 through the curved points 63c, 64c, the differential arm 59 is turned around the supporting shaft 58 by a small angle in the direction of arrow (g) and the disk tray 16 is slightly decelerated by the deceleration action of the rotation of the differential arm 59.

Then, the disk tray 16 pulled into the pulled-inposition in the direction of arrow (a) and stopped there is kept stopped at its stopped position subsequently by the guide shaft 61 engaged in the J-shaped guide groove 64.

In turn, also after the stopped state caused by the completion of pulling-in of the disk tray 16, the normal rotational drive of the loading motor 52 is continued, so that after stopping of the disk tray 16, the pinion 57 of the differential mechanism 65 is turned in the direction of arrow (g) along the arcuate part 63a of the J-shaped rack 63 kept in its stopped state from the tray pulling-in completed position P2 (=tray ascending completed position) shown in FIG. 17 to the tray descending completed position P3 set slightly before the over-stroke completed position P4 of the arcuate part 63a indicated in FIG. 18.

Then, during an operation in which the pinion 57 is turned in the direction of arrow (g) along the arcuate part 63a of the J-shaped rack 63, the descending drive of the tray ascending/descending unit 17 is carried out.

Figure 24:
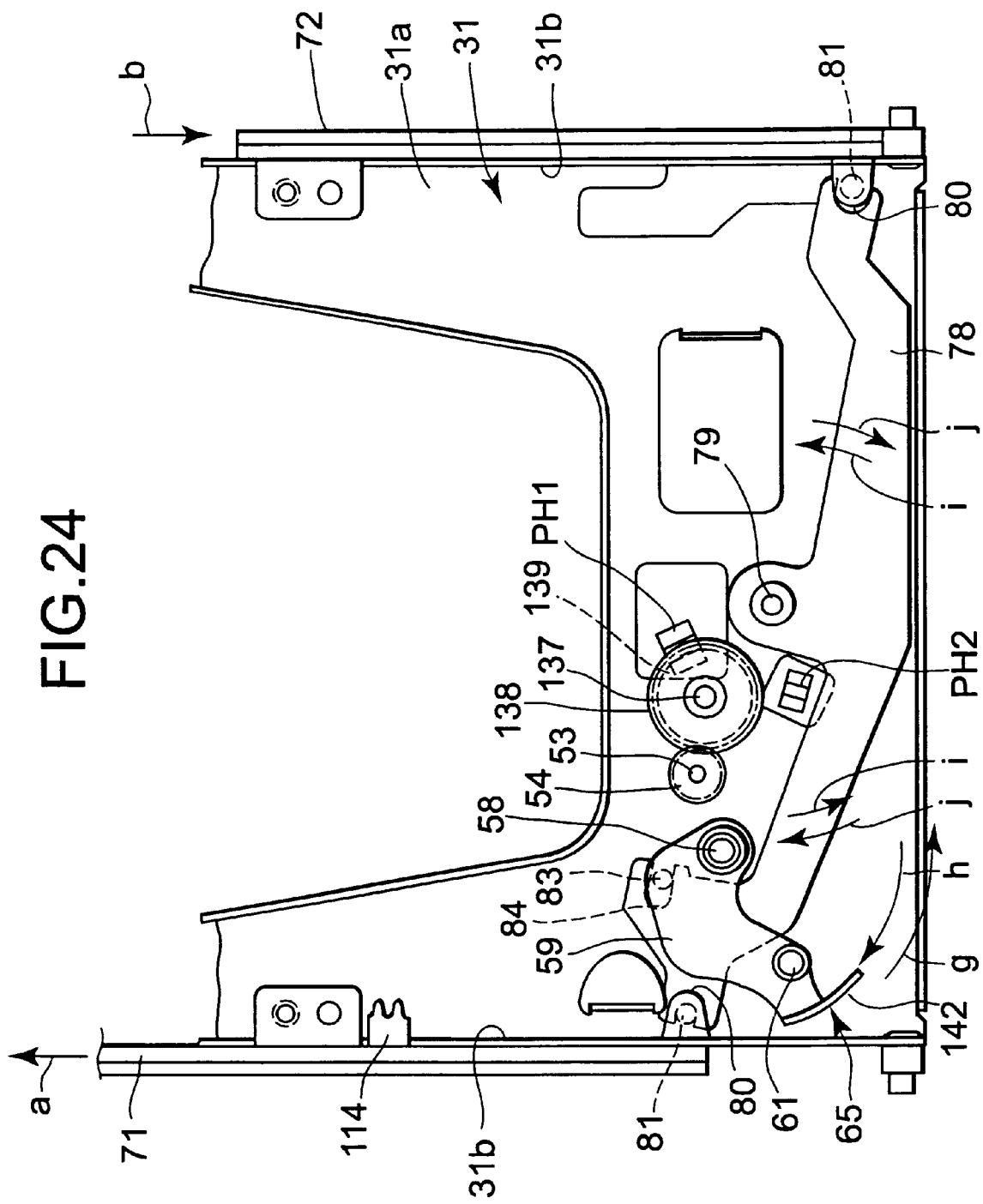
FIG. 24 is a top plan view for illustrating operation of a differential arm and a link arm shown in FIG. 23.
Figure 25:
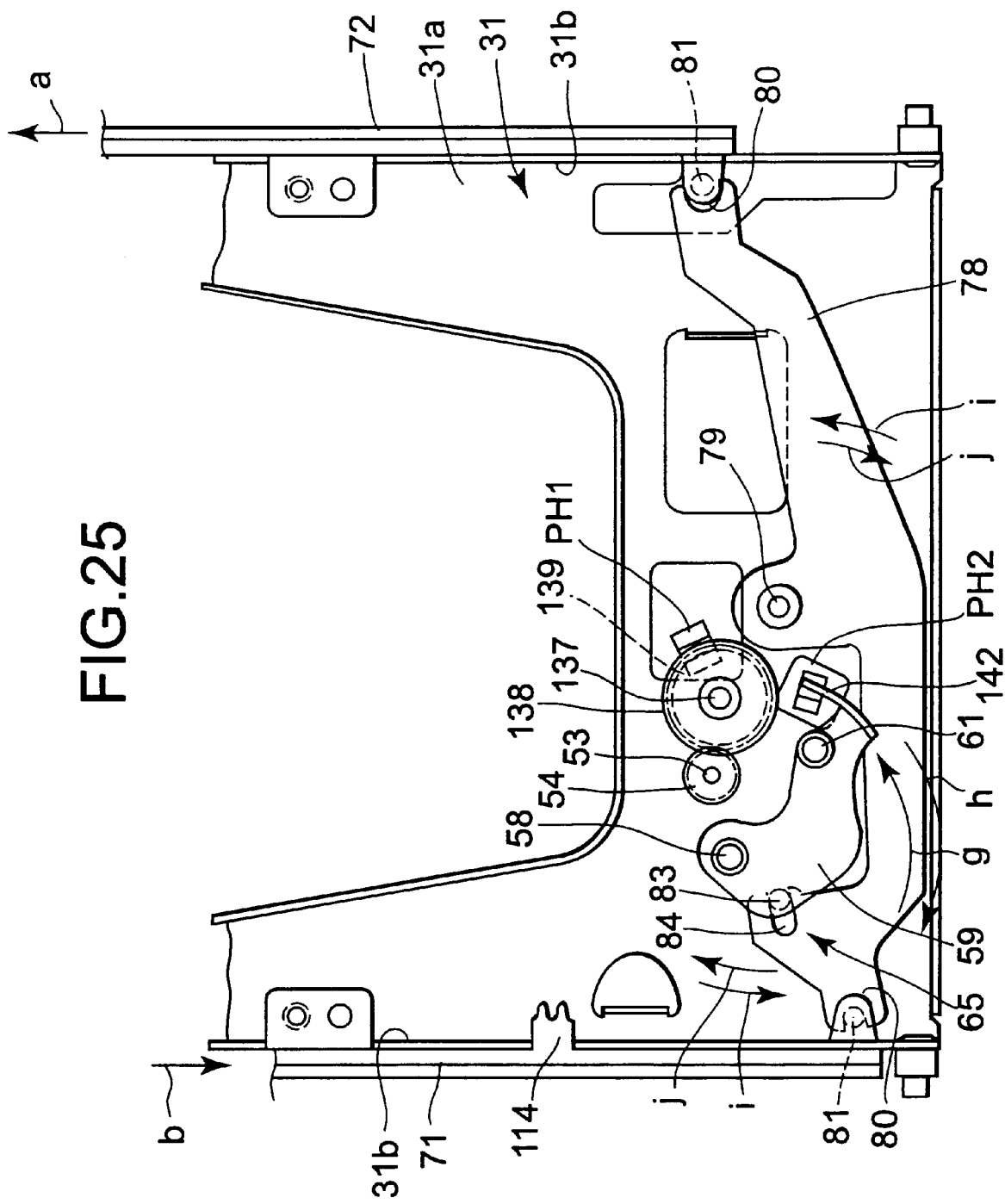
FIG. 25 is similarly a top plan view for illustrating operation of a differential arm and a link arm shown in FIG. 24.
Figure 26:
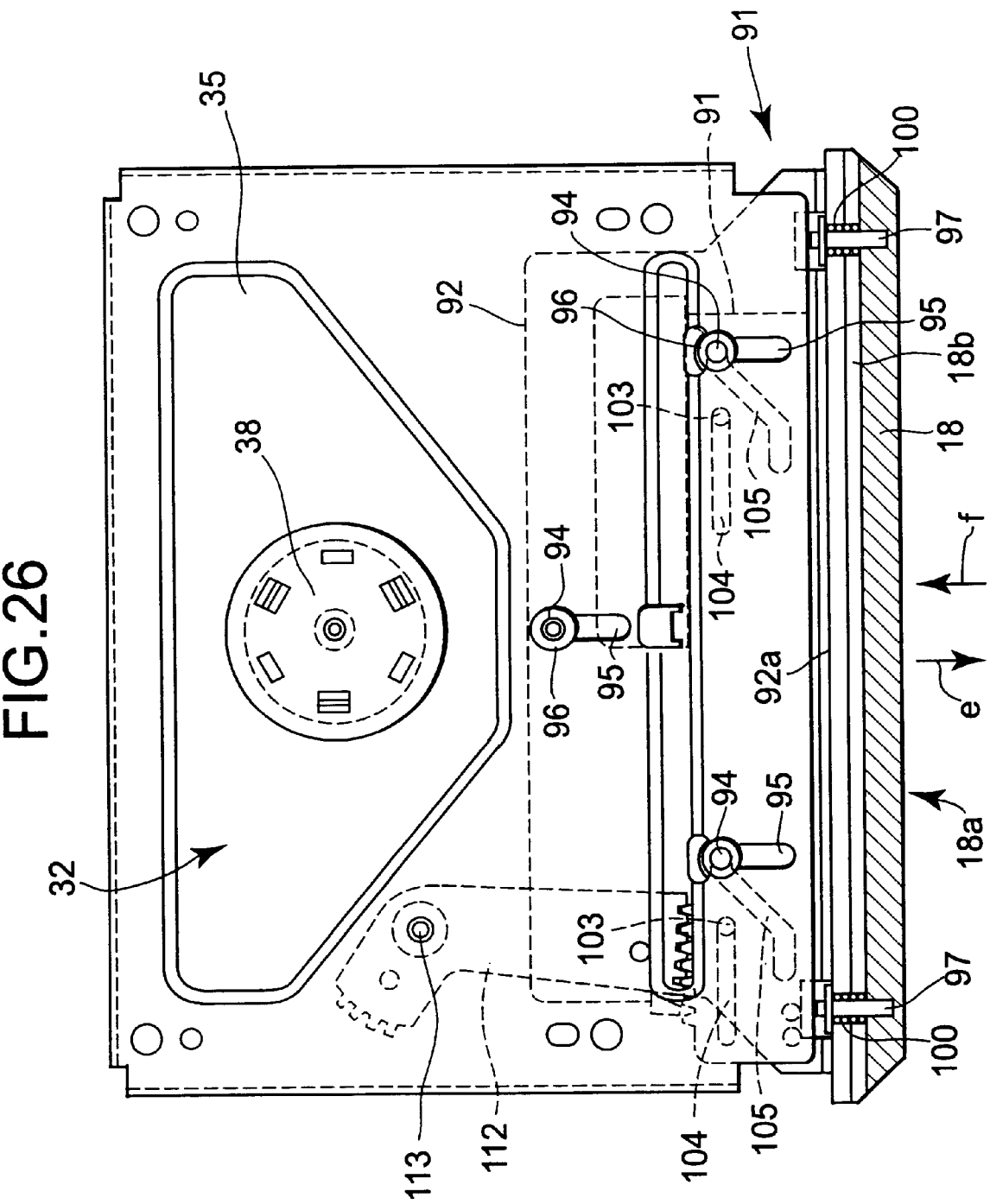
FIG. 26 is a top plan view with a part being broken away to illustrate a tray loading/unloading port opening/closing device (an opening/closing door driving mechanism) of the tray ascending/descending unit.

That is, the differential arm 59 of the differential mechanism 65 is turned around the supporting shaft 58 in the direction of arrow (g) from the position indicated in FIG. 24 to the position indicated in FIG. 25, the differential arm 59 drives the link arm 78 to rotate around the fulcrum pin 79 in the direction of arrow (i) through the link pin 83 and the link groove 84 from the position indicated in FIG. 24 to the position indicated in FIG. 25.

Then, both right and left ends of the link arm 78 drive to slide a pair of right and left slider cams 71, 72 by the same stroke amount to each other through each of both right and left pair of link groove 80 and link pin 81 of the link arm 78 from the position shown in FIG. 24 to the position indicated in FIG. 25 in the directions of arrows (a), (b) which are opposite to each other.

Figure 10:
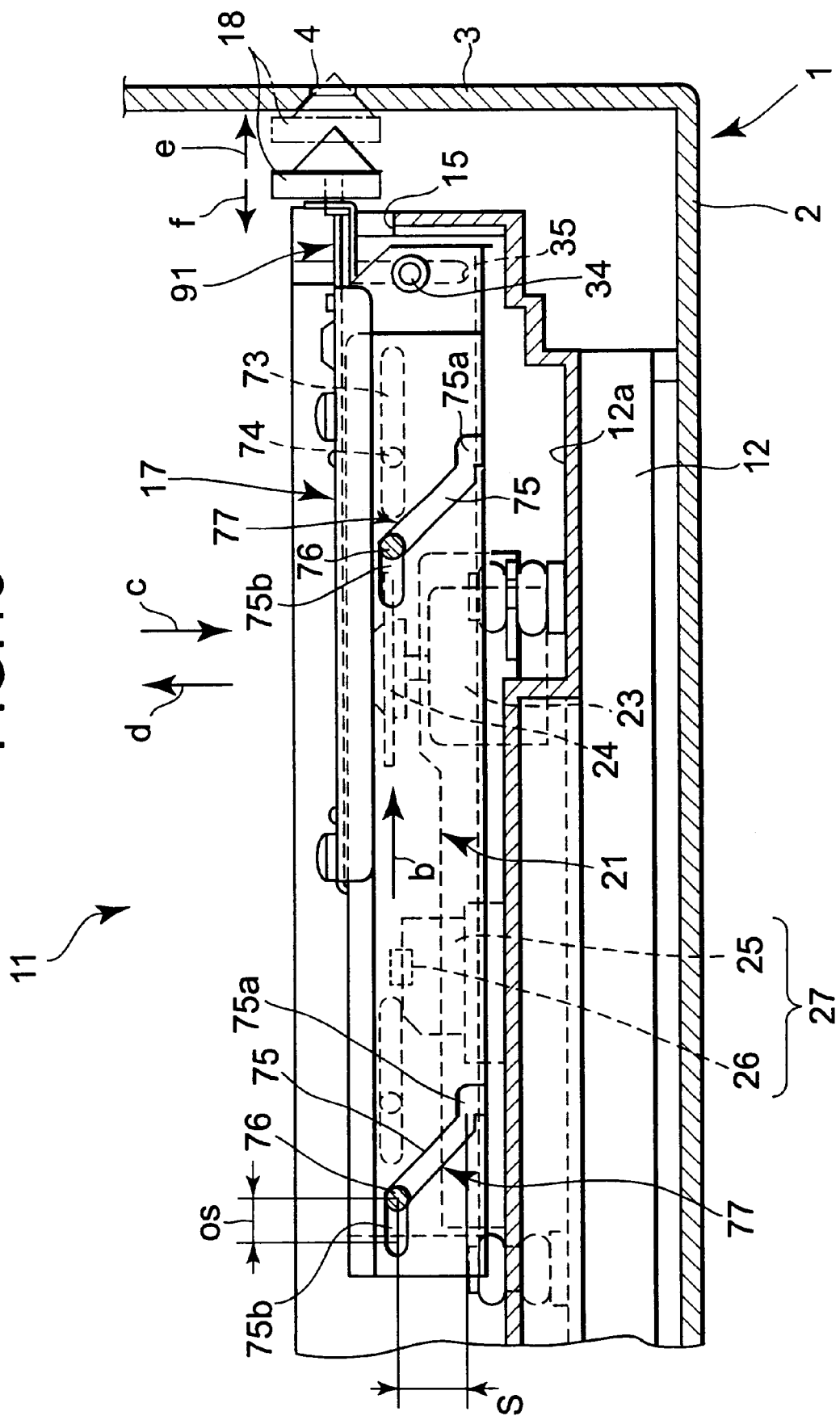
FIG. 10 is a side elevational view with a part being broken away taken along arrow line A—A of FIG. 7 and for illustrating a descended state of the tray ascending/descending unit.
Figure 11:
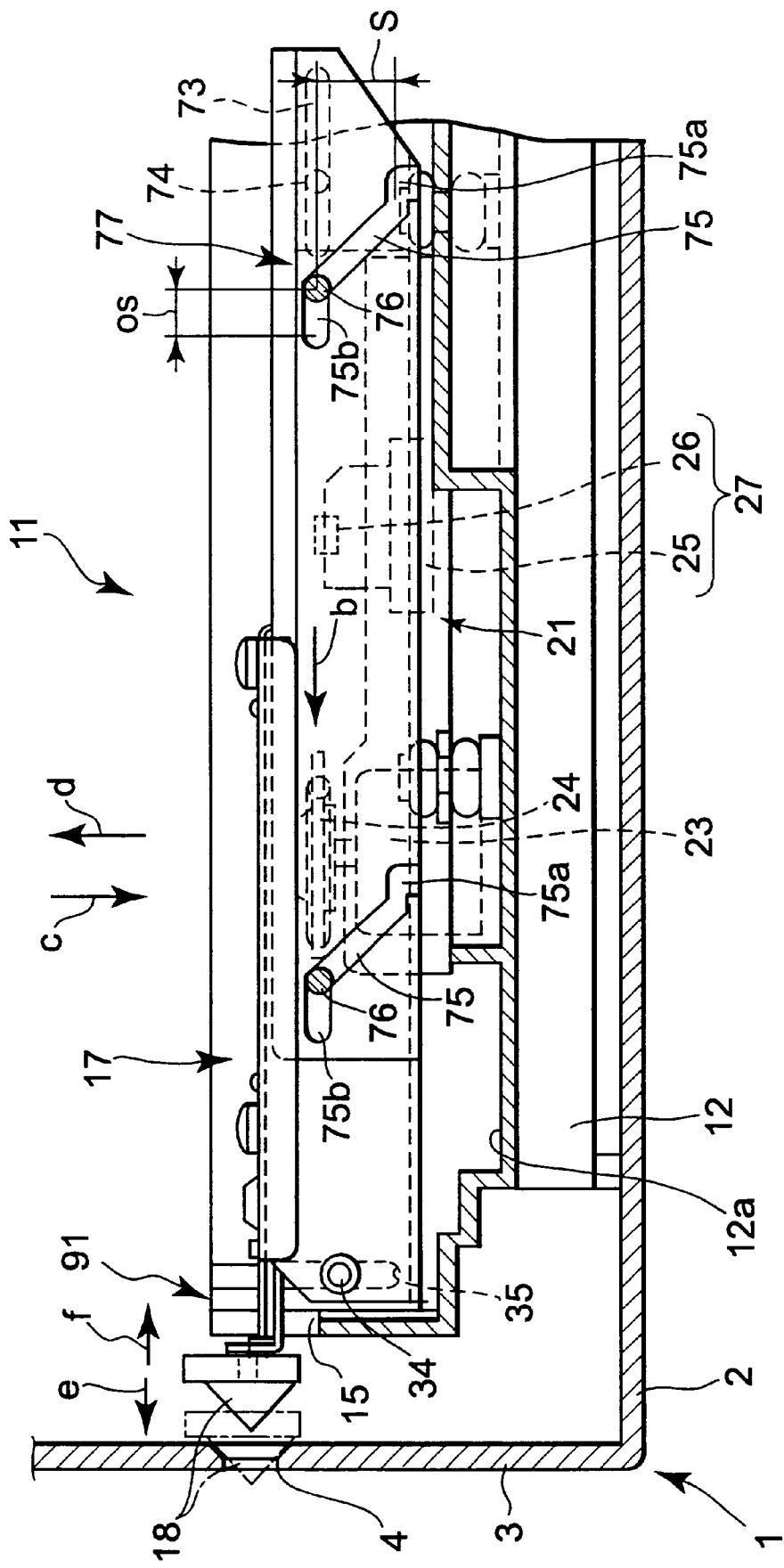
FIG. 11 is a side elevational view with a part being broken away taken along arrow line B—B of FIG. 7 and for illustrating a descended state of the tray ascending/descending unit.

With such an arrangement as above, in concurrent with the time in which the left side slider cam 71 is driven to slide in the direction of arrow (b) from the ascending control position at the rear side (the direction of arrow (a)) indicated in FIG. 8 to the descending control position of front side (the direction of arrow (b)) indicated in FIG. 10, the right slider cam 72 is driven to slide in the direction of arrow (a) from the ascending control position at the front side (the direction of arrow (b)) indicated in FIG. 9 to the descending control position of rear side (the direction of arrow (a)) indicated in FIG. 11. Then, each of pair of right and left slant cam grooves 75 is descended in parallel by an amount of cam stroke S in a vertical direction against each of pair of right and left cam pins 76 under a cam action in the vertical direction performed by each of pair of right and left slant cam grooves 75 and each of pair of right and left cam pins 76 in each of pair of right and left cam mechanisms 79, and these cam pins 76 are moved relatively from the horizontal lower ends 75a of these slant cam grooves 75 toward the horizontal upper ends 75b.

Then, as described above, in the case that the pair of right and left slider cams 71, 72 where a slant direction of each of pair of right and left slant cam grooves 75 is set to be opposite to each other are driven to slide by the same amount of stroke in the directions of arrows (a), (b) opposite to each other, the tray ascending/descending unit 17 is driven to descend in the direction of arrow (c) under a parallel motion keeping its horizontal state from the ascended position indicated in FIGS. 8 and 9 to the descended position indicated in FIGS. 10 and 11 by the cam action of the amount of cam stroke S in the vertical direction by each of the pair of right and left cam mechanisms 77 while a pair of right and left guide pins 34 of the tray ascending/descending unit 17 are being descended in the direction of arrow (c) along inside a pair of right and left vertical guide grooves 35 of the mechanical deck 12.

Then, as shown in FIGS. 10 and 11, each of pair of right and left cam pins 76 is moved relatively to the horizontal upper ends 75b opposite to each other of each of pair of right and left slant cam grooves 75, the descending drive of the tray ascending/descending unit 17 is finished and the tray ascending/descending unit 17 is kept stable at its descended position.

Then, both the disk tray 16 and the laser disk LD thereon are descended by this tray ascending/descending unit 17 from the ascended position (=pulling-in position) indicated in FIG. 12 to the descended position indicated in FIG. 13 in the direction of arrow (c), the centering part 24a at the upper central part of the disk table 24 is relatively fitted from below to the central hole LDa of the laser disk LD through the opening 33 at the bottom of the tray ascending/descending unit 17 and the central opening 19 of the disk tray 16 in the direction of arrow (d), and the laser disk LD is mounted on the disk table 24 in a horizontal state. Then, at this time, in concurrent with the time in which the laser disk LD is floated (pushed up) above from on the disk mounting part 19 of the disk tray 16 by the disk table 24, the chucking pulley 38 is magnet-chucked on the disk table 24 from on the laser disk LD by a magnetic retracting force with a magnet 24b and a yoke 38c, and the laser disk LD is press-fitted and fixed on the disk table 24 by the chucking pulley 38. Then, the data recording area of the laser disk LD is approached in a horizontal state above the objective lens 26 of the optical pickup 27 and a series of disk loading operations is completed.

Figure 13:
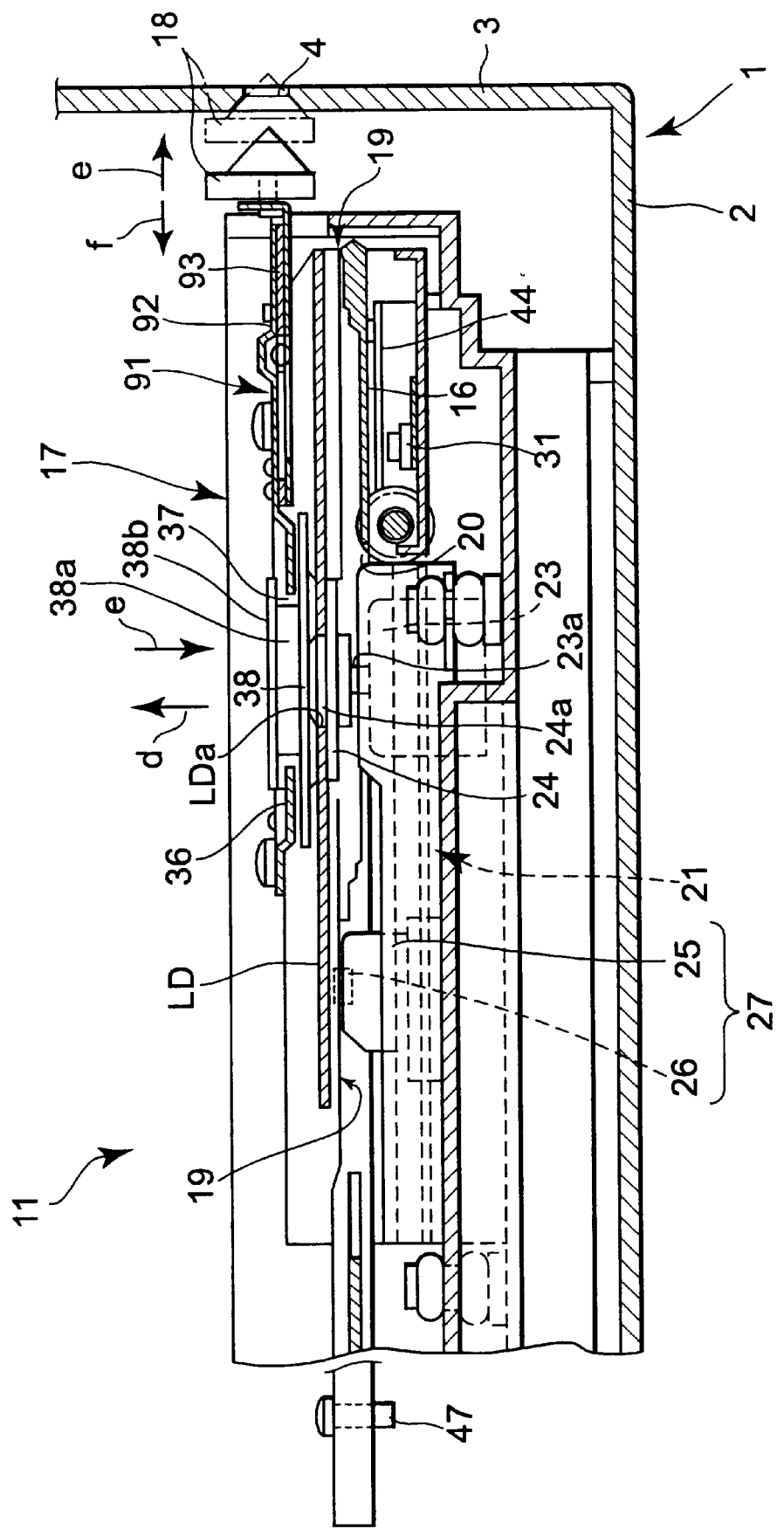
FIG. 13 is a side elevational view with a part being broken away taken along arrow line C—C of FIG. 7 and for illustrating a descended state of the tray ascending/descending unit.

Then, in the case that the tray ascending/descending unit 17 is descended in the direction of arrow (c) from its ascended position to its descended position and stopped there, the opening/closing door 18 is descended in the direction of arrow (c) to the same height position as that of the tray loading/unloading port 4 of the front panel 3 and stopped there as indicated in FIGS. 10 and 11 as well as in FIG. 13.

In turn, even after completion of descending operation of the disk tray 16, the normal rotating drive of the loading motor 52 is carried out continuously, so that after stopping of the descending operation of the disk tray 16, the pinion 57 of the differential mechanism 65 is turned to rotate in the direction of arrow (g) along the arcuate part 63a of the J-shaped rack 63 kept in its stopped state from the tray descending completed position P3 indicated in FIG. 18 to the over-stroke completed position P4.

Then, these pairs of the right and left slider cams 71, 72 are driven to slide under the over-stroke operation in the direction of arrow (b) and the direction of arrow (a) in each of FIGS. 10 and 11 utilizing the over-stroke region OS in the upper ends 75b of each of pair of right and left slant cam grooves 75 in each of the right and left slider cams 71, 72 indicated in FIGS. 10 and 11.

Figure 28:
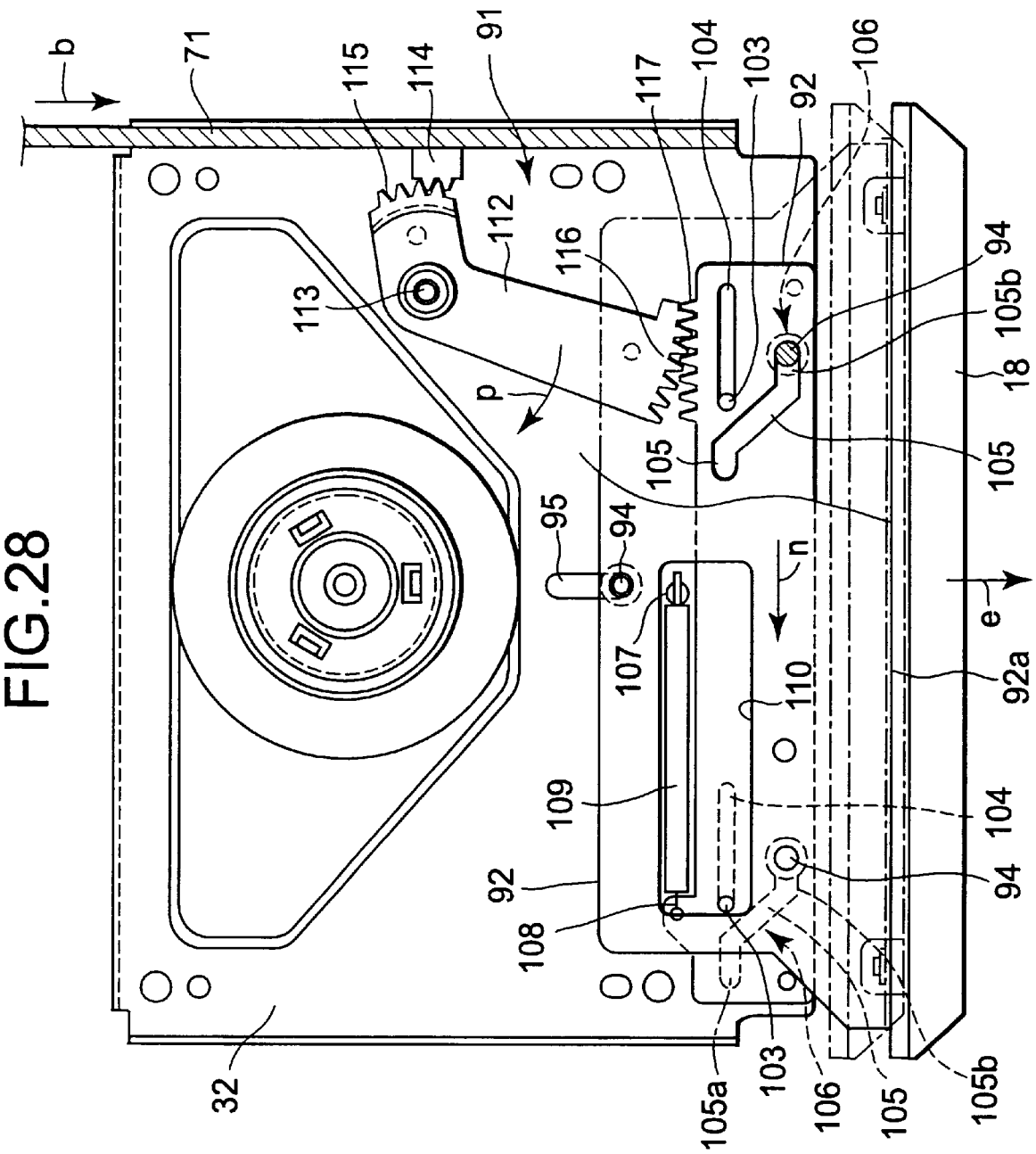
FIG. 28 is similarly a bottom view with a part being broken away to illustrate an operation of a tray loading/unloading port opening/closing device (an opening/closing door driving mechanism) of FIG. 27.

Then, at this time, the left side slider cam 71 is driven to slide in the direction of arrow (b) from the position indicated in FIG. 27 to the position indicated in FIG. 28, the small rack 114 of the tray loading/unloading port opening/closing device 91 is engaged with the partial gear 115 of the door drive arm 112 from the direction of arrow (b) so as to cause the partial gear 115 to be driven in the direction of arrow (b). Then, the door drive arm 112 is driven to rotate around the fulcrum pin 113 in the direction of arrow (p), the door drive arm 112 drives to slide the door slider cam 92 against the tension coil spring 109 through the partial gear 116 and the rack 117 from the rear control position indicated in FIG. 27 to the forward control position indicated in FIG. 28.

Then, the door slider 93 is driven to slide in the direction of arrow (e) from the rear position indicated in FIG. 27 to the forward position indicated in FIG. 28 while being guided by three guide pins 94 and guide grooves 95 under a cam action by each of pair of right and left slant cam grooves 105 of a pair of right and left cam mechanisms 106 and guide pins 94 also acting as cam pins.

With such an arrangement as above, the opening/closing door 18 is pushed out in the direction of arrow (e) from the rear position indicated by a solid line in FIGS. 10 and 11 to the forward position indicated by a dash-single-dot line, and as shown in FIGS. 30A and 30B, the opening/closing door 18 is elastically press-contacted to the tray loading/unloading port 4 from its rear surface side to the direction of arrow (e) by compression repulsive force of a pair of the right and left compressive coil springs 100 of the automatic aligning mechanism 101 so as to project the horizontal ridge line 125 at the central part of the front surface 18a of the opening/closing door 18 from the central part of the tray loading/unloading port 4 to a forward side of the front panel 3 in a horizontal state by a projecting amount T11 of several millimeters and at the same time the tapered surfaces 123, 124 in the two directions of the vertical and lateral directions of the opening/closing door 18 are elastically press-contacted against the tapered surfaces 121, 122 by wedge action in the two directions of the vertical direction and the lateral direction of the inner surface of the tray loading/unloading port 4 to enable the tray loading/unloading port 4 to be sealingly closed.

In this case, the tapered surfaces 123, 124 of the opening/closing door 18 can be closely contacted smoothly and completely against the tapered surfaces 121, 122 of the tray loading/unloading port 4 through automatic aligning (automatically profiled) by supporting the opening/closing door 18 by the automatic aligning mechanism 101 against the door slider 93 in the state having play in the vertical direction and the lateral direction, resulting in that the tray loading/unloading port 4 can be sealingly closed under a high air-tight state.

Accordingly, the inside part of the CD/DVD player 1 becomes quite effective against an external sound pressure, a high quality sound reproduction can be carried out and a high quality super-audio CD/DVD player 1 can be realized. In addition, the tray loading/unloading port 4 can be sealed under a high airtight state with an opening/closing door having minimum outer diameter size, and then a high anti-dust effect can be attained in the CD/DVD player 1 while attaining a small-sized unit by improving the space factor. Then, looseness of the opening/closing door 18 under its closed state can be prevented by the press-contacting under the wedge action between the opening/closing door 18 and the tapered surfaces 121, 122 and 123, 124 of the tray loading/unloading port 4, and it is possible to attain reliability in sealing operation of the tray loading/unloading port 4 and to prevent occurrence of vibrating noise generated under interference between the opening/closing door 18 and the front panel 3. Then, in particular, since the opening/closing door 18 having the tray loading/unloading port 4 sealingly closed is held at the front end 106b of the straight part perpendicular to the forward or rearward direction in the pair of right and left slant cam grooves 105 of the pair of right and left cam mechanisms 106, the opening/closing door 18 is strongly locked under a state in which the tray loading/unloading port 4 is being sealingly closed and so it is possible to prevent any erroneous operation such as a forced opening or feeding of dust or a trick play or the like. Further, it is possible to provide a new design in which a part of the tapered surfaces 123, 124 of the opening/closing door 18 having the tray loading/unloading port 4 sealingly closed from inside or the ridge line 125 is projected forwardly of the tray loading/unloading port 4 by a projecting amount T11.

With such an arrangement as above, after the loading drive operation is completed by the loading drive mechanism 51 and the completed loading drive operation is detected by a photo-coupler to be described later (=sensing of the completed state of closing door), the loading motor 52 is stopped.

Then, the laser disk LD is rotationally driven by the spindle motor 23 in the disk-chucked state shown in FIG. 13, the objective lens 26 is searched by the sled 24 of the optical pickup 27 in the directions of arrows (a), (b) of the inner and outer circumferential directions of the laser disk LD and data of the laser disk LD is reproduced.

Then, unloading operation of the laser disk 16 after reproduction of data of the laser disk LD is carried out in a reverse order to that of the aforesaid loading operation.

That is, the loading motor 52 is driven to rotate in a reverse direction by turning on the eject switch. Then, the tray loading/unloading port 4 of the front panel 3 is released by the tray loading/unloading opening/closing device 91 while the pinion 57 of the differential mechanism 65 is turned to move in the direction of arrow (h) from the over-stroke completed position P4 of the terminal end at the arcuate section 63b of the J-shaped rack 63 shown in FIG. 18 to the tray descended completion position P3.

Then, the tray ascending/descending unit 17 is ascended from the descended position shown in FIGS. 10 and 11 to the ascended position indicated in FIGS. 8 and 9 in the direction of arrow (d) while the pinion 57 is turned to move in the direction of arrow (h) from the tray descending completed position P3 at the arcuate part 63b of the J-shaped rack 63 shown in FIG. 18 to the tray ascending completed position (=a tray retraction completed position) P2 as shown in FIG. 17.

Then, the pinion 57 drives the linear line part 63a of the J-shaped rack 63 of the disk tray 16 in the direction of arrow (b) under a state in which the pinion 57 is driven to rotate in the direction of arrow (h) from the tray pulled-in completed position P2 at the arcuate segment 63b of the J-shaped rack 63 indicated in FIG. 17 to the tray pulled-out completed position P1 where the it is entered from the arcuate segment 36b of the J-shaped rack 63 indicated in FIG. 16 into the linear line part 63a through the curved point 63c, resulting in that the disk tray 16 is unloaded out of the disk drive apparatus 11 in the direction of arrow (b).

That is, at first, the left side slider cam 71 is driven to slide in the direction of arrow (a) from the position indicated in FIG. 28 to the position indicated in FIG. 27 while the pinion 57 is driven to rotate in the direction of arrow (h) from the over-stroke completed position P4 of the arcuate segment 63b of the J-shaped rack 63 indicated in FIG. 18 to the tray descending completion position P3, the door slider 93 is driven to slide in the direction of arrow (f) from the forward position indicated in FIG. 28 to the rearward position indicated in FIG. 27 by a pair of right and left cam mechanisms 106 of the tray loading/unloading port opening/closing device 91, the opening/closing door 18 is pulled-in in the direction of arrow (f) from the forward position indicated by a dash-single-dot line in FIG. 13 to the rearward position indicated by a solid line to cause the tray loading/unloading port 4 of the front panel 3 to be released.

In other words, as shown in FIG. 27, when the left side slider cam 71 is driven to slide in base slide manner in the direction of arrow (a), the door driving arm 112 is driven to rotate in the direction of arrow (q) through the small-shaped rack 114 and the partial gear 115, the door slider cam 92 is driven to slide in the direction of arrow (o) utilizing a spring force of a tension coil spring 109 through the partial gear 117 and the rack 114. Then, the slant cam grooves 105 of a pair of right and left cam mechanisms 106 are slid and returned in the direction of arrow (o) against the guide pin 94, the action of the cam at that time returns the door slider 93 in slide in the direction of arrow (f) by a parallel motion, and the opening/closing door 18 is pulled-in in parallel with the direction of arrow (f) up to the rearward position. After this operation, the rack 114 of the left side slider cam 71 is removed from the partial gear 115 of the door drive arm 112.

Subsequently to this operation, the differential arm 59 is turned in the direction of arrow (h) as shown in FIGS. 24 and 25 while the pinion 57 is driven to rotate in the direction of arrow (h) from the tray descending completion position P3 of the arcuate segment 63b of the J-shaped rack 63 indicated in FIG. 18 to the tray ascending completion position (=tray pulled-in completion position) P2, the link arm 78 is driven to rotate around a fulcrum pin 79 in the direction of arrow (j), in concurrent with the operation in which the left side slider cam 71 is driven to slide by the link arm 78 in the direction of arrow (a) from the descending control position indicated in FIG. 10 to the ascending control position indicated in FIG. 8, the right side slider cam 72 is driven to slide in the direction of arrow (b) from the descending control position indicated in FIG. 11 to the ascending control position indicated in FIG. 9.

Then, the tray ascending/descending unit 17 is driven to ascend in the direction of arrow (d) through a parallel motion keeping its parallel state from the descending position indicated in FIGS. 10 and 11 to the ascended position indicated in FIGS. 8 and 9 by applying a cam action of an amount corresponding to a cam stroke S in the vertical direction by each of pairs of right and left cam mechanisms 77 while a pair of right and left guide pins 34 of the tray ascending/descending unit 17 are being ascended in the direction of arrow (d) along in a pair of right and left vertical guide grooves 35 of the mechanical deck 12 under a cam action by slant cam grooves 75 of each of pair of right and left cam mechanisms 77 and the cam pins 76 of these pairs of right and left slider cams 71, 72. Then, as shown in FIGS. 8 and 9, each of pair of right and left cam pins 76 is entered into the horizontal lower ends 75a of each of pairs of right and left slant cam grooves 75, and the tray ascending/descending unit 17 is made stable at its ascended position.

Figure 12:
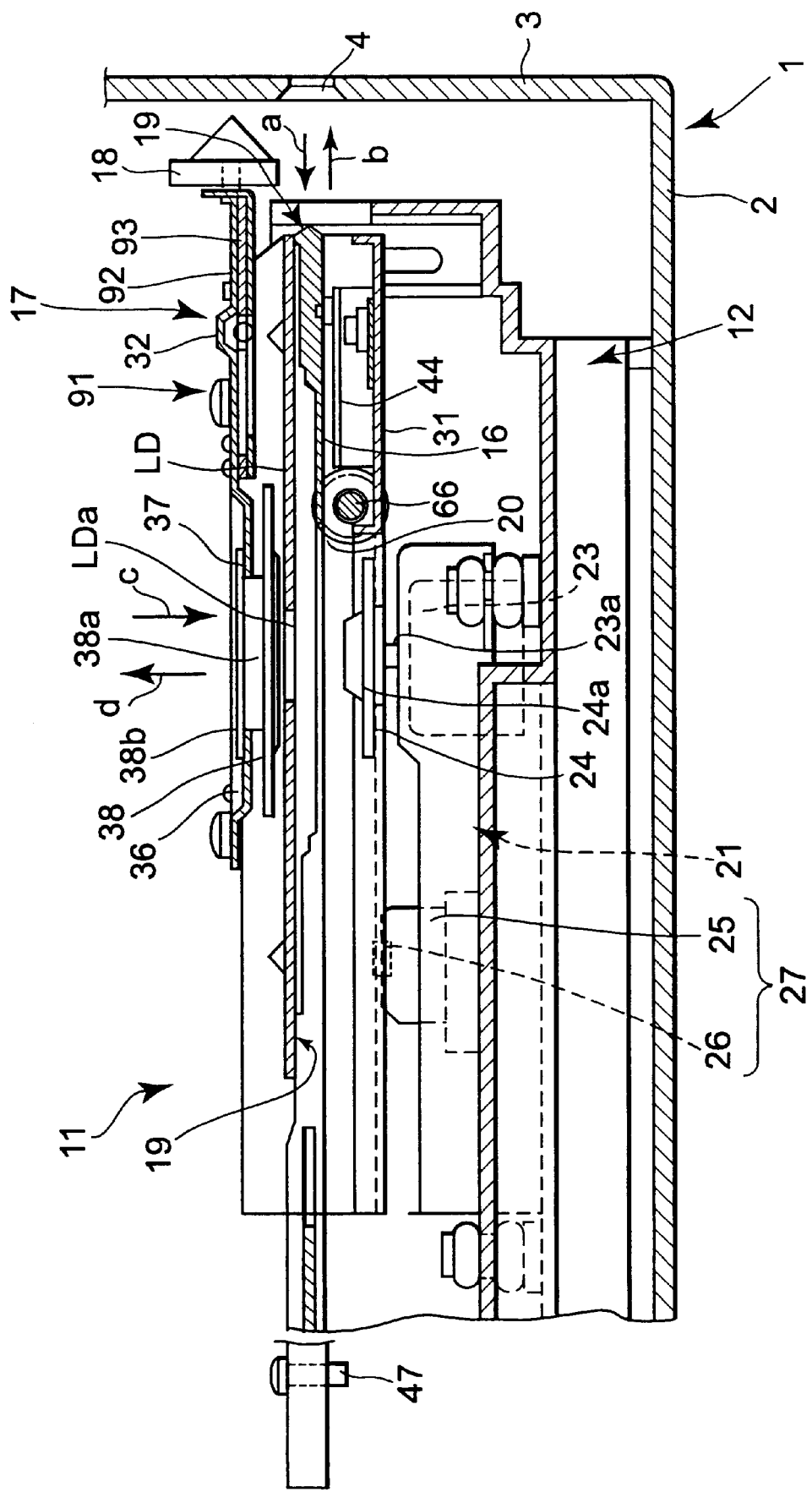
FIG. 12 is a side elevational view with a part being broken away taken along arrow line C—C of FIG. 7 and for illustrating an ascended state of the tray ascending/descending unit.

Then, the disk tray 16 is ascended by the tray ascending/descending unit 17 in the direction of arrow (d) from the descending position indicated in FIG. 13 to the ascending position indicated in FIG. 12, the chucking pulley 38 is pulled out above the disk table 24 to cause the chucking of the laser disk LD to be released, the laser disk LD is mounted again in horizontal state on the disk mounting segment 19 of the disk tray 16 and the disk tray 16 is ascended up to the ascended position together with the laser disk LD.

Then, the pinion 57 of the differential mechanism 65 is driven to rotate in the direction of arrow (h) from the tray ascending completed position (=tray pulling-in completed position) shown in FIG. 17 of the J-shaped rack 63 and enter into the linear line part 63a through the curved point 63c of the J-shaped rack 63, subsequently, the pinion 57 drives to rotate the linear line part 63a of the J-shaped rack 63 in the direction of arrow (b) to cause the disk tray 16 to be pulled out in the direction of arrow (b) from the pulling-in position in the disk drive apparatus 11 shown by a dash-single-dot line in FIG. 7 to the pulling-out position indicated by a solid line. Then, the laser disk LD is pulled out together with the disk tray 16 in the direction of arrow (b) from the tray loading/unloading port 4 of the front panel 3 of the CD/DVD player 1, and as shown in FIG. 7, the stopper pin 47 at the rear end of the disk tray 16 is abutted from the direction of arrow (b) against a tray stopper 44 of the tray ascending/descending unit 17 and stops there.

With the foregoing, the unloading drive operation with the loading drive mechanism 51 is completed and an operation of the loading motor 52 is stopped through sensing of the unloading completed state with a photo-coupler to be described alter.

(3) Description of Loading Motor Control

Then, referring to FIGS. 21 to 25, and 31 to 34, the loading motor control circuit 131 for use in controlling a rotation of the loading motor 52 will be described. First, as shown in FIG. 31, the loading motor control circuit 131 is constituted such that as encoders FGA, FGB for use in sensing both a revolution speed and a rotating direction of the loading motor 52, a first one photo-interrupter PH1 of a 2-circuit type sensor with one light emitting element and two light receiving elements is used and a second one photo-interrupter PH2 of a sensor for sensing a door closed position is used. Then, output terminals of the two encoders FGA, FGB of the first photo-interrupter PH1 and an output terminal of the photo-interrupter are connected to a system control circuit 133 of a microcomputer or the like through a gate-array circuit 132, and the motor control output terminal of the system control circuit 132 is connected to a motor driver 135 through a servo DSP (Digital Signal Processor) 134.

Then, as shown in FIGS. 21 to 25, a supporting shaft 137 is fixed vertically at a position adjacent to the motor shaft 53 of the loading motor 52 on the unit base 31 of the tray ascending/descending unit 17 to which the loading motor 52 is fixed, a sensing gear 138 is rotatably supported at the outer circumference of the supporting shaft 137, and the sensing gear 138 is engaged with a drive gear 138 fixed to the outer circumference of the motor shaft 53 from opposite side of an intermediate gear 55. Then, a slit ring 139 having many slits 139a formed in a specified space in a circumferential direction is integrally formed in a concentric manner at the outer circumference of the lower surface of the sensing gear 138. Then, the first photo-interrupter PH1 practically mounted upwardly on the sensor substrate 140 of a printed circuit board fixed in a horizontal state to the lower surface of the unit base 31 is inserted upwardly from an opening 141 formed at the unit base 31, inserted from below inside or outside the slit ring 139 and arranged. In this case, although the first photo-interrupter PH1 may generate an FG pulse in response to rotation of many slits 139a of the slit ring 139, this is constructed as a 2-circuit storing type that its revolution speed and rotating direction can be detected.

In addition, a vertical shutter 142 is press-fitted to an end part of the differential arm 59 in the direction of arrow (g) and the second photo-interrupter PH2 is arranged at a rotation stopping position of the differential arm 59 in the direction of arrow (g) and also at a position where light is shielded by the shutter 142. The second photo-interrupter PH2 is also practically installed upwardly on the same sensor board 140 and projected above the unit base 31 through the opening 143 formed at the unit base 31.

The loading motor control circuit 131 constructed as described above detects the revolution speed and the rotating direction of the slit ring 139 of the sensing gear 138 driven in normal rotation and reverse rotation by the drive gear 54 in reference to the FG count with the encoders FGA, FGB of the first photo-interrupter PH1 as shown in FIG. 32 at the time of normal rotating drive and the reverse rotating drive of the loading motor 52. In this case, the FG pulse generated between the tray-out position (the pull-out position of the disk tray 16) and the door closed position (the sealing completed position of the tray loading/unloading port 4 by the opening/closing door 18 and this becomes the loading completed position) is set to 234 FG, the FG pulse generated up to the tray out position with the tray-in position (pulling-in position of the disk tray 16) being applied as a reference point is set to 186 FG, and the FG pulse generated up to the door closed position is se to 48 FG.

In addition, at the door closed position, as shown in FIG. 25, the shutter 142 of the differential arm 59 shields light against the second photo-interrupter PH2. Required time for both loading/unloading is set to about 1.2 seconds. In this case, the light shielding times of FGA, FGB, PH2 are displayed by LOW.

In accordance with the loading motor control circuit 131 constructed and operated as described above, both the revolution speed and the rotating direction of the loading motor 52 are detected by the encoders FGA, FGB at the time of aforesaid disk loading and disk unloading and then the counter of the gate array 132 is driven. Then, the loading motor 52 is selectively driven under the loading time control mode and the unloading time control mode to be described later with the servo DSP 134 through the motor driver 135 by the control signal outputted to the servo DSP from the system control circuit 133. At this time, the position of each of the operating positions is set in reference to the counter value of the FG pulse with the door closing completion position. That is, when the second photo-interrupter PH2 is shielded against light by the shutter 142 at the door closed position, the second photo-interrupter PH2 is turned on and the counter is rest to 0.

Figure 33:
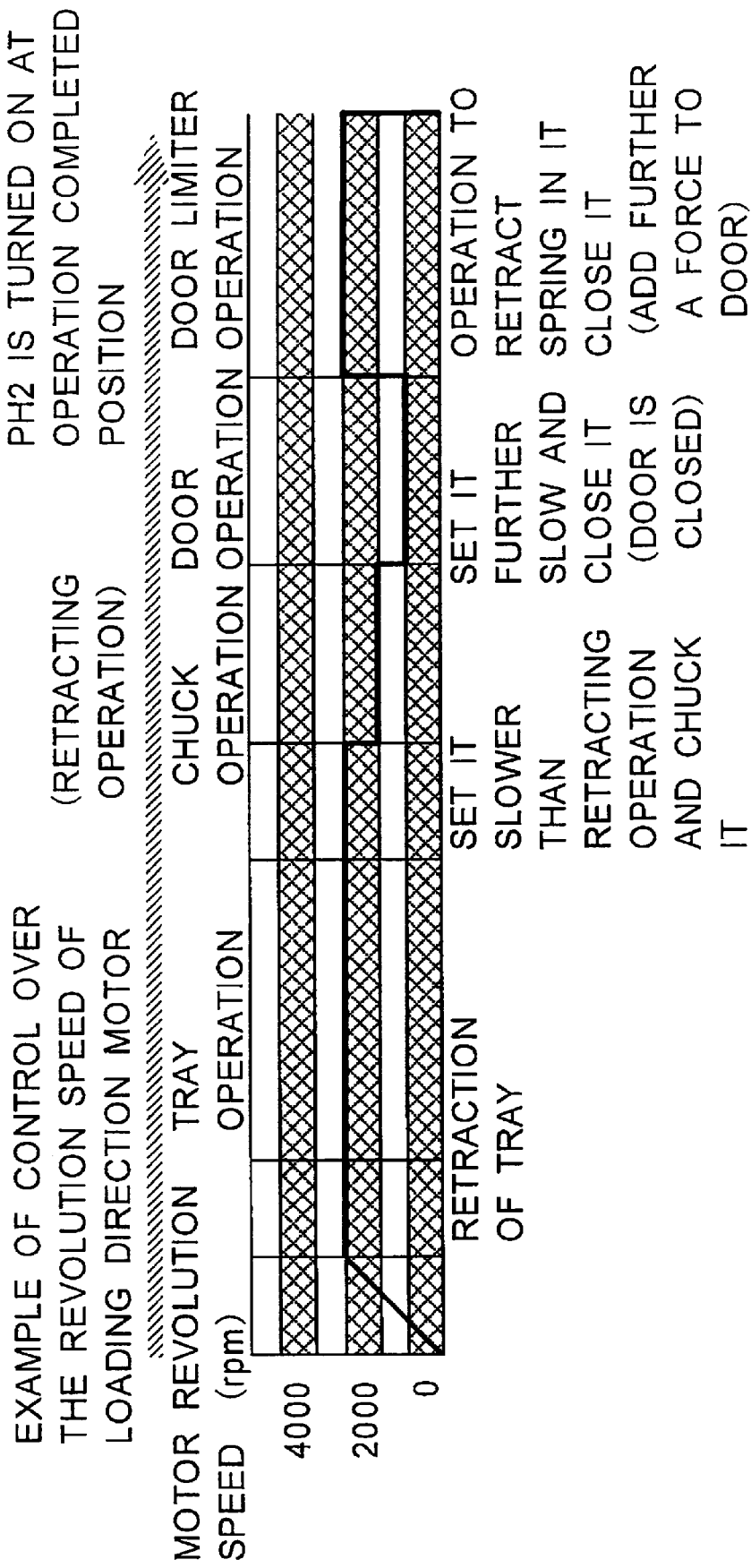
FIG. 33 is a view for illustrating a loading time control mode set by the loading motor control circuit of FIG. 31.

Next, FIG. 33 indicates the loading time control mode, wherein at the time of loading operation, the revolution speed of the loading motor 52 normally driven to rotate is rapidly increased from 0 to 3000 rpm and the disk tray 16 is started to be retracted rapidly, thereafter, it is driven at a constant speed of 3000 rpm and a pulling-in operation for the disk tray 16 is carried out at a safety speed. Then, at the time of chucking of the laser disk LD against the spindle motor 23, the revolution speed of the loading motor 52 is dropped by one step from 3000 rpm to 2000 rpm to perform a stable chucking, and further at the time of pulling-out the opening/closing door 18, the revolution speed of the loading motor 52 is dropped by two steps to 1000 rpm, the opening/closing door 18 is softly pushed against the tray loading/unloading port 4 to prevent occurrence of shock there. After this operation, the revolution speed of the loading motor 52 is rapidly increased up to 3000 rpm to perform an operation of a door limiter positively (an operation in which the tapered surfaces 123, 124 of the opening/closing door 18 are press-contacted in complete close contacted state against the tapered surfaces 121, 122 of the tray loading/unloading port 4 against two coil compression coil springs 110).

Figure 34:
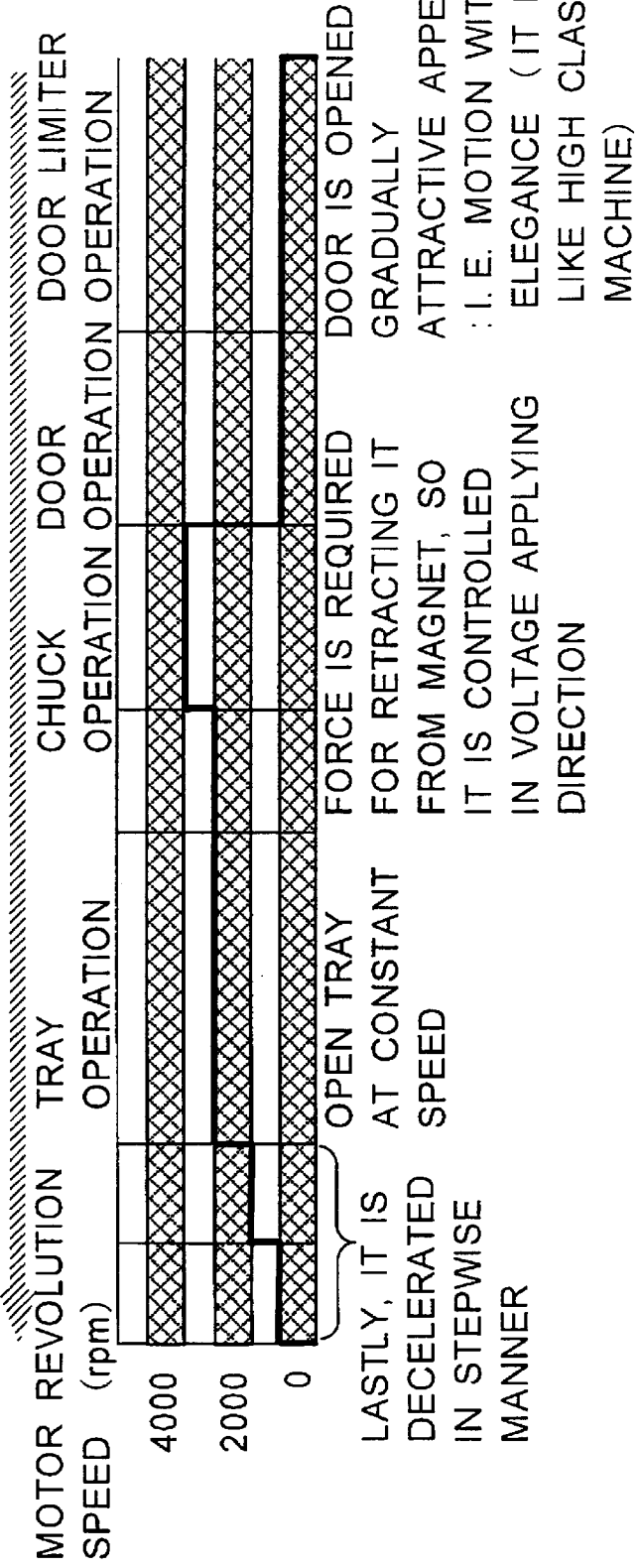
FIG. 34 is a view for illustrating an unloading time control mode set by the loading motor control circuit of FIG. 31.
Figure 35:
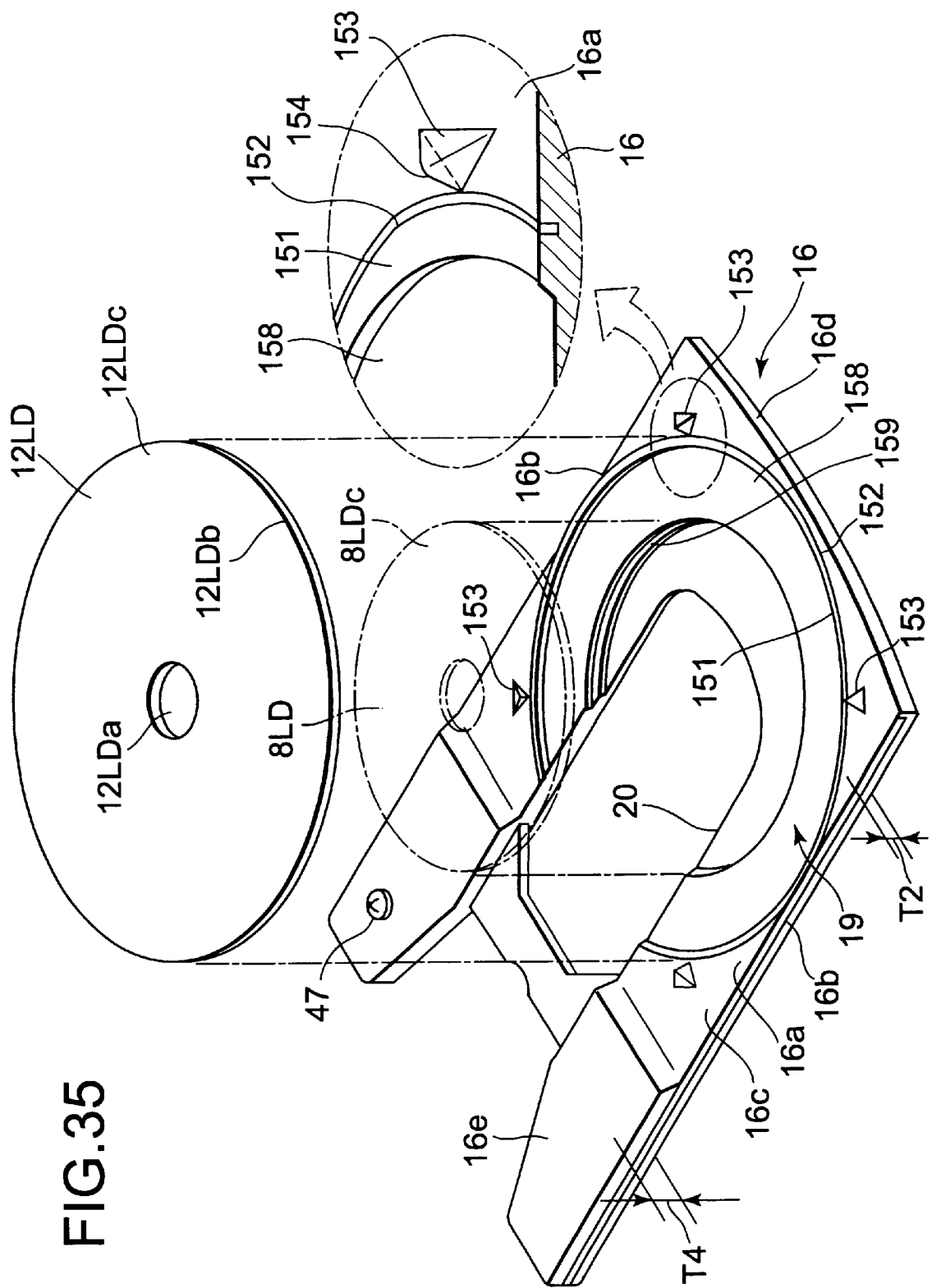
FIG. 35 is a perspective view for illustrating a first preferred embodiment of a disk mounting segment of a disk tray.

Next, FIG. 34 illustrates an unloading time control mode, wherein at the time of unloading, the loading motor 52 driven to be rotated in reverse direction is driven to rotate at a constant speed of 1000 rpm, the opening/closing door 18 is softly pulled back to release the tray loading/unloading port 4, thereafter the revolution speed of the loading motor 52 is rapidly increased up to 4000 rpm and the chucking pulley 38 is forcedly pulled apart from the spindle motor 23 against an attracting force of the chucking magnet 24b so as to perform a positive chucking releasing operation. Then, after releasing the chucking operation, the revolution speed of the loading motor 52 is set to 3000 rpm for its constant speed driving, thereby the pulling-out operation of the disk tray 16 is carried out at a safety speed. Lastly, the revolution speed of the loading motor 52 is decreased from 3000 rpm to the range of 2000 rpm to 1000 rpm in a stepwise manner, and the pulling-out speed of the disk tray 16 is dropped in a stepwise manner (slight amount) and gradually stopped.

In accordance with the CD/DVD player 1 and the disk drive apparatus 11 of the present invention described above, the disk tray 16 is retracted in a horizontal state, thereafter it is descended down in a vertical manner to cause the laser disk LD to be chucked against the spindle motor 23, so that it is possible to fix the optical pickup unit 21 against the mechanical deck 12 through a plurality of insulators 28. Accordingly, looseness of the optical pickup unit 21 against the mechanical deck 12 is not produced at all, the hardness of the insulators 28 can be increased, resulting in that even if vibration is generated at the spindle motor 23 at the time of data reproduction of the laser disk LD of eccentric center of gravity, it is possible to restrict resonance of the optical pickup unit 21 as much as possible, no error of data reproduction occurs and a high precision data reproduction can be carried out.

However, the disk tray 16 is constituted such that it can be loaded or unloaded in a horizontal direction in respect to the tray ascending/descending unit 17, the tray ascending/descending unit 17 is constructed in such a way that it can be ascended or descended in a vertical direction against the mechanical deck 12, thereby one-motor type simple structure loading drive mechanism 51 is mounted on the tray ascending/descending unit 17, and a loading/unloading drive of the disk tray 16 in a horizontal direction and an ascending/descending drive in a vertical direction of the tray ascending/descending unit 17 can be carried out in sequence in a continuous manner without performing any phase alignment at all, and the entire device configuration can be simplified and its small-sized and light weight formation can be promoted. In addition, a thickness T2 of the disk tray 16 is constituted to be quite thin of about 4 mm, thereby a quite new characteristic and high quality not found in the related art device at all can be attained. Further, positive characteristic, safety characteristic and high quality of various kinds of operation can be improved remarkably by performing the new loading time control mode and the unloading time control mode with the loading motor control circuit 131.

(4) Description of Disk Mounting Part of Disk Tray

Next, referring to FIGS. 35 to 48, the disk mounting part 19 of the disk tray 16 will be described.

At first, FIGS. 35 to 38 illustrate a first preferred embodiment of the disk mounting part 19 of the disk tray 16, wherein as described above, a thickness T2 of the disk tray 16 is made to be quite thin by about 4 mm (about ⅓ of the related art thickness T1). However, a thickness T4 of the rear end 16e of the disk tray 16 formed like a fork-shape is partially thick up to about 6.4 mm to assure a supporting strength into the tray ascending/descending unit 17.

Then, a ring-like disk outer circumferential mounting surface 151 of large diameter for use in mounting in a horizontal state an outer circumferential part 12LD placed at a more outer circumferential position 12LDc than the data recording area of a laser disk 12LD which is a laser disk having a diameter of 12 cm is constituted in flush with the upper surface 16a of the disk tray 16. Then, the circular contour groove 152 displaying a circular contour line of the disk outer circumferential mounting surface 151 is formed at the upper surface 16a along the outer circumference of the disk outer circumferential mounting surface 151. Then, both right and left side surfaces 16b and the front end surface 16d of the disk tray 16 are formed in substantial tangential line against the circular contour groove 152. Then, at the outer circumferential position of the circular contour groove 152 on the upper surface 16a of the disk tray 16, four disk guides 153 of substantial triangular pyramid are arranged in substantial equal space at the upper part of the upper surface 16a and fixed there, and an acute slant segment 154 utilizing one ridge line for slipping the laser disk 12LD onto the disk outer circumferential mounting surface 151 under its automatic dropping is formed inside the four disk guides 153.

Then, a concave section 158 having a depth H is formed inside the disk outer circumferential mounting surface 151 of the disk tray 16, the outer circumferential mounting surface 159 of small diameter for use in mounting the outer circumferential portion 8LDc of the laser disk 8LD which is a laser disk having a diameter of 8 cm in a horizontal state is formed at a position dropped by one step of the inner circumferential portion of the concave section 158 with a ring-like concentric shape against the disk outer circumferential mounting surface 151 of large diameter.

Then, the disk tray 16 is molded by high rigid synthetic resin such as polycarbonate resin and the like, and the four disk guides 153 are molded by polyacetar resin (POM) having a more soft material quality than that of the laser disk 12LD in order to prevent scar from being applied to the laser disks 12LD, 8LD. Then, the four disk guides 153 are fitted into a triangular notch 155 formed on the upper surface of the disk tray 16, the melting dowels 156 integrally formed in a vertical manner at the lower surfaces of the disk guides 153 are inserted from above into dowel holes 157 formed at the disk tray 16 and passed downwardly, the lower ends of the melting dowels 156 are melted, fixed and attached on the disk tray 16. These disk guides 153 can also be fixed to the disk tray 16 with adhesion or small screws and the like.

Then, the entire disk tray 16 is colored with light color such as silver color or the like and in turn, the four disk guides 153 are colored in dark color such as black, the positions of the four disk guides 153, i.e. the positions of the disk outer circumferential mounting surfaces 151, 159 can be easily acknowledged in reference to brightness or darkness and difference in color tones (high contrast) of the disk tray 16 and the four disk guides 153. To the contrary, it is possible to perform a clear recognition of the positions of the four disk guides 153 in reference to the high contrast even if the entire disk tray 16 is colored dark and the four disk guides 153 are colored light.

In accordance with the first preferred embodiment of the disk mounting segment 19 of the disk tray 16, the disk outer circumferential mounting surface 151 of large diameter for use in mounting in a horizontal state the outer circumferential segment 12LDc of the laser disk 12LD is formed in flush with the upper surface 16a of the disk tray 16, thereby a thickness T2 of the disk tray 16 can be made remarkably thin as compared with that of the related art and further a degree of freedom in a fixing or removing of the laser disk 12LD against the disk outer circumferential mounting surface 151 can be improved and an operating characteristic of its fixing or removing can be remarkably improved.

Figure 36:
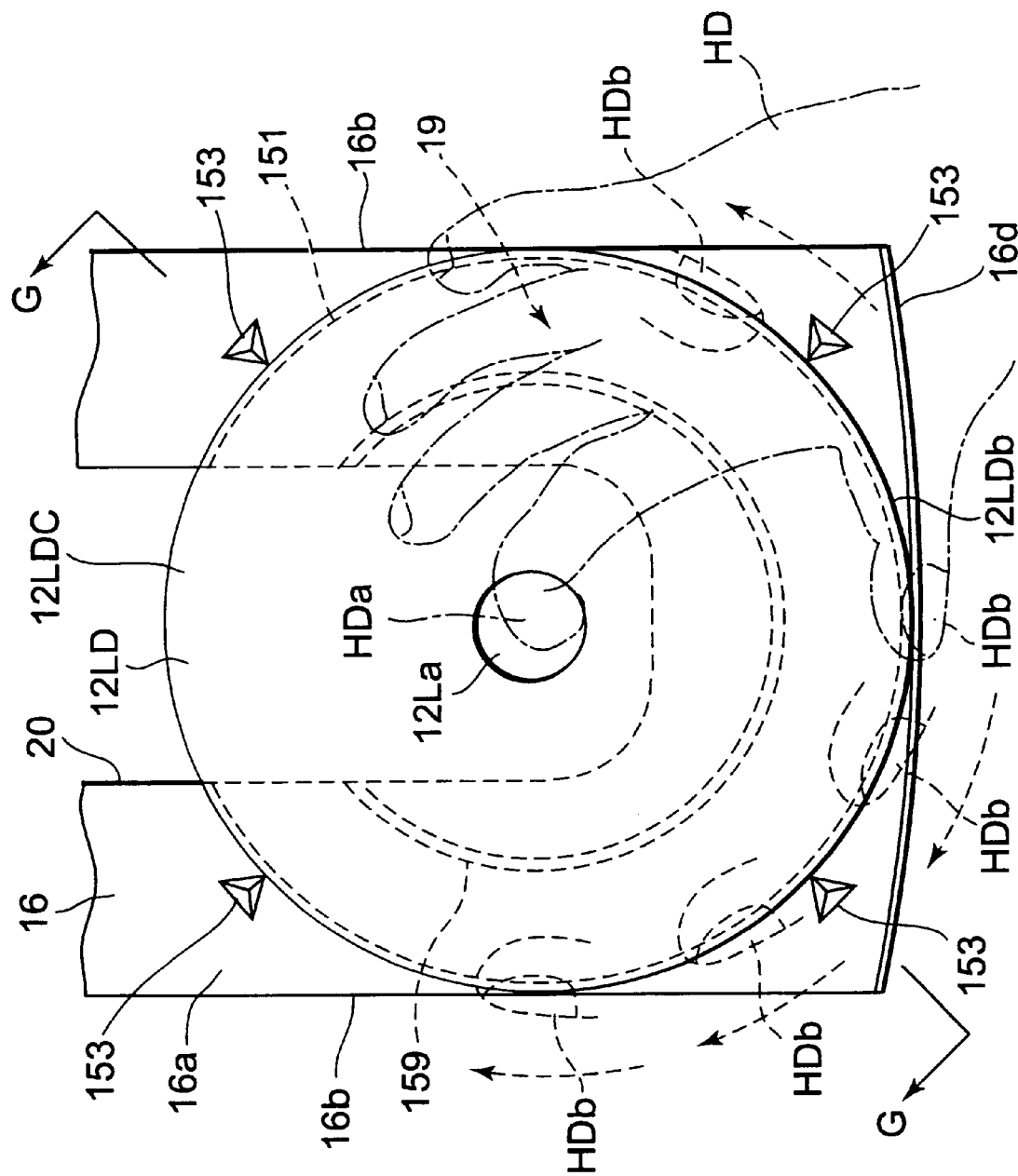
FIG. 36 is a top plan view for showing a substantial part of FIG. 35.
Figure 37:
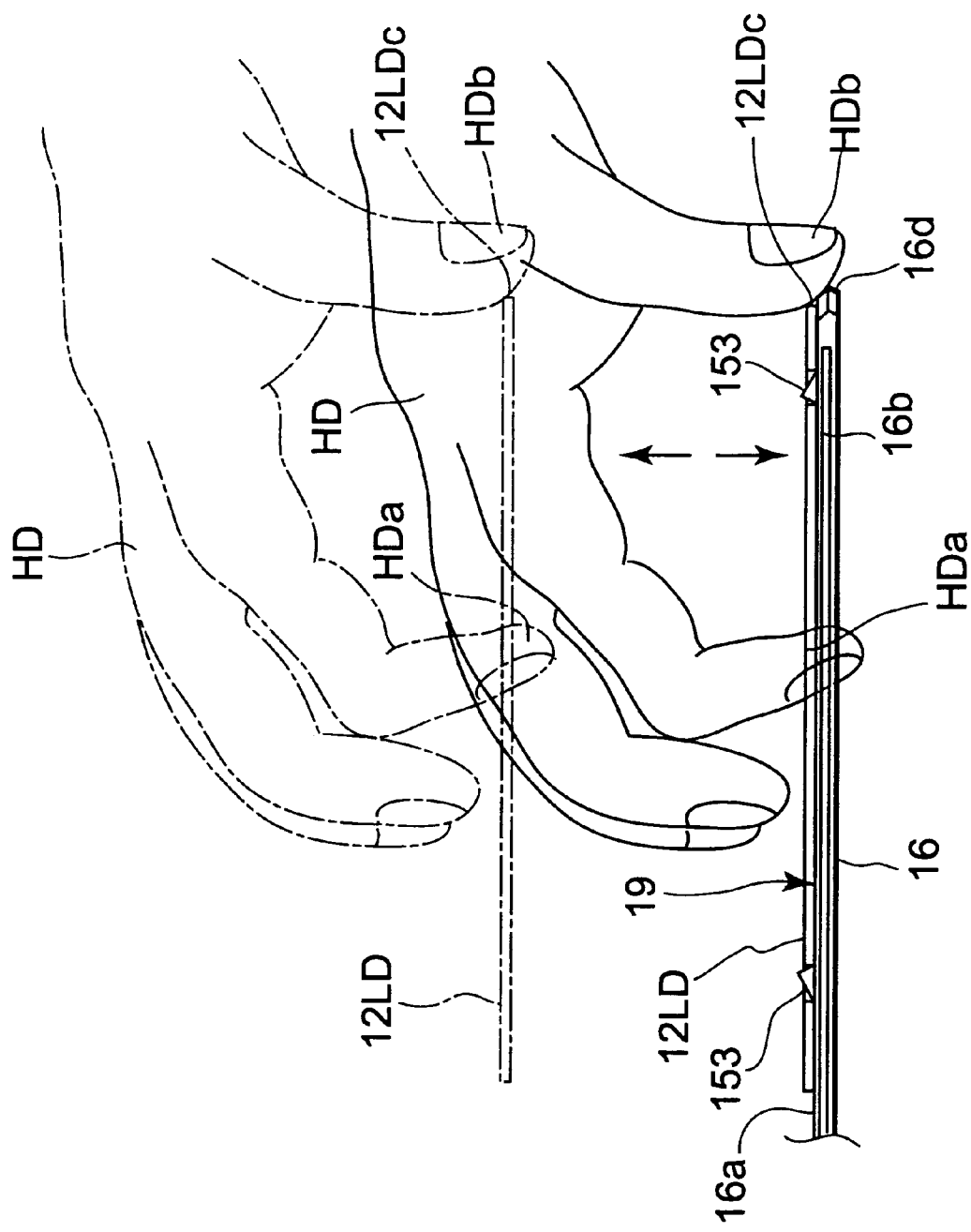
FIG. 37 is a side elevational view for showing a substantial part of FIG. 35.
Figure 38:
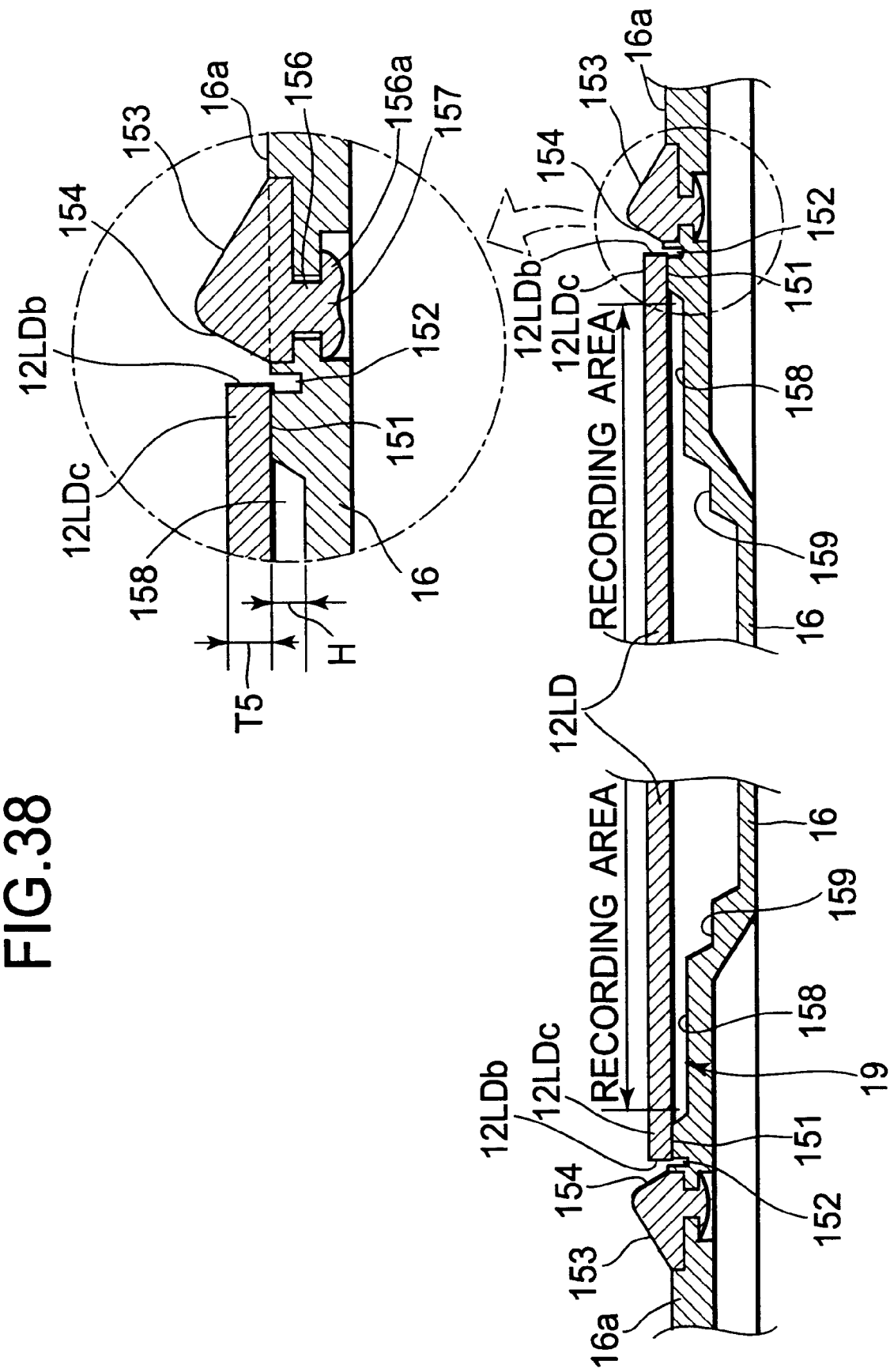
FIG. 38 is an enlarged side elevational view in section taken along arrow line G—G of FIG. 36.

That is, as shown in FIGS. 36 and 37, when the laser disk 12LD is taken out of the disk tray 16, in general, a forefinger HDa of one hand HD is inserted from above into the central hole 12LDa of the laser disk 12LD so as not to apply any finger print or the like on the data recording area, a part of the outer circumferential surface 12LDb of the laser disk 12LD is pushed by a thumb HDb from a lateral side, thereby the laser disk 12LD is held with the forefinger HDa and the thumb HDb and lifted up. In this case, if the disk outer circumferential mounting surface 151 is in flush with the upper surface 16a of the disk tray 16, the outer circumferential mounting surface 12LDb of the laser disk 12LD is projected above the upper surface 16a only by a corresponding amount of the thickness T5, resulting in that as shown by the dash-single-dot line and a dotted line in FIG. 36, the thumb HDb can be freely pressed from substantial entire directions (360°) of the outer circumferential surface 12LDb of the laser disk 12LD.

Figure 50:
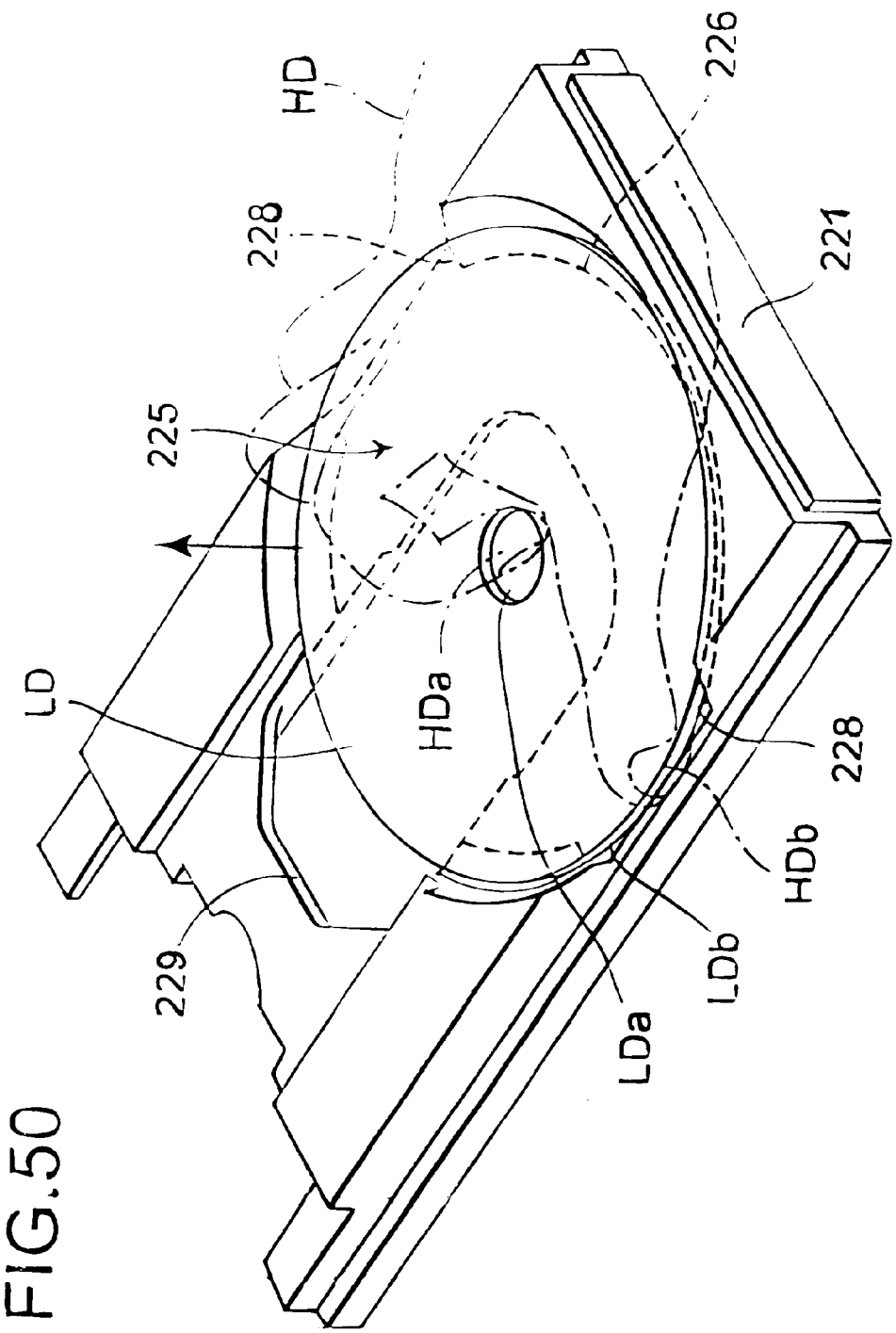
FIG. 50 is a perspective view for illustrating a disk tray of the disk drive apparatus of FIG. 49.

Accordingly, when the laser disk 12LD is held with one hand HD and taken out of the device, a degree of freedom of a hand in its inserting direction against the disk tray 16 can be remarkably improved as compared with the related art (as described in reference to FIG. 50, the related art shows that the case in which the thumb HDb can be pressed against the outer circumferential surface LDb of the laser disk LD is limited only to the forming location of the recess 128, and a direction in which the laser disk LD can be held and taken out of the device is limited only to a substantial one location).

Further, both right and left side surfaces 16b and the front end surface 16d of the disk tray 16 are arranged in substantial tangential manner against the circular contour line of the disk outer circumferential mounting surface 151, thereby the thumb HDb can be more easily pressed in a lateral direction to the outer circumferential surface 12LDb of the laser disk 12LD.

Then, an easy taking-out of the laser disk 12LD from the disk tray 16 is in common with the case in which the laser disk 12LD is mounted on the disk tray 16 and the outer circumference of the disk outer circumferential mounting surface 151 is formed with the circular contour line groove 152 expressing its contour, its outer circumference is provided with four disk guides 153 colored in high contrast against the disk tray 16, so that a position of the disk outer circumferential mounting surface 151 of large diameter on the disk tray 16 can be clearly acknowledged and an operation for mounting the laser disk 12LD on the disk outer circumferential mounting surface 151 of large diameter may also be easily carried out.

In addition, four disk guides 153 are formed with slant segments 154 capable of slipping the laser disk 12LD onto the disk outer circumferential mounting surface 151 of large diameter, and the four disk guides 153 are made of more soft material than that of the laser disk 12LD, so that the laser disk 12LD can be mounted quite easily on the disk outer circumferential mounting surface 151 of large diameter without damaging the laser disk 12LD while guiding and slipping the laser disk 12LD into it with the slant segments 154 of the four disk guides 153.

Figure 39:
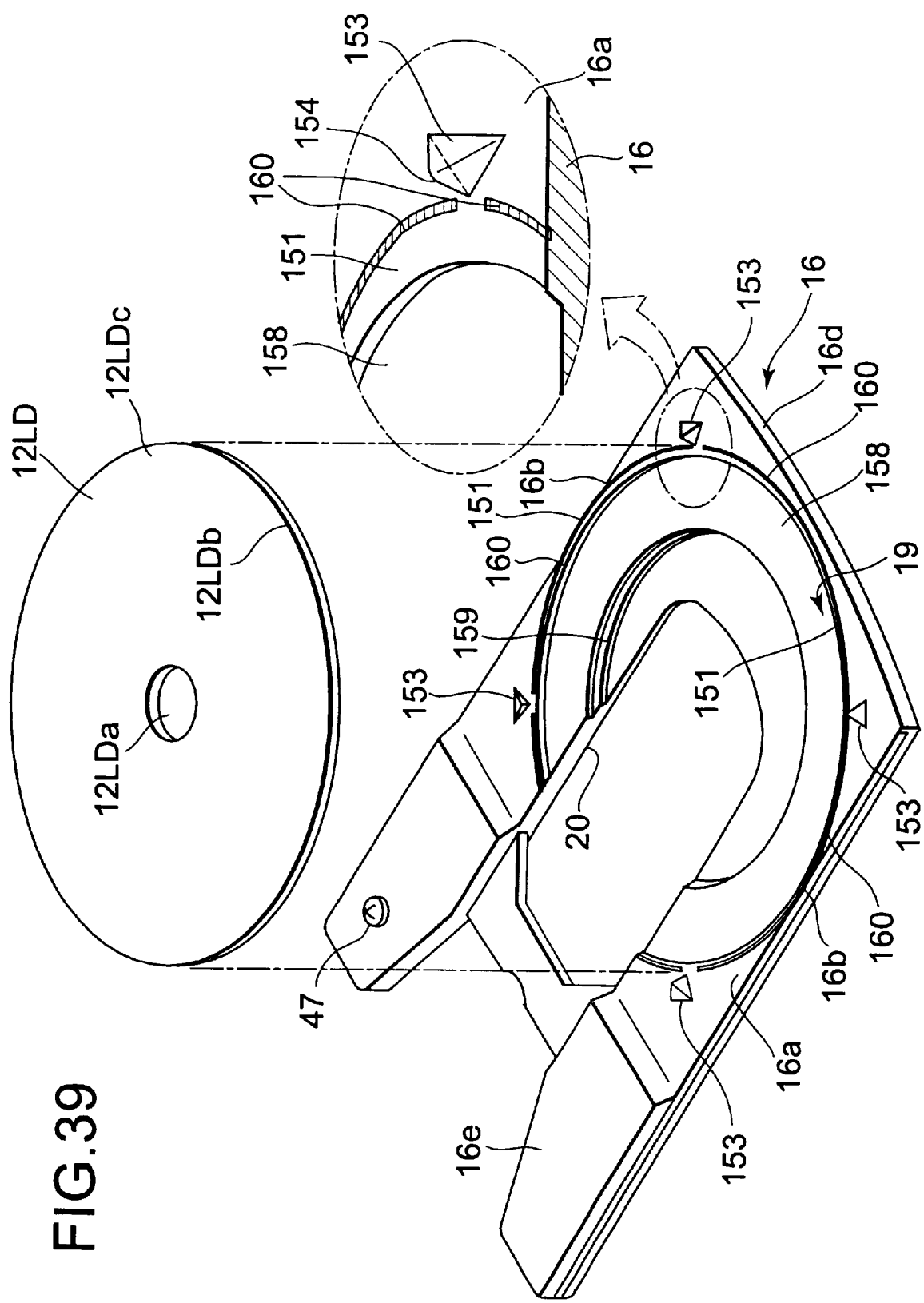
FIG. 39 is a perspective view for illustrating a second preferred embodiment of a disk mounting segment of a disk tray.
Figure 40:
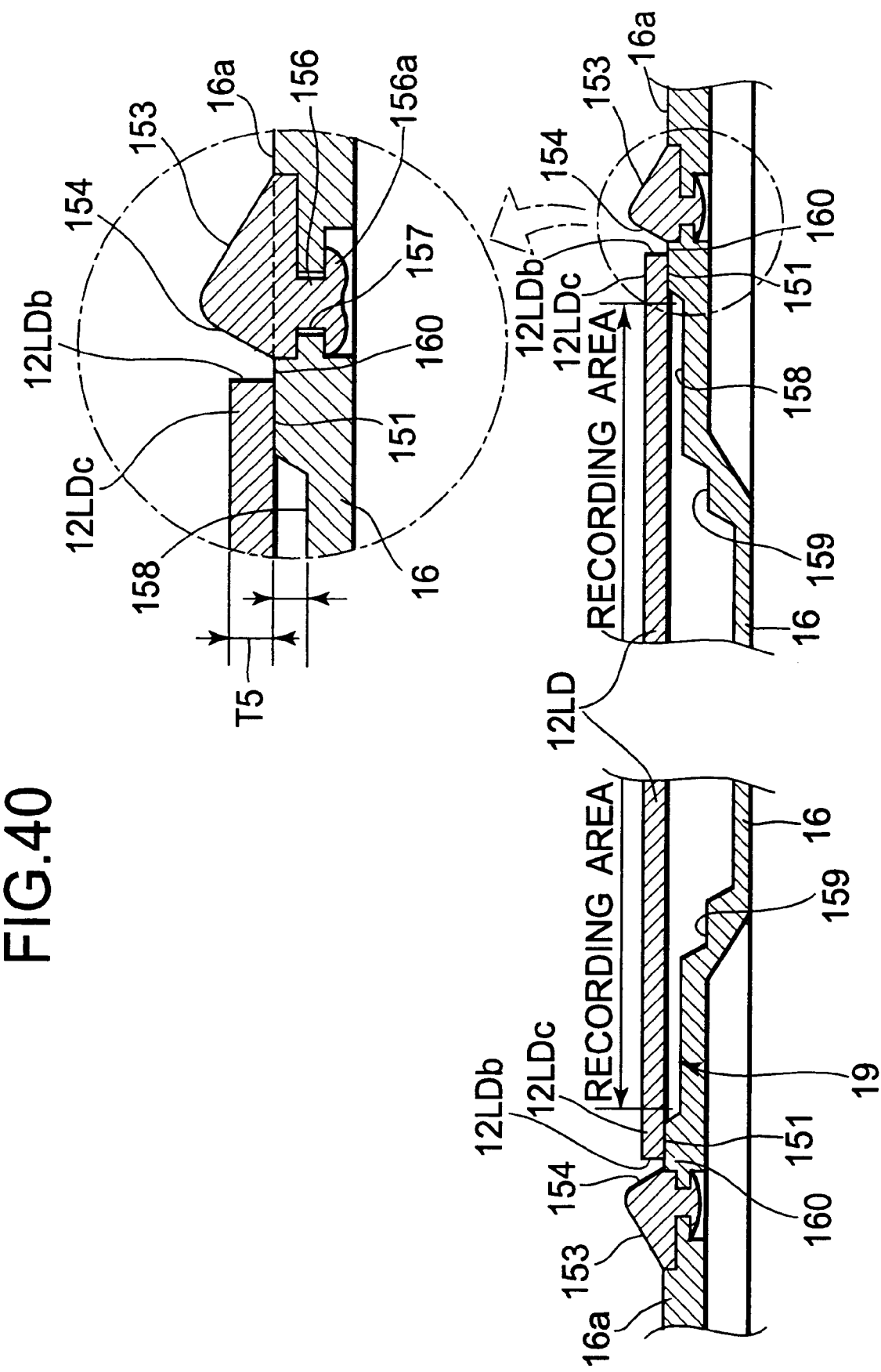
FIG. 40 is a similar enlarged side elevational view of FIG. 38 for illustrating a sectional shape of the disk tray of FIG. 39.

Next, referring to FIGS. 39 and 40, a second preferred embodiment of the disk mounting part 19 of the disk tray 16 will be described. In this case, display of the circular contour line of the disk outer circumferential mounting surface 151 of large diameter is replaced from the circular contour line groove 152 to the circular printed contour line 160 by a color printing, it is possible to prevent accumulation of dust into the circular contour line groove 152 or transfer of dust into the laser disk 12LD, and further cleaning characteristic of the upper surface 16a of the disk tray 16 can be improved.

Figure 41:
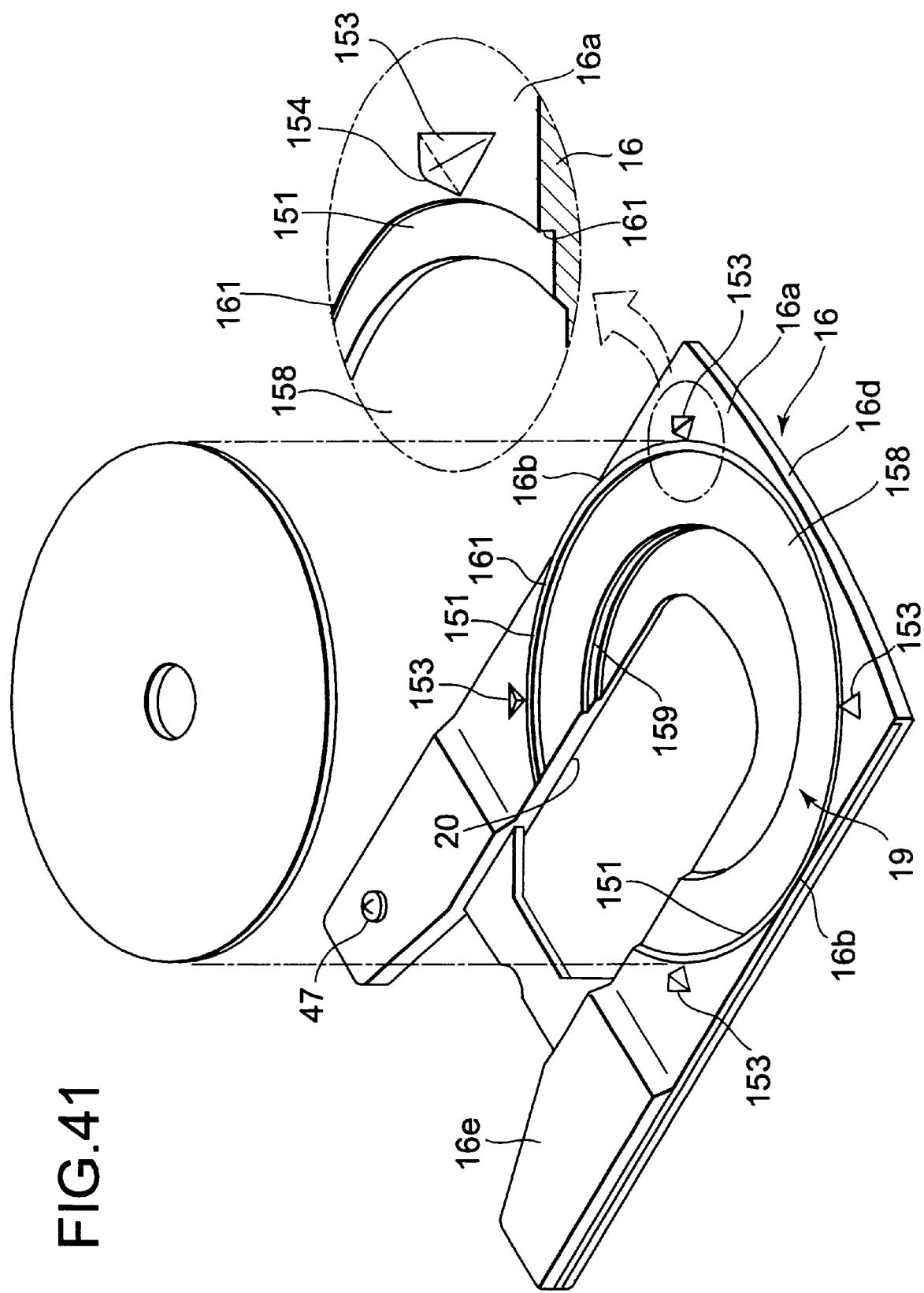
FIG. 41 is a perspective view for illustrating a third preferred embodiment of a disk mounting part of a disk tray.
Figure 42:
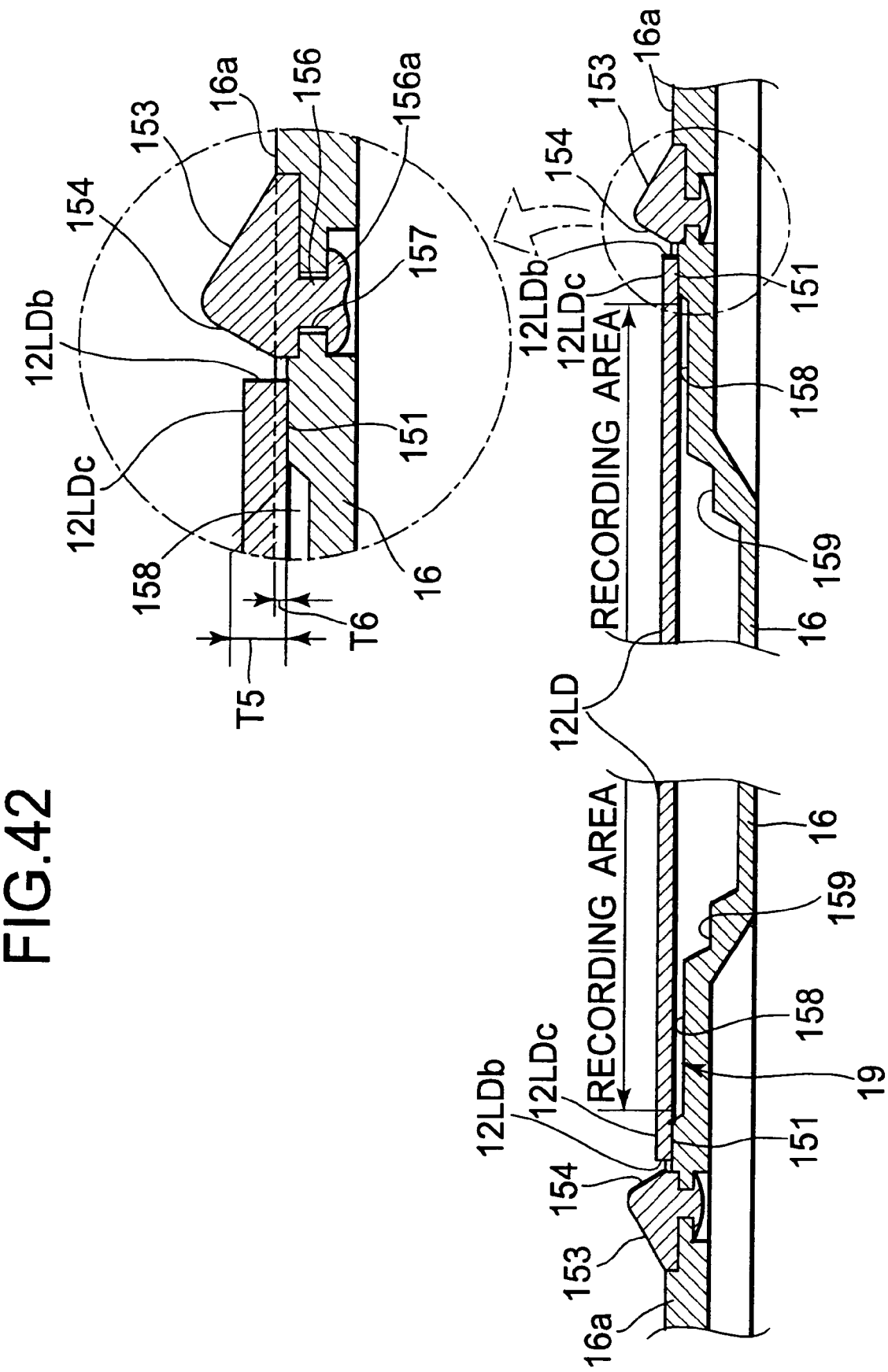
FIG. 42 is a similar enlarged side elevational view of FIG. 38 for illustrating a sectional shape of the disk tray of FIG. 39.

Next, FIGS. 41 and 42 illustrate a third preferred embodiment of the disk mounting part 19 of the disk tray 16. In this case, the disk outer circumferential mounting surface 151 of large diameter is recessed from the upper surface 16a downwardly by a corresponding amount of a depth T6 smaller than the thickness T5 of the laser disk 12LD (T5 >T6), and the disk outer circumferential mounting surface 151 of large diameter is slightly recessed from the upper surface 16a, thereby the outer circumference of the disk outer circumferential mounting surface 151 of large diameter can be formed with the disk position setting wall 161. Accordingly, the laser disk 12LD can be mounted in a superior stable manner on the outer circumference of the disk outer circumferential mounting surface 151 of large diameter and additionally easiness in mounting or removing of the laser disk 12LD described above can be attained.

Figure 43:
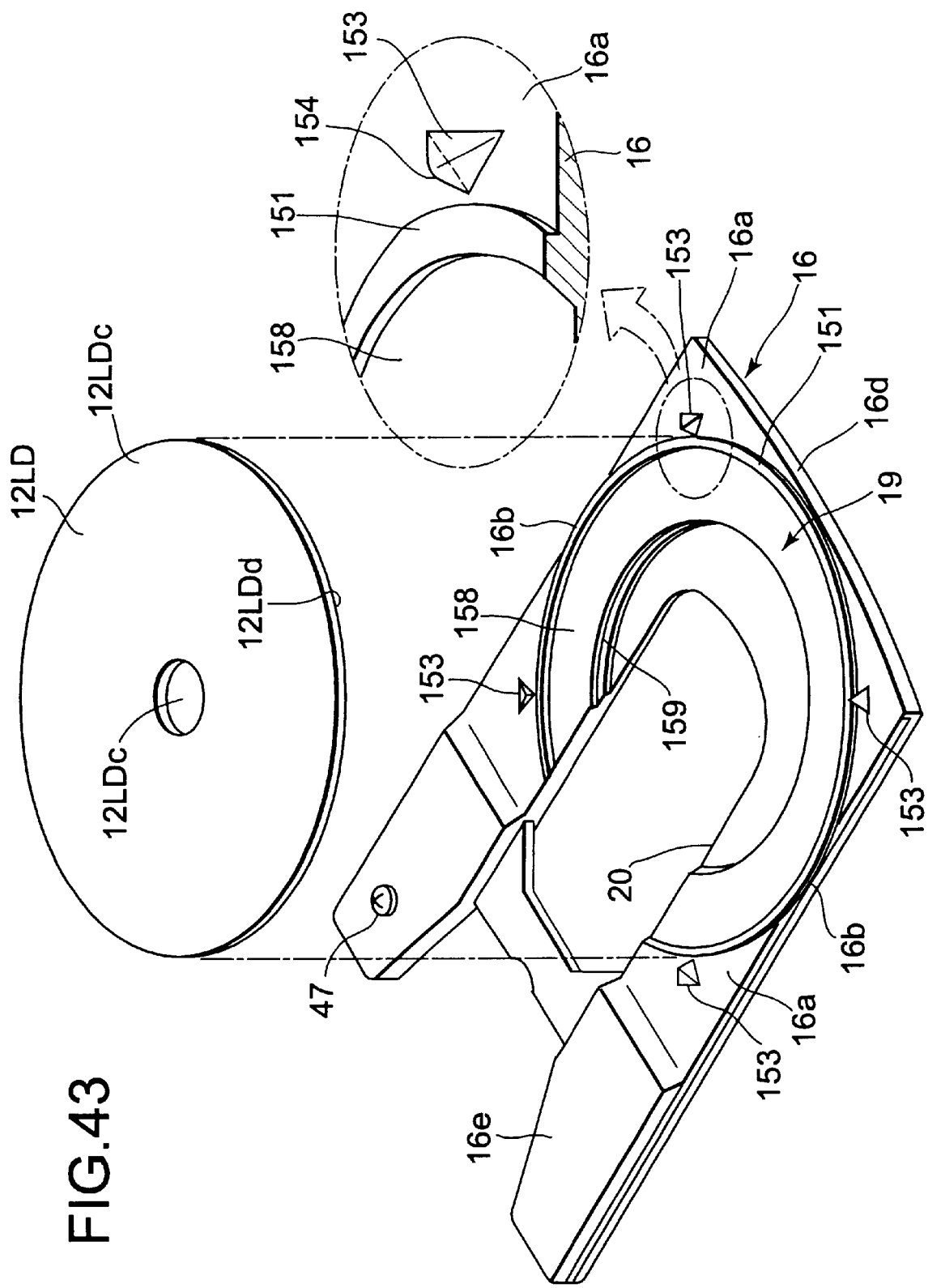
FIG. 43 is a perspective view for illustrating a fourth preferred embodiment of a disk mounting part of a disk tray.
Figure 44:
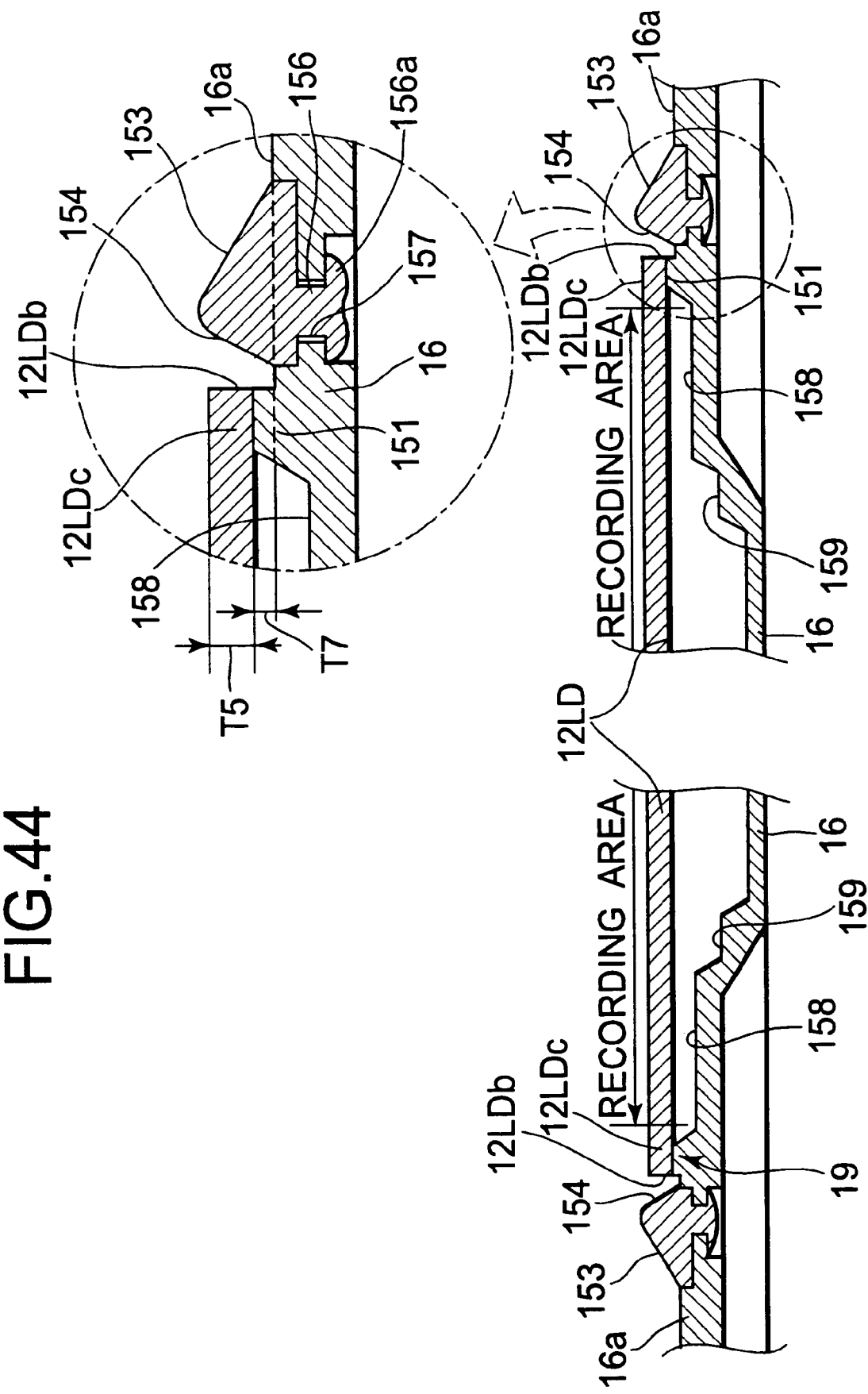
FIG. 44 is a similar enlarged side elevational view of FIG. 38 for illustrating a sectional shape of the disk tray of FIG. 43.

Next, referring to FIGS. 43 and 44, a fourth preferred embodiment of the disk mounting part 19 of the disk tray 16 will be described. In this case, the outer circumference of the disk outer circumferential mounting surface 151 of large diameter is projected upwardly by a predetermined size T7 from the upper surface 16a of the disk tray 16 and the outer circumference of the disk outer circumferential mounting surface 151 of large diameter is formed on the upper surface 16a in a circular protuberance shape, thus enabling more improvement of easiness in mounting or removing operation of the laser disk 12LD and an effect of preventing dust from being adhered to the laser disk 12LD. In FIGS. 43 and 44, although the upper surface of the disk outer circumferential mounting surface 151 of large diameter is made flat, the disk outer circumferential mounting surface 151 can be constituted into a protuberance ring shape with its vertical sectional shape being substantially semi-circle.

Figure 45:
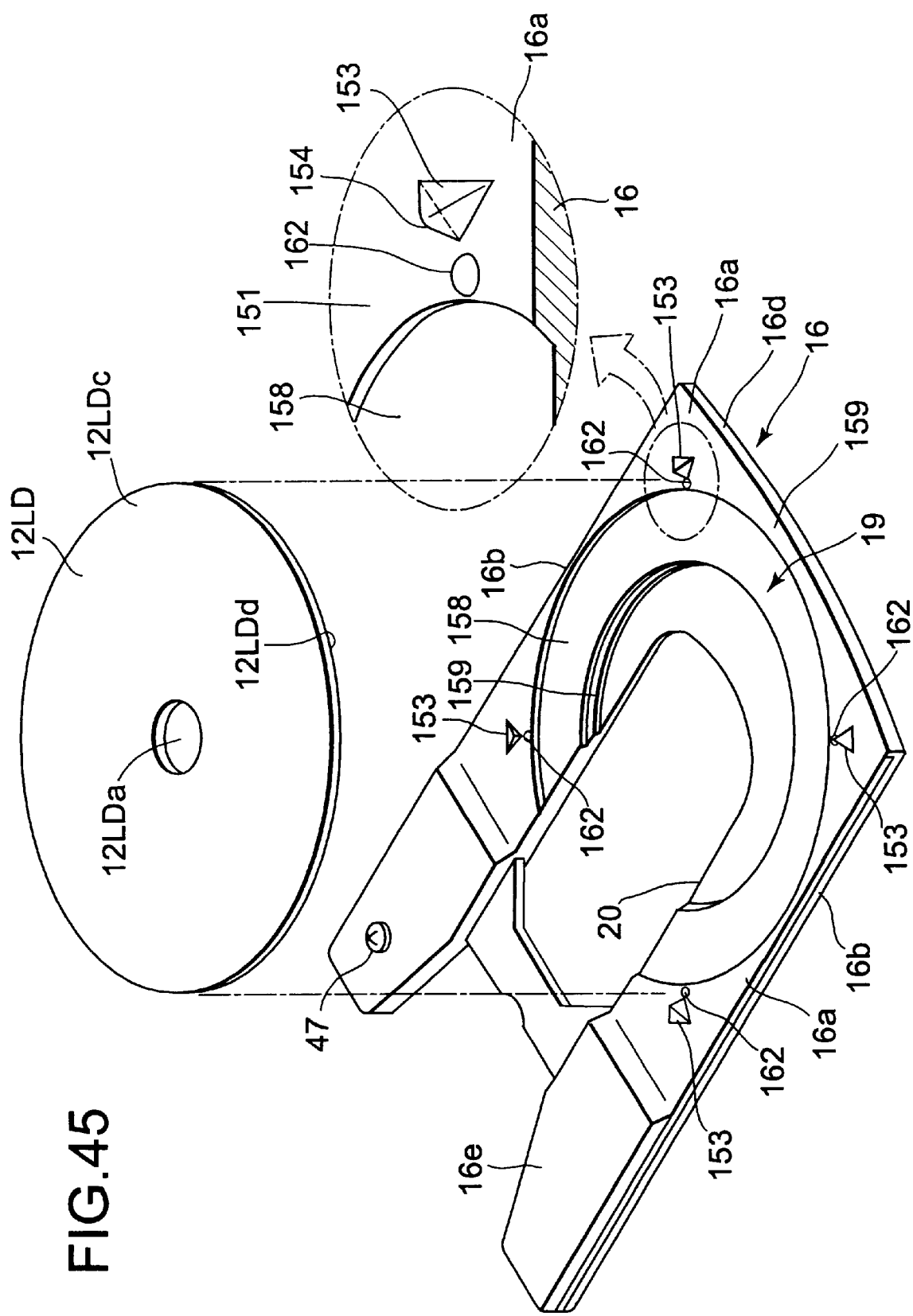
FIG. 45 is a perspective view for illustrating a fifth preferred embodiment of a disk mounting part of a disk tray.

Next, referring now to FIG. 45, a fifth preferred embodiment of the disk mounting part 19 of the disk tray 16 will be described. In this case, the disk outer circumferential mounting surface 151 of large diameter formed on the upper surface of the disk tray 16 is constituted by a plurality of protuberances 162 of semi-spherical shape, thus enabling more improvement of easiness in mounting or removing operation of the laser disk 12LD and an effect of preventing dust from being adhered to the laser disk 12LD.

Figure 46:
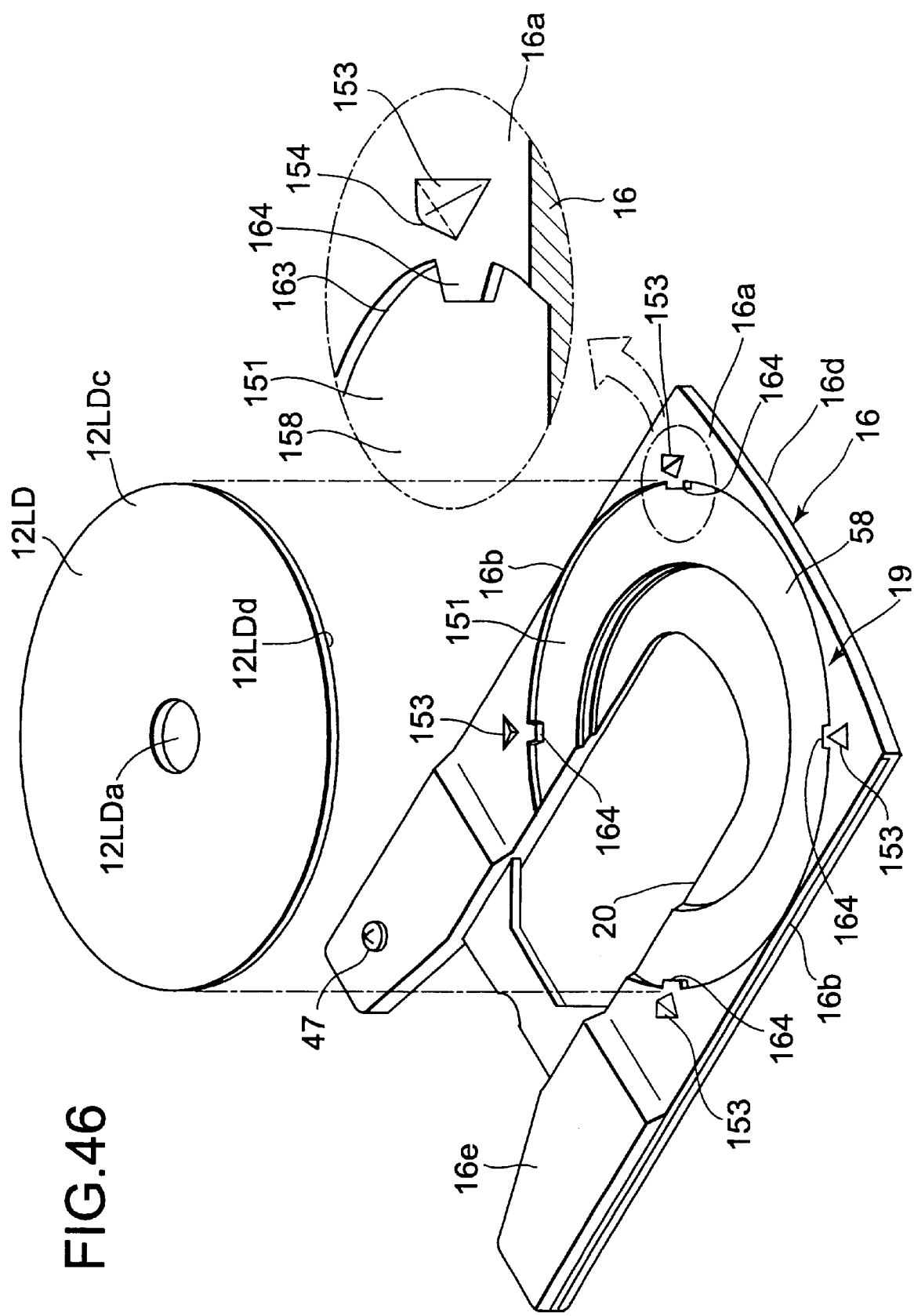
FIG. 46 is a perspective view for illustrating a sixth preferred embodiment of a disk mounting part of a disk tray.

Next, referring now to FIG. 46, a sixth preferred embodiment of the disk mounting part 19 of the disk tray 16 will be described. In this case, the disk outer circumferential mounting surface 151 of large diameter is formed as a circular recess 163 notched into a circular shape from the upper surface 16a, the outer circumference of the circular recess 163 is formed with a plurality of horizontal protuberances 164 substantially in flush with the upper surface 16a, thus enabling more improvement of easiness in mounting or removing operation of the laser disk 12LD and an effect of preventing dust from being adhered to the laser disk 12LD.

Figure 47:
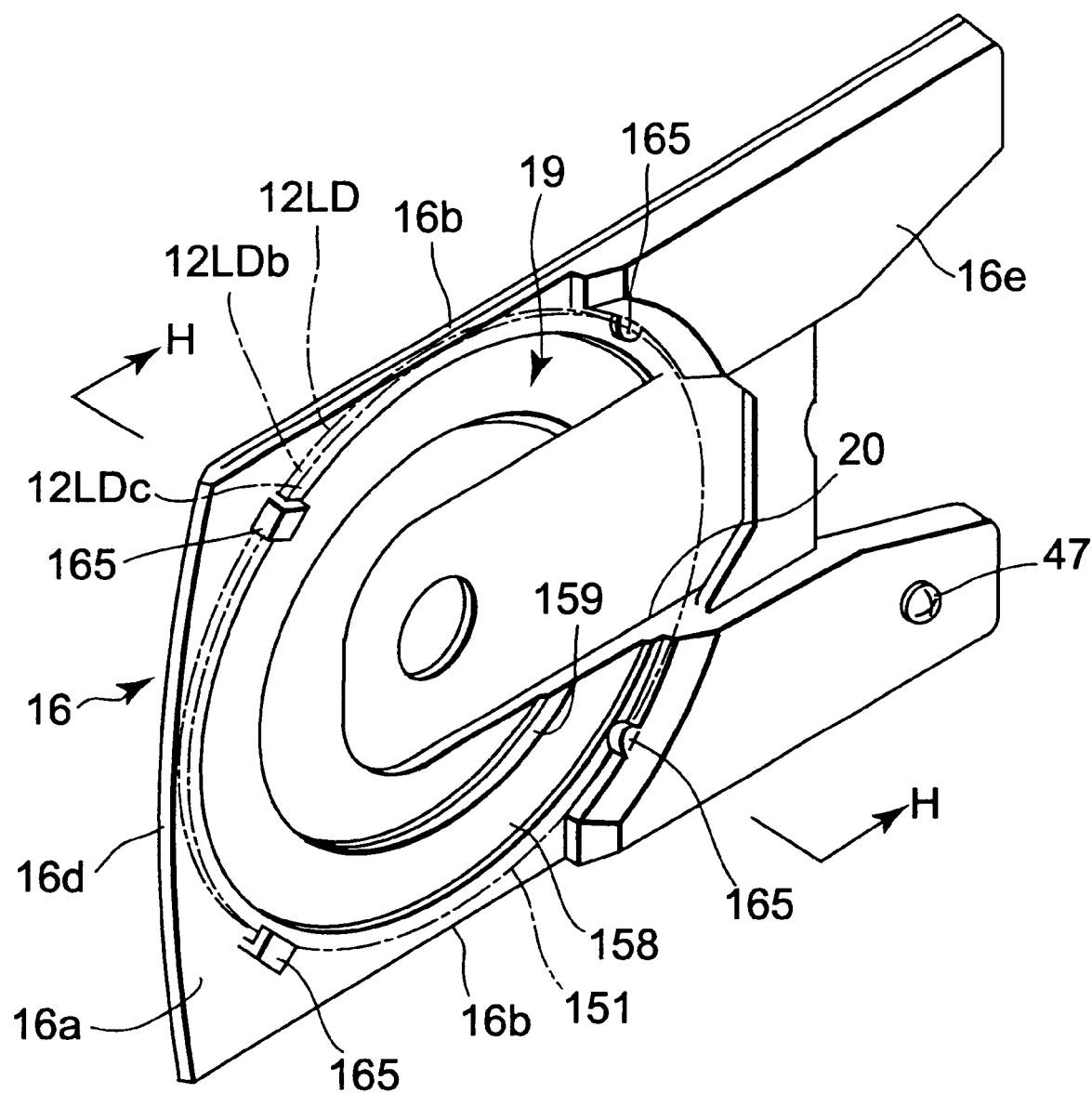
FIG. 47 is a perspective view for illustrating a seventh preferred embodiment of a disk mounting part of a disk tray.
Figure 48:
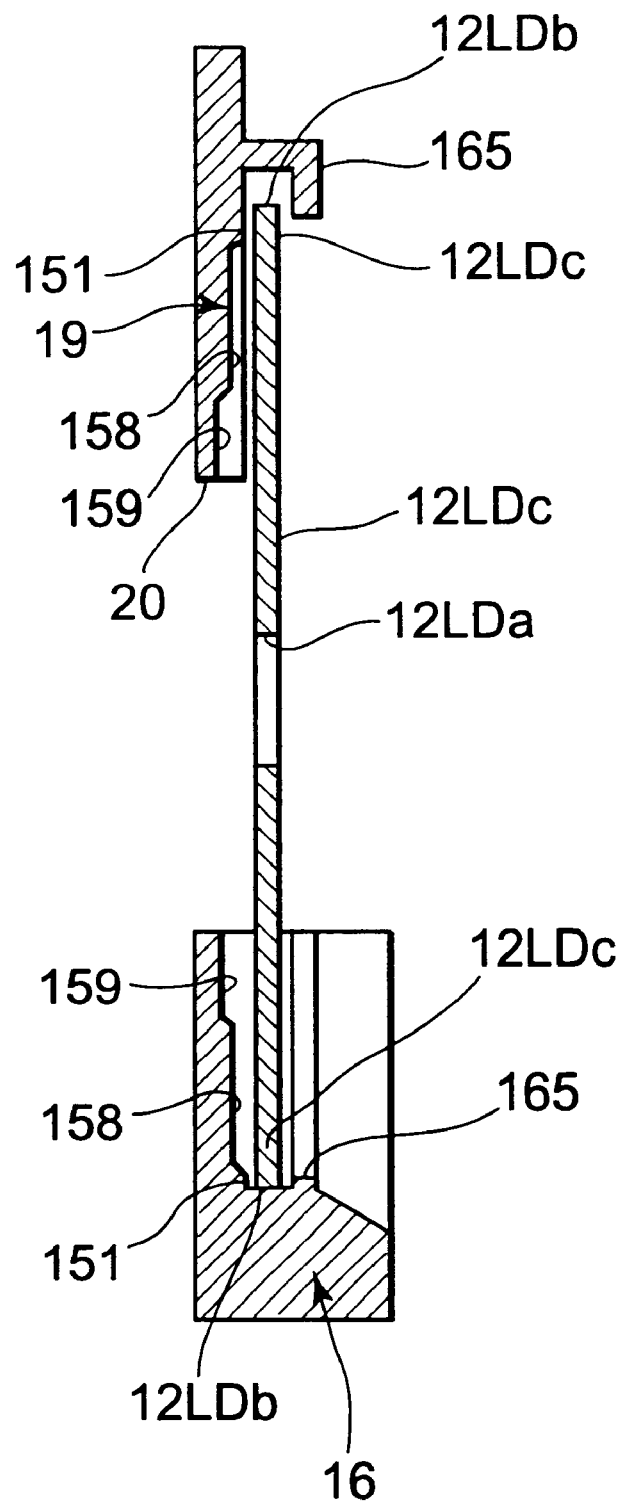
FIG. 48 is a side elevational view in section taken along arrow line H—H of FIG. 47.
Figure 49:
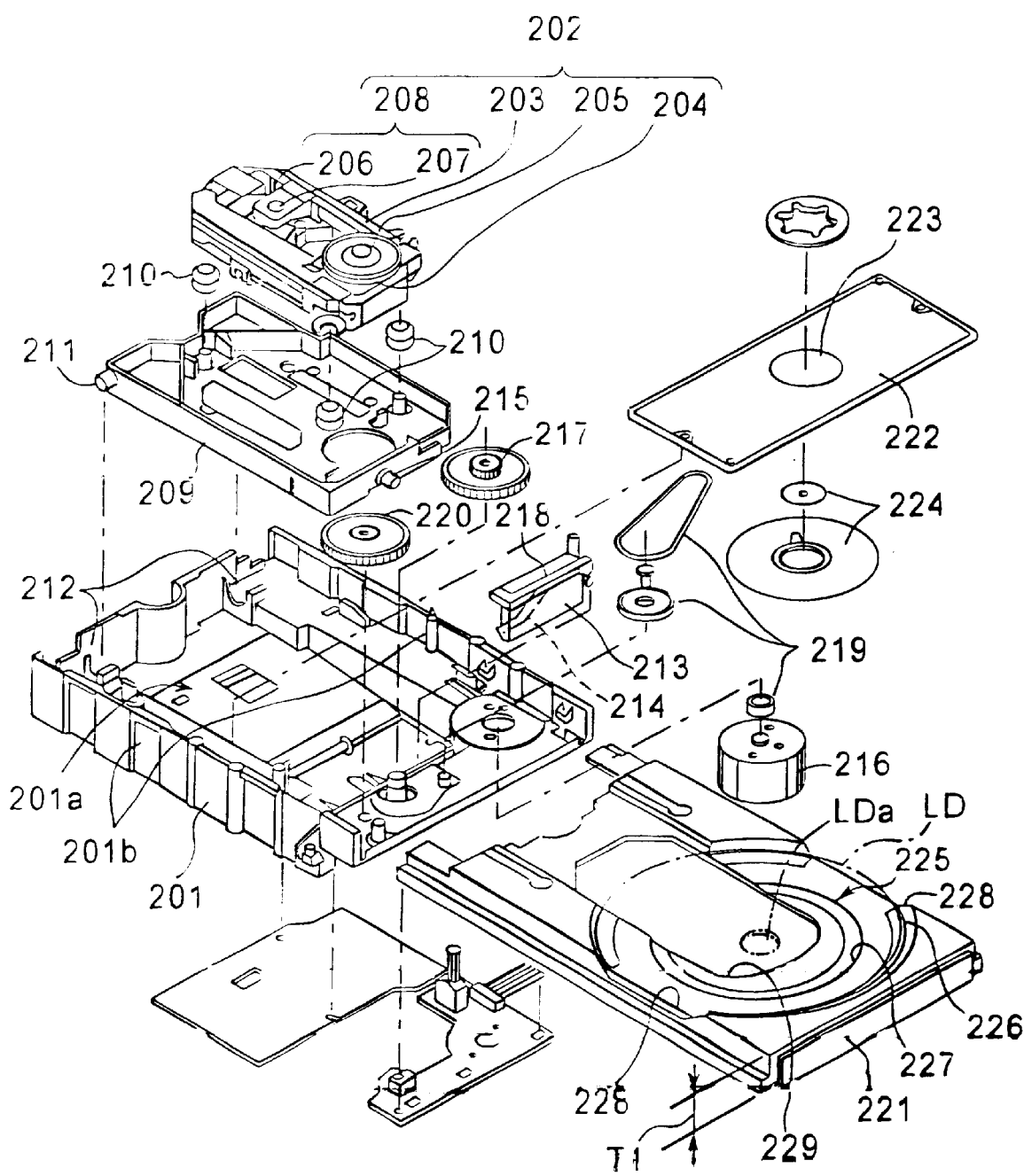
FIG. 49 is an exploded perspective view for showing the related art disk drive apparatus.

Next, referring now to FIGS. 47 and 48, a seventh preferred embodiment of the disk mounting part 19 of the disk tray 16 will be described. In this case, a plurality of disk holding segments 165 capable of holding the laser disk 12LD in substantial parallel vertical state with the disk outer circumferential mounting surface 151 of large diameter are formed on the upper surface 16a even in the case of vertical application of the disk drive apparatus 11 in its vertical upright application.

Some preferred embodiments of the present invention have been described above. However, the present invention is not restricted to the aforesaid preferred embodiments and various kinds of modifications can be carried out on the basis of the technical concept of the present invention. For example, the aforesaid preferred embodiments have described that the slant guide grooves 75 in a pair of right and left cam mechanisms 77 arranged among a pair of right and left slider cams 71, 72 fixed to both right and left sides of the tray ascending/descending unit 17 and both right and left side walls 12b of the mechanical deck 12 are formed at the slider cams 71, 72 and the cam pins 76 are fixed to both right and left side walls 12b. However, in turn, this can be constituted as the cam mechanism 77 in which the slant guide grooves 75 are formed at both right and left side walls 12b and the cam pins 76 are fixed to the slider cams 71, 72.

What is claimed is:

1. A disk drive apparatus in which a disk-like recording medium is mounted on a disk tray and pulled into said apparatus, wherein:

a disk outer circumference mounting surface where an outer circumferential portion of said disk-like recording medium is mounted is set to a same height as that of an upper surface of said disk tray; and a plurality of substantially pyramidal disk guides are arranged at an outer circumference of said disk outer circumference mounting surface and at said upper surface of said disk tray for slipping the disk onto the disk outer circumferential surface.

2. A disk drive apparatus in which a disk-like recording medium is mounted on a disk tray and pulled into said apparatus, wherein:

a disk outer circumference mounting surface where an outer circumferential portion of said disk-like recording medium is mounted is recessed from an upper surface of said disk tray in a downward direction by a smaller depth than a thickness of said disk-like recording medium; and a plurality of substantially pyramidal disk guides are arranged at an outer circumference of said disk outer circumference mounting surface and at said upper surface of said disk tray for slipping the disk onto the disk outer circumferential surface.

3. A disk drive apparatus in which a disk-like recording medium is mounted on a disk tray and pulled into said apparatus, wherein:

a disk outer circumference mounting surface where an outer circumferential portion of said disk-like recording medium is mounted is set to be higher than an upper surface of said disk tray; and a plurality of substantially pyramidal disk guides are arranged at an outer circumference of said disk outer circumference mounting surface and at said upper surface of said disk tray for slipping the disk onto the disk outer circumferential surface.

4. A disk drive apparatus in which a disk-like recording medium is mounted on a disk tray and pulled into said apparatus, wherein:

a plurality of disk outer circumference mounting protuberances where an outer circumference portion of said disk-like recording medium is mounted are arranged at an upper surface of said disk tray; and a plurality of substantially pyramidal disk guides are arranged at positions corresponding to outer circumferences of said plurality of disk outer circumference mounting protuberances and at said upper surface of said disk tray for slipping the disk onto the disk outer circumferential surface.

5. A disk drive apparatus in which a disk-like recording medium is mounted on a disk tray and pulled into said apparatus, wherein:

a plurality of substantially circular concave sections are formed at an upper surface of said disk tray and in a mounting area for said disk-like recording medium;

a plurality of protuberances where an outer circumference part of said disk-like recording medium is mounted at an outer circumference of said plurality of concave sections and are formed at substantially a same height as that of said upper surface of said disk tray; and a plurality of substantially pyramidal disk guides are arranged at said outer circumferences of said plurality of concave sections and at said upper surface of said disk tray for slipping the disk onto the disk outer circumferential surface.

6. The disk drive apparatus according to one of claims 1–5 in which a circular contour line is formed at an outer circumference of said disk outer circumference mounting surface.

7. The disk drive apparatus according to one of claims 1–5 in which said plurality of disk guides are colored to cause a certain contrast against said disk tray in brightness or darkness and color tones.

* * * * *